United States Patent
Merten

(10) Patent No.: US 8,362,876 B2
(45) Date of Patent: Jan. 29, 2013

(54) INTERLOCK SYSTEM AND METHOD

(76) Inventor: C. William Merten, New York, NY (US)

(*) Notice: Subject to any disclaimer, the term of this patent is extended or adjusted under 35 U.S.C. 154(b) by 317 days.

(21) Appl. No.: 12/756,790

(22) Filed: Apr. 8, 2010

(65) Prior Publication Data

US 2011/0248821 A1   Oct. 13, 2011

(51) Int. Cl.
*G08B 21/00* (2006.01)
(52) U.S. Cl. ............... 340/5.74; 340/10.1; 340/10.2; 340/10.51; 700/1; 700/117; 700/128; 713/2
(58) Field of Classification Search ............ 340/5.74, 340/572, 10; 700/1, 9, 117, 128; 713/2
See application file for complete search history.

(56) References Cited

U.S. PATENT DOCUMENTS

| | | |
|---|---|---|
| 3,866,173 A | 2/1975 | Moorman et al. |
| 3,939,679 A | 2/1976 | Barker et al. |
| 4,509,123 A | 4/1985 | Vereen |
| 4,538,056 A | 8/1985 | Young et al. |
| 4,644,104 A | 2/1987 | Middlemiss |
| 4,656,463 A | 4/1987 | Anders et al. |
| 4,698,630 A | 10/1987 | Ellsberg |
| 4,700,296 A | 10/1987 | Palmer, Jr. et al. |
| 4,780,806 A | 10/1988 | Wada et al. |
| 4,816,658 A | 3/1989 | Khandwala et al. |
| 5,121,331 A | 6/1992 | Lovrenich |
| 5,345,379 A | 9/1994 | Brous et al. |
| 5,475,378 A | 12/1995 | Kaarsoo et al. |
| 5,548,660 A | 8/1996 | Lemelson |
| 5,567,926 A | 10/1996 | Asher et al. |
| 5,614,703 A | 3/1997 | Martin et al. |
| 5,646,605 A | 7/1997 | Leonaggeo et al. |
| 5,715,905 A | 2/1998 | Kaman |
| 5,749,253 A | 5/1998 | Glick et al. |
| 5,823,027 A | 10/1998 | Glick et al. |
| 5,848,541 A | 12/1998 | Glick et al. |
| 6,041,412 A | 3/2000 | Timson et al. |
| 6,061,668 A | 5/2000 | Sharrow |
| 6,064,316 A | 5/2000 | Glick et al. |
| 6,094,589 A | 7/2000 | Schmitt |
| 6,182,893 B1 | 2/2001 | Greene et al. |
| 6,325,292 B1 | 12/2001 | Sehr |
| 6,401,501 B1 | 6/2002 | Kajuch et al. |
| 6,543,689 B2 | 4/2003 | Sabella |
| 6,600,418 B2 | 7/2003 | Francis et al. |
| 6,738,772 B2 | 5/2004 | Regelski et al. |
| 6,804,778 B1 | 10/2004 | Levi et al. |
| 6,809,628 B1 | 10/2004 | Bensimon et al. |
| 6,839,604 B2 | 1/2005 | Godfrey et al. |
| 6,867,683 B2 | 3/2005 | Calvesio et al. |

(Continued)

*Primary Examiner* — Jennifer Mehmood
*Assistant Examiner* — Mark Rushing
(74) *Attorney, Agent, or Firm* — St. Onge Steward Johnston & Reens LLC

(57) ABSTRACT

A network of interlocks and input devices and a system for tracking their use and control, in which each interlock and input device is associated with a machine which performs a process. Machines are associated with input devices by reading machine identifications from Data Storage Devices (DSDs) with input devices. To disarm an interlock prior to using a machine, the input device is used to read one or more DSDs containing information required to track the process. The input device sends the DSD data to a CPU which then sends an authorization signal to a machine interface. Upon receiving the signal, the machine interface enables the machine to be turned on. The CPU logs the process and DSD data. Once the operator turns off the machine, it cannot be restarted until the operator reads the DSDs required by the machine.

24 Claims, 45 Drawing Sheets

U.S. PATENT DOCUMENTS

| | | |
|---|---|---|
| 6,873,255 B2 | 3/2005 | Gallagher |
| 7,069,100 B2 | 6/2006 | Monette et al. |
| 7,114,178 B2 | 9/2006 | Dent et al. |
| 7,164,956 B2 | 1/2007 | Bicknell et al. |
| 7,298,275 B2 | 11/2007 | Brandt et al. |
| 2003/0023337 A1* | 1/2003 | Godfrey et al. ............... 700/109 |
| 2004/0008582 A1 | 1/2004 | Richards et al. |
| 2005/0061879 A1* | 3/2005 | Honda ........................ 235/385 |
| 2005/0099265 A1* | 5/2005 | Dix et al. .................... 340/5.72 |
| 2007/0159161 A1* | 7/2007 | Neill ......................... 324/158.1 |
| 2007/0205860 A1* | 9/2007 | Jones et al. ................. 340/5.61 |
| 2010/0007497 A1* | 1/2010 | Takeda et al. ............. 340/572.1 |

* cited by examiner

DSD Types

User
- Employee
- Operator
- Nurse

Operand
- Product (Intermediate or Shipped)
- Patient

Incorporant
- Raw Material
- Subassembly
- Drug
- Ingredient

Tool
- Machine
- IV Infusion Device
- Food Processing Machine

Fig. 1

DSD Data by Type

| User | Operand |
|---|---|
| Employee<br>  Name<br>  Number<br>Operator<br>  Name<br>  Number<br>Nurse<br>  Name<br>  Number | Product (Intermediate or Shipped)<br>  Serial Number<br>  Model Number<br>  Part Number<br>  Lot Number<br>  Subassembly Number<br>  Manufacture Date<br>Patient<br>  Name<br>  Number<br>  Date of Birth |
| Incorporant | Tool |
| Raw Material<br>  Name<br>  Lot Number<br>  Manufacture Date<br>Subassembly<br>  Name<br>  Model Number<br>  Serial Number<br>Drug<br>  Name<br>  Supplier<br>  Dose<br>  Lot Number<br>Ingredient<br>  Name<br>  Supplier<br>  Lot Number | Machine<br>  Manufacturer<br>  Type<br>  Model Number<br>  Internal Number<br>IV Infusion Device<br>  Manufacturer<br>  Type<br>  Model Number<br>  Internal Number<br>Food Processing Machine<br>  Manufacturer<br>  Type<br>  Model Number<br>  Internal Number |

Fig. 2

| DSD Number | Tool Name | Enabled Flag | Dwell Time (sec.) | Machine Status Flag | User 1 Name | User 1 Number | User 2 Name | User 2 Number | Etc. |
|---|---|---|---|---|---|---|---|---|---|
| 1 | CNC Lathe 1 | 1 | 30 | Off | Jones | 234 | Smith | 456 | ... |
| 2 | CNC Lathe 2 | 1 | 30 | On | Jones | 234 | Smith | 456 | ... |
| 3 | Machining Center | 1 | 30 | Off | Ryan | 789 | Hart | 236 | ... |
| 4 | Paint Booth | 1 | 45 | On | Jacobs | 654 | Brown | 357 | ... |
| 5 | CNC Router | 0 | 30 | Off | Curtis | 407 | Brown | 357 | ... |
| ... | | 0 | 0 | 0 | | | | | |
| 255 | | 0 | 0 | 0 | | | | | |

182

| Operand | Process 1 | Condition 1 | Condition 2 | Condition 3 | Incorporant 1 | Incorporant 2 | Incorporant 3 | Etc. |
|---|---|---|---|---|---|---|---|---|
| Part No. 1 | A | R1 | S1 | T1 | | | Subassembly A | ... |
| Part No. 2 | D | | | | Subassembly B | Subassembly C | Part No. 1 | ... |
| Part No. 3 | G | R3 | S3 | T3 | | | Material 1 | ... |
| Part No. 3 | J | R4 | S4 | | Part No. 3 | | Part No. 2 | ... |
| Part No. 4 | M | | | | | | | ... |
| ... | ... | ... | ... | ... | ... | ... | ... | ... |

| DSD Reader Number | User DSDs | Operand DSDs | Incorporant DSDs |
|---|---|---|---|
| 1 | 1 | 1 | 1 |
| 2 | 1 | 1 | 3 |
| 3 | 1 | 1 | 3 |
| 4 | 1 | 1 | 1 |
| 5 | 1 | 1 | 3 |
| 255 | | | |

Fig. 10

| Operand | Incorporant 1 | Condition 1 | Condition 2 | Incorporant 2 | Condition 3 | Condition 4 | Etc. |
|---|---|---|---|---|---|---|---|
| Patient 1 | Patient 1 D.O.B. | Drug 1 | Dose 1 | Dose Rate 1 | | | | ... |
| Patient 2 | Patient 2 D.O.B. | Drug 2 | Dose 2 | Dose Rate 2 | Drug 6 | Dose 6 | Dose Rate 6 | ... |
| Patient 3 | Patient 3 D.O.B. | Drug 3 | Dose 3 | Dose Rate 3 | Drug 7 | Dose 7 | Dose Rate 7 | ... |
| Patient 4 | Patient 4 D.O.B. | Drug 4 | Dose 4 | Dose Rate 4 | Drug 8 | Dose 8 | Dose Rate 8 | ... |
| Patient 5 | Patient 5 D.O.B. | Drug 5 | Dose 5 | Dose Rate 5 | | | | ... |
| ... | ... | ... | ... | ... | ... | ... | ... | ... |

| Operand | Incorporant 1 | Condition 1 | Incorporant 2 | Condition 2 | Process 1 | Condition 3 | Condition 4 | Incorporant 3 | Etc. |
|---|---|---|---|---|---|---|---|---|---|
| Product 1 | Ingredient 1 | Amount 1 | Ingredient 4 | Amount 6 | A | Time 1 | | | ... |
| Product 2 | Ingredient 2 | Amount 2 | Ingredient 5 | Amount 7 | B | Time 2 | | Product 1 | ... |
| Product 3 | Ingredient 1 | Amount 3 | | | B | Time 3 | | Product 1 | ... |
| Product 4 | Product 3 | Amount 4 | Ingredient 4 | Amount 8 | C | Time 4 | Temp 1 | | ... |
| Product 5 | Ingredient 3 | Amount 5 | | | B | Time 5 | | Ingredient 7 | ... |
| ... | | | ... | | ... | | ... | | ... |

INTERLOCK SYSTEM AND METHOD

FIELD OF THE INVENTION

The present teachings relate to access control and manufacturing control and, more particularly, to interlocks which require the input of user, process, and time data in order to operate and for which the system to which these interlocks belong logs this information.

BACKGROUND OF THE INVENTION

Tracking of data associated with a process is often beneficial. For example, data can be collected and analyzed for the purpose of quality control. In a manufacturing environment, the data may consist of measurements of critical product attributes which are sensitive to drift or to unintentional changes of manufacturing parameters. In many processes, the operator has a strong influence on the resultant quality. One example is the spraying of resin during the production of fiberglass reinforced plastics. Another less obvious example is setup for a CNC (computer numerical controlled) machining operation. Even though CNC operations may often be viewed as fully automated, operator controlled setup parameters such as work piece alignment and tool condition affect the quality of the product. For some processes, mistakes can be catastrophic. An example is the chemotherapy intravenous infusion process. If a patient is infused with the wrong drug, a serious reaction or even death could result. It becomes evident that for processes where the operator has a strong influence on the resultant outcome, linking the identity of the operator to process identification or product identification data can be extremely beneficial.

In an industrial setting, associating operator identity with process and product identity allows management to track productivity and quality personnel to determine which individuals make the best product. Once quality personnel know who makes the best product, they can determine what factors are important in making the best product. Plant management can institute a rewards system for the highest productivity or quality. For the chemotherapy infusion process, for example, it might be important to link the patient's name with the drug being infused, the infusion equipment, and the name of the nurse performing the infusion. If liability issues arise in the future, the infusion facility would then have a record establishing their innocence or culpability.

On a larger scale, traceability in the food chain is a problem. Outbreaks of *E-coli* and salmonella need to be traced to their sources in order to contain the outbreaks. In this case, it is important to generate records linking time information with food identification, distribution, processing, and raw food sources.

In an industrial setting, travelers, i.e. paperwork which travels with the product, are one means to associate operator, process, and part information. In this case, an operator might enter time, date, process, and his initials on a traveler already containing product identification. This process might even be computerized and networked with a terminal at each workstation. The problem here is that if workers associate negative consequences with filling out a traveler, some might conveniently neglect to fill in the paperwork or enter data into the computer. Enforcing compliance with something viewed as either trivial or not in the best interest of the worker is likely to be difficult.

In the setting of a chemotherapy infusion lab, patients are routinely issued identification bracelets. Nurses are taught to identify the patient and the drug before proceeding with infusion. Although meant to assure quality, this procedure does not assure accurate record keeping and almost never associates the infusion device with other infusion data.

Food distribution can be tracked to a certain degree with bills of lading. However, a food processor might receive a single ingredient from multiple sources. In such cases, as public health officials work their way down the food chain, their search broadens instead of narrowing. If the processor were able to determine whose tomatoes went into which bottle of ketchup and who put them there, it would be possible to avoid mass quarantines of produce and the economic hardships that such quarantines impose on growers.

SUMMARY OF THE INVENTION

In accordance with the present teachings, in one embodiment, a tracking interlock system comprises a plurality of machine interfaces, a CPU, one or more communications links, a plurality of Data Storage Device Readers, user identification Data Storage Devices (DSDs), operand identification Data Storage Devices, tooling identification Data Storage Devices, software, a database for storing processing data, and at least one database for storing permissions and conditions. Optionally, incorporant identification Data Storage Devices may also be included in the tracking interlock system. A machine interface and a DSD reader may be dedicated to each machine or device performing a process which is to be tracked. The machine interfaces may be connected to the CPU by a communications link which could be a serial bus, a parallel bus, a USB network, a wireless network, or a direct connection signal line, although not limited thereto. Likewise, the DSD readers may be connected to the CPU via a communications link comprising one or more of the above methods. A Data Storage Device can be any data storage medium. Examples include magnetic cards, bar codes, flash memory sticks, smart cards and RFID devices, although not limited thereto. DSD readers are input devices corresponding to the DSD in use. Examples are magnetic swipe readers, bar code scanners, simple USB ports, and RFID readers, although not limited thereto.

Each machine interface comprises a circuit or device capable of decoding information from the communications link and producing an authorization signal. The machine interface also comprises interface machine control circuitry which enables the machine connected to the machine interface to be turned on by the user. After a specified dwell period, typically measured in seconds, the authorization signal can be turned off. Provided the user turns the machine on while the authorization signal is on, the interface machine control circuitry allows the machine to remain on until the user turns the machine off. Once the machine is turned off, it cannot be turned on again until a new authorization signal is generated. Circuits exhibiting this kind of behavior can be constructed from Silicon Controlled Rectifiers or relays, although not limited thereto.

An initialization program may associate machines with DSD readers and machine interfaces. Each DSD reader may be preprogrammed with a unique identification. When a read takes place, the DSD reader may send the DSD reader identification through a communication link to a buffer in the CPU. When invoked, the initialization program may instruct the initialization program user to read a Tool DSD containing the identification of a machine using the DSD reader associated with that machine. When the DSD reader reads the Tool DSD, it might send the machine identification and the DSD reader identification to the CPU. The program then associates the identification of the DSD reader with the identification of the machine. The initialization program might also instruct the initialization program user to set the address of the machine interface associated with the machine to an address associated with the DSD reader. For example, the initialization program user might swipe the Tool DSD for "CNC Machining Center 3" with DSD reader 35. DSD reader 35 might send "35" and "CNC Machining Center 3" to the CPU where the initialization program associates the two pieces of information in a database. The initialization program might then instruct the initialization program user to set the address of the machine interface of "CNC Machining Center 3" to "35." The initialization program may also allow the user to set a dwell time, although not limited thereto. The dwell time is the time period over which the authorization signal is applied to the interface machine control circuitry. In more practical terms, this is the time from the end of data entry in which the operator must turn on the machine.

The tool enabling program governs standard operation of the tracking interlock system. When the tool enabling program detects a read by a DSD reader, it enters the DSD reader identification, the DSD type, the DSD data, the time, and date in a data structure. As shown in FIG. 1, in the case of a manufacturing operation, for example, although not limited thereto, DSD types might be "EMPLOYEE" and "PRODUCT." Here, the employee is the user and the product is the operand. As shown in FIG. 2, employee data might be an employee's name and identification number. Product data might be the part number and serial number. For the case of a chemotherapy infusion suite, DSD types might be "NURSE," "PATIENT," and "DRUG." Here, the nurse is the user, the patient is the operand, and the drug is the incorporant. Nurse data might be the nurse's name and identification number. Patient data might be the patient's name, identification number, and date of birth. Drug data might be the name of the drug, the supplier, the dose, and the lot number. For a food processing operation, DSD types might be "EMPLOYEE," "PRODUCT," and "INGREDIENT." Here, product data might be the product identification, lot number, and the projected manufacture date of the final product. Ingredient data might be the ingredient name, ingredient lot number, and supplier.

The number and types of expected data may reside in databases read by the tool enabling program. So, for the case of a manufacturing operation, as an example, if employee data for a given DSD reader is present in the data structure and the elapsed time is not greater than the allowable read time interval, the program knows to expect product data. If all expected data for a given DSD reader is received within the allotted time, a signal is sent to the machine interface corresponding to the DSD reader. An authorization signal may then be generated by the machine interface and sent to the interface machine control circuitry. When the dwell period has elapsed, the authorization signal can be cut off. At the same time, a record indicating the date, time, machine, user identification data, and operand identification data may be written to a file. The date, time, user identification data, and operand identification data corresponding the DSD reader number can then be erased from the data structure.

By way of example, John Smith operates Machining Center 3 at XYZ Industries. Mary Jones operates Paint Booth 2 in the same plant. DSD reader 9 is associated with Machining Center 3. DSD reader 19 is associated with Paint Booth 2. John Smith needs to machine P/N Widget45, S/N 456. Mary Jones needs to paint P/N Assy3, S/N 789. John removes the Operand (product) identification DSD attached to P/N Widget45, S/N 456 and uses DSD reader 9 to read the Operand (product) DSD. The tool enabling program records the date, Aug. 10, 08, the time, 14:51:32, the part number, Widget45, and the serial number, 456 in slot 9 of the data structure. Mary takes the employee DSD hanging around her neck and reads it with DSD reader 19. The tool enabling program records the date, Aug. 10, 08, the time 14:51:45, and "Mary Jones" in the data structure in slot 19. John Smith reads the employee DSD hanging around his neck with DSD reader 9. The tool enabling program checks to see if any data exists in slot 9 of the data structure. Since data exists and the elapsed time is less than the allotted time for data entry, for example 45 seconds, the tool enabling program enters "John Smith" in the data structure. Since all anticipated data for slot 9 has been received, the tool enabling program sends out a code unique to the machine interface associated with Machining Center 3 on the communications link instructing the machine interface to enable Machining Center 3. A match is detected in the machine interface assigned to Machining Center 3 and, in one embodiment, current is applied to the gates of the SCR circuit. This energizes the relay completing the on/off circuit for Machining Center 3. At the same time, the tool enabling program may write the date, Aug. 10, 2008, the time, 14:51:50, the machine identification, "Machining Center 3," the operator identification, "John Smith," and the part identification, P/N Widget45, S/N 456, to a file. John may now turn on Machining Center 3 by pushing the green "ON" pushbutton mounted on Machining Center 3. After the dwell time, for example 45 seconds, has elapsed, the tool enabling program sends out another code unique to the machine interface associated with Machining Center 3 on the communications link instructing the machine interface to disenable Machining Center 3. This causes the current to the SCR gate to be cut off. However, Machine Center 3 continues to operate because current from the Machining Center 3 on/off control circuit continues to pass through the SCR.

In the meantime, Mary removes the product identification DSD from P/N Assy3, S/N 789 and reads it using DSD reader 19. Because the elapsed time since the first read is less than the 45 second time allotted for data entry, the tool enabling program enters the operand (product) data into slot 19 of the data structure and sends out a code unique to the machine interface associated with Paint Booth 2 instructing the machine interface to turn on the pneumatic interface, thus applying air pressure to the paint sprayer. A match is detected at the machine interface associated with Paint Booth 2 and current is applied to the SCR gate. The operation program writes the date Aug. 10, 08, the time, 14:52:15, the process equipment, Paint Booth 2, the operator name, Mary Jones, and the operand (product) identification information P/N Assy3, S/N 789 to a data file which may be the same data file holding John's data. Mary now pushes the green "ON" pushbutton thus operating the pneumatic interface and applying air pressure to her paint sprayer. After a dwell time of 45 seconds has elapsed, the tool enabling program sends a code unique to the machine interface associated with Paint Booth 2 instructing the machine interface to disenable the pneumatic interface. This causes the current to the SCR gate to be cut off. However, since the control circuit for the pneumatic interface is wired through the SCRs, the SCRs continue to conduct and the pneumatic interface remains active.

When Machining Center 3 is finished with P/N Widget45, S/N 456, John pushes the red "STOP" button mounted on Machining Center 3. This interrupts the current through the SCR and it becomes non-conducting. John cannot turn Machining Center 3 back on unless he reads both a user identification DSD and an operand (product) identification DSD with DSD reader 9. When Mary finishes painting P/N Assy3, S/N 789, she pushes the red "STOP" push button for the pneumatic interface. This interrupts the current through the SCR making it non-conductive. Mary cannot apply compressed air to her sprayer again unless she reads both an employee identification DSD and an operand (product) identification DSD with DSD reader 19.

BRIEF DESCRIPTION OF THE DRAWINGS

In the drawings, similar pieces of hardware are given identical numbers and are differentiated by letters appended to the numbers. For software flow diagrams, significant routines are numbered. Subroutines belonging to a routine are identified by the number of the routine followed by a letter.

FIG. 1 shows exemplary forms of Data Storage Device types and the type of information they might contain.

FIG. 2 shows potential Data Storage Device data by type.

FIG. 9 is an example of an Operand/Incorporant database for a manufacturing operation.

FIG. 10 is an example of a Data Storage Device Totals database.

FIG. 42 shows an example of an Operand/Incorporant database for a hypothetical drug infusion facility.

FIG. 45 shows an example Operand/Incorporant database for a hypothetical food processing facility.

DETAILED DESCRIPTION OF THE INVENTION

Figure 3:
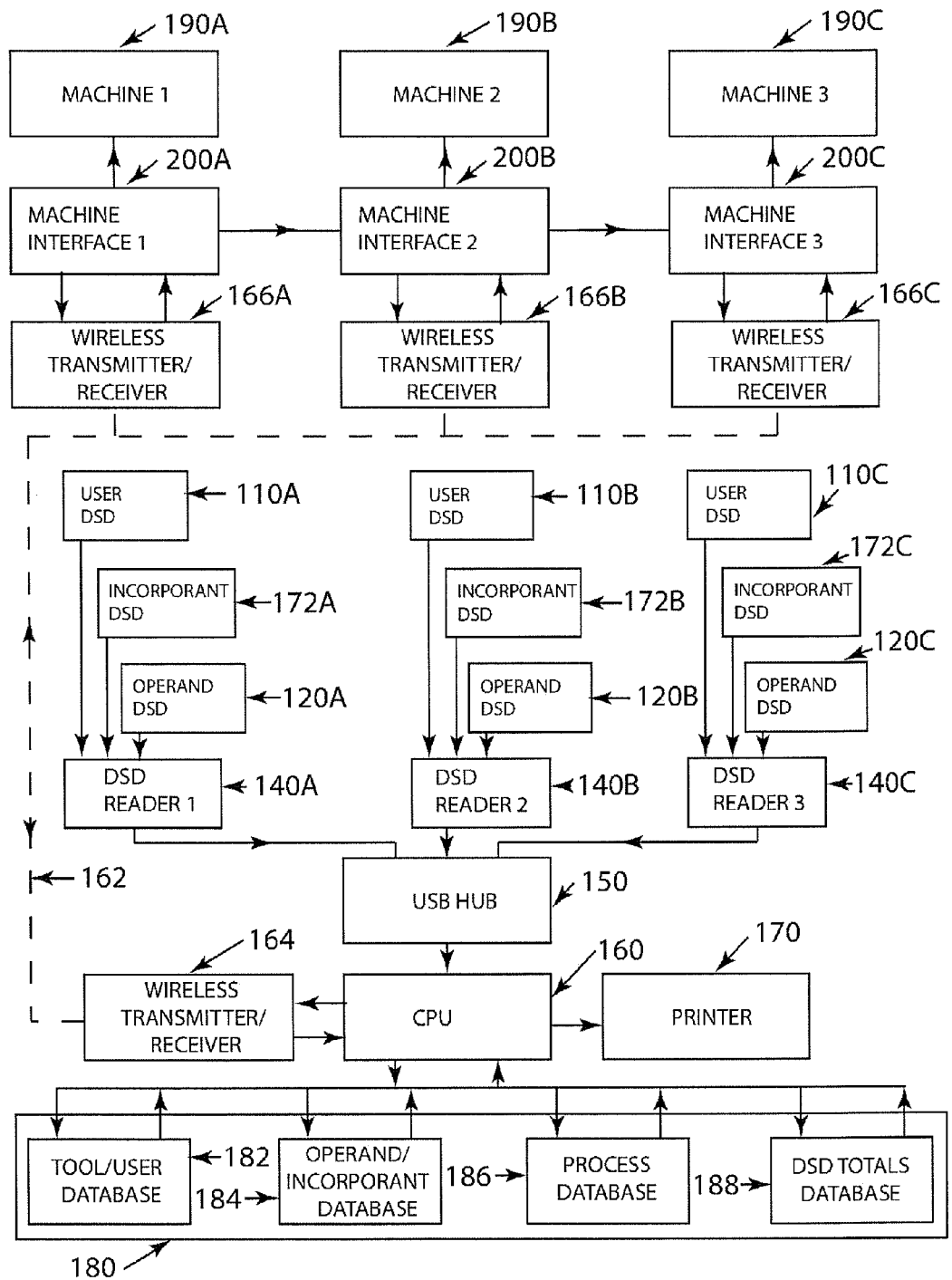
FIG. 3 shows example tracking interlock hardware architecture for a system in which a wireless transceiver is used to communicate with machine interfaces and a USB network is used to communicate with Data Storage Device Readers.

The present teachings are described more fully hereinafter with reference to the accompanying drawings, in which the present embodiments are shown. The following description is presented for illustrative purposes only and the present teachings should not be limited to these embodiments. Any computer configuration and architecture satisfying the speed and interface requirements herein described may be suitable for implementing the system and method of the present embodiments. Where particular technologies and products are listed, they are meant to be instructive and in no way limiting the scope of the teachings. Any particular examples of applications of the system and method are similarly meant to be instructive and should in no way limit the scope of the present teachings.

There is a need for a system of devices which accepts process input and/or output information, associates this information, assigns a time and date to this information and stores a retrievable record of this information. Furthermore, it is apparent that such a system is all the more effective if it does not allow processing to proceed until all required information is entered accurately. Process input information may consist of the operator identification, process identification, or identity of the operand, meaning the product or entity being processed. Of course, it may also consist of more than one of the above. Optionally, it might include the identification of one or more incorporants, meaning materials, parts, or ingredients which are added to the operand. Process output information would generally be identification of the product produced by the process. In a manufacturing setting, this identification might be the same as that of the process input information identifying the operand. In a medical setting, the process output might be the patient. In a food processing facility, several incorporants or ingredients might produce a product with a unique identification. The product information might be input with the incorporant information even though the product does not exist until the incorporants are processed.

Accurate data entry requires the removal of as much human interaction as possible. In many cases, process data will need to be entered multiple times. For example, an operator may need to enter his identification each time he processes a different part. A part or product number may have to be entered each time it undergoes a different process. If identifications are stored on Data Storage Devices (DSDs), identifications can be transferred to the system without error.

A system which does not allow processing to proceed until all required information is entered implies the use of an interlock. Association of various classes of data, e.g. user, process, and operand, with date and time and the creation of an audit trail suggests the use of an intelligent system employing a computer. Data identifying the process and its inputs is best input from the location where processing occurs. Networking of the process input/output components of the system extends tracking to a plurality of processes without introducing costs associated with dedication of a computer to each process.

In cases where traceability from raw materials through finished product is important, one must consider the possibility that intermediary products are shipped from plant to plant between distinct companies. In such cases, it is necessary to make sure that product identification travels with the product, is entered into the system by the facility receiving the product, and that product identification entry cannot be bypassed.

Much of the pertinent literature lies in the field of access control. By its very nature, access control entails the use of interlocks. Examples include securing entry to rooms in an industrial environment, mail boxes, lockers, hotel/motel doors, minibars, laundromats, and home rental appliances. Moorman et al., U.S. Pat. No. 3,866,173, Wada et al., U.S. Pat. No. 4,780,806, Lemelson, U.S. Pat. No. 5,548,660, Ellsberg, U.S. Pat. No. 4,698,630, Kaarsoo et al., U.S. Pat. No. 5,475,378, Brous et al., U.S. Pat. No. 5,345,379, Bicknell et al., U.S. Pat. No. 7,164,956, Middlemiss, U.S. Pat. No. 4,644,104, Timson et al., U.S. Pat. No. 6,041,412, Richards et al., US Patent Application 20040008582, Asher et al., U.S. Pat. No. 5,567,926, Palmer, Jr. et al., U.S. Pat. No. 4,700,296, and Bensimon et al., U.S. Pat. No. 6,809,628 disclose these applications. None of these applications explicitly collects operand or product data. Nor do they allow both hands free operation of the device and the ability to turn off the device at a time of the operator's choosing. For example, in the case of an interlocked door, the operator must hold open the door to control the amount of time access is allowed. For a laundromat or home rental appliance, access is allowed for a set period of time which the user cannot vary.

Lovrenich, U.S. Pat. No. 5,121,331, teaches a "Method and Apparatus for Tracking a Workpiece Through a Multi-Station Machine." A station computer is dedicated to each station of the machine and an orchestrator computer communicates with each station computer. Implicit to Lovenrich's invention is the automated transfer of parts from one station to the next. A database uses part position to indicate which part and part processing record is associated with which station. The part processing record is examined and further processing is prevented in the event that all prerequisites have not been met. The system described by Lovrenich cannot meet all of the requirements set forth herein for a tracking interlock system. For example, although Lovrenich's invention associates process and product data, there is no provision for associating these data with the machine operator. Because parts are associated with processes by their position in a machine, integration of data between plants or companies is difficult. In addition, the dedication of a computer to each processing station is an expensive undertaking.

Godfrey et al., U.S. Pat. No. 6,839,604, disclose a method for tracking compliance. In this method, a memory travels with the product. After each process, a code is written to the memory to indicate that the process has been successfully completed. The memory may also be read at the work station. Reads and writes can be performed automatically, meaning that no manual intervention is required. Reading the memory after processing indicates whether all required processes have been completed. Like Lovrenich's invention, that of Godfrey et al. associates process and product data. However, it makes no provision for associating operator data with product data. The requirement that no manual intervention be required for reading or writing implies that proximity of the memory to the work station is used to identify the part being processed. The only fail proof means of associating the proper memory, part, and process is to provide a carrier with memory securely attached to the product during and until all processing is completed. This makes processing awkward at best. Consider a machining process in which cutting fluid is required. The invention of Godfrey and others relies upon devices capable of writing data to memories. This entails extra cost as reader/writers are generally more expensive than just readers alone. In addition, the invention of Godfrey et al. makes no provision for inhibiting a process.

Brandt et al., U.S. Pat. No. 7,298,275, disclose a method for associating a controller with a machine. The controller is a hand held wireless information device which can be used with a plurality of machines. The association is accomplished through proximity of the controller with the machine and selection of the machine from a menu. The controller is used to view machine generated data and possibly to change machine parameters. The invention of Brandt et al. does not form associations with operator and product data and cannot easily be altered to do so.

Vereen, U.S. Pat. No. 4,509,123, describes a manufacturing and inventory record system for the tracking of garments. At the beginning of the manufacturing process, a unique machine readable label is attached to each garment. Readers, interfaced to a computer, track the garments throughout the manufacturing and inventory processes. The tracking process, in effect, associates a manufacturing or inventory process with a garment and may also associate a time and date. What it does not do is to associate a user, or raw materials identity with a process. Neither does it preclude processing in the event that all data have not been collected.

Monette et al., U.S. Pat. No. 7,069,100, disclose a comprehensive "Automated Manufacturing Control System." This system identifies components for processing, determines discharge routing, manages inventory, determines processing equipment configuration, collects process data including process identification, time and date, part identification, and raw materials identification. Use of the system for tracking of data between distinct facilities is even addressed. Although neither mentioned in the specification nor depicted in the drawings, one dependent claim claims the collection of operator data. However, Monette et al. does not preclude processing if all required data is not collected.

Accordingly, several objects and advantages of the present teachings are (a) to provide a system which acquires user identification data;

(b) to provide a system which acquires operand identification data;

(c) to provide a system which acquires process identification data;

(d) to provide a system with the optional capability of acquiring incorporant identification data;

(e) to provide a system which stores individual operator data on individual user Data Storage Devices;

(f) to provide a system which stores individual operand data on individual operand Data Storage Devices;

(g) to provide a system which has the optional capability to store individual incorporant data on individual incorporant Data Storage Devices;

(h) to provide a system which associates process identification data, user identification data, operand identification data, time the process was performed, and date the process was performed;

(i) to provide a system which optionally associates incorporant identification data with user, operand, and process data, and the time and date the process was performed;

(j) to provide a system which stores the above associations in a format which can be retrieved, analyzed, and printed;

(k) to provide a system which enables a process only after all required data has been input, allows the user to commence the process, and allows the user to terminate the process regardless of the process duration;

(l) to provide a system which will not allow the operator to commence a process anew after it has been terminated unless all new required data has been input;

(m) to provide a system which achieves all of the prior objectives for a plurality of processes at the same time;

(n) to provide a system which preserves traceability between remote facilities;

(o) to provide a system which does not allow the process to proceed unless the user is authorized to perform the process;

(p) to provide a system which prevents the processing of incorrect operands or incorporants; and (q) to provide a system which is readily adaptable to a wide range of processing environments.

A further object and advantage is to achieve the above objects and advantages in an economical manner which does not compromise safety or quality.

The overall system architecture for a preferred embodiment of the tracking interlock system hardware is shown in FIG. 3. There may be one or more input devices 140A, 140B, 140C, capable of reading multiple User Data Storage Devices (DSDs) 110A, 110B, 110C, multiple Operand DSDs 120A, 120B, 120C, and multiple Incorporant DSDs, 172A, 172B, and 172C. The DSDs, 110, 120, and 172, are preferably magnetic swipe cards, although they could also be any other readable, portable storage medium including, but not limited to, bar codes, RFID devices, smart chips, flash memory, or punch cards. The input devices 140, are capable of reading the types of DSDs in use. The input device is preferably, though not necessarily, a MSR210U magnetic swipe reader manufactured by Uniform Industrial Corporation. There may be one or more input devices 140, associated with each machine 190A, 190B, 190C, for which tracking data is desired. The multiple input devices 140 may be connected to a CPU 160, via a USB hub 150. The CPU 160 may communicate with a file storage capability 180, such as a hard drive or on-line storage service, although not limited thereto, in which a Tool/User database 182, an Operand/Incorporant database 184, and a DSD Totals database 188, reside. The Tool/User database 182 and Operand/Incorporant database 184, optionally contain both processing conditions and permissions. Also residing in the file storage capability 180 is the Process database 186, in which the tracking data is stored. The CPU 160 may also be connected to a printer 170 for the purpose of printing tracking data. In the preferred embodiment, a wireless connection comprising wireless transmitter/receivers in communication with the CPU 164 and the machine interfaces 166 provides a communication link 162 between the CPU 160 and the machine interfaces 200A, 200B, 200C. As shown, there may be one machine interface 200 for each machine for which tracking data is desired.

In the preferred embodiment, the CPU 160 sends data to the machine interface using devices such as a Reynolds Electronics CIP-8E encoder and a Reynolds Electronics TWS-434 RF transmitter, although not limited thereto. The encoder accepts seven bits of address data and eight bits of regular data. Through the use of two SN74LV9183 serial to parallel converters, although not limited thereto, the CPU can provide address and regular data to the CIP-8E encoder through a serial or USB port. In this configuration, by using all 15 bits a total of 32,768 machine interfaces can be addressed. Using all seven address bits and one data line allows 256 machine interfaces to be addressed. The CIP-8E encoder converts the address and data information into a serial format which is transmitted by the TWS-434 RF transmitter.

Figure 5:
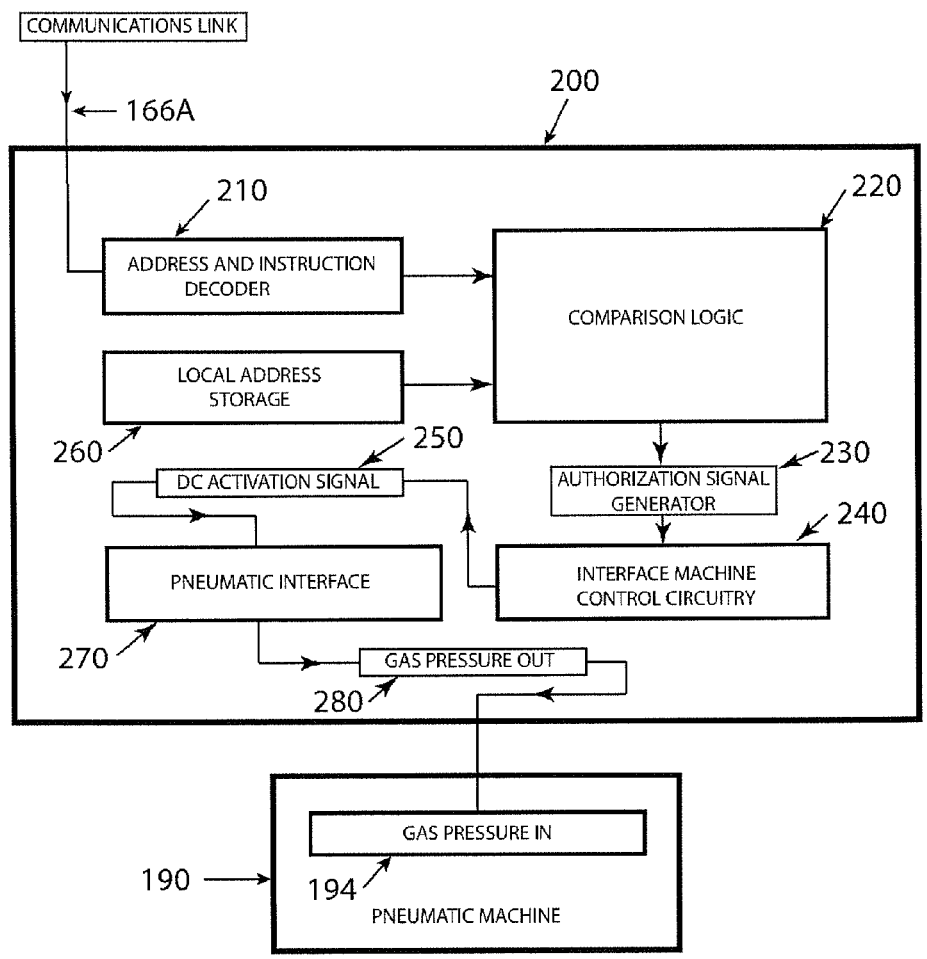
FIG. 5 is a block diagram of an exemplary machine interface for controlling a pneumatic device.

A block diagram of the Machine Interface is shown in FIG. 5. The communications link 166 is led into the address and instruction decoder 210. In a preferred embodiment, the communications link 166 is an RWS-434 RF receiver available from Reynolds Electronics, although not limited thereto. The address and instruction decoder 210 may be a CIP-8D decoder, also available from Reynolds electronics. Like the CIP-8E encoder, the CIP-8D decoder has seven address lines and eight data lines. If the seven address bits on the CIP-E encoder match the seven address bits sent by the CIP-8D decoder, the CIP-8D decoder will receive the eight data bits sent by the TWS-434 RF transmitter. In a preferred embodiment, local address storage 260 is accomplished using an eight switch DIP tied to +5 V and ground. Seven of the eight switches on the eight position DIP switch are tied to the address lines of the CIP-8D decoder. The heart of the comparison logic 220 is an exclusive or logic gate which is used to determine whether the one data bit matches the state of the eighth switch. The output of the comparison logic 220 serves as input for the authorization signal generator 230. If a match occurs, input to the authorization signal generator 230 is used to trigger a 555 timer configured as a monostable multivibrator. The output pulse from the 555 timer is used to trigger a flip flop. The flip flop output is directed to the interface machine control circuitry 240.

Figure 6:
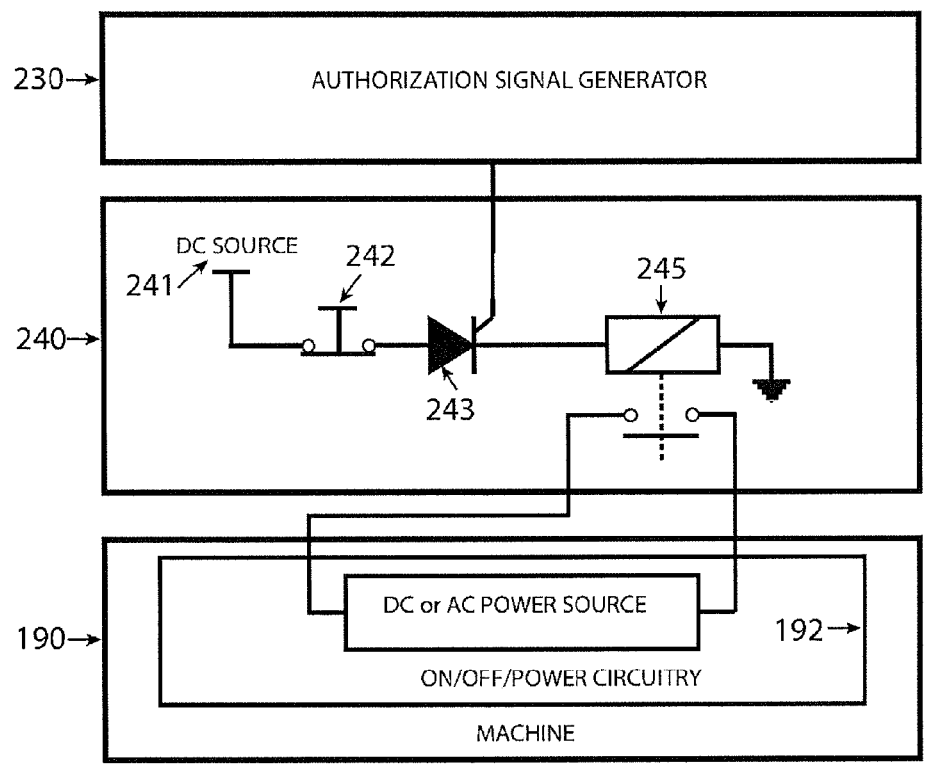
FIG. 6 is a schematic of a simple circuit which when energized, enables a machine to be turned on by the user and allows the machine to remain on until the user turns it off.

A preferred embodiment of the interface machine control circuitry is shown in FIG. 6. In its simplest form, the interface machine control circuitry comprises a DC power source 241, a normally closed pushbutton switch 242, a Silicon Controlled Rectifier (SCR) 243, and a normally open relay 245. The contacts of the relay complete the power circuit 192, for the machine 190 being controlled by the machine interface 200. The output of the authorization signal generator 230 is connected to the gate of the SCR 243. When a DC voltage is applied to the gate of the SCR 243, the SCR conducts current thus energizing the coil of the relay 245 and completing the power circuit 192 of the machine 190. After the DC voltage is removed from the gate of the SCR 243, the SCR continues to conduct current until the pushbutton switch 242 is momentarily opened.

Figure 7:
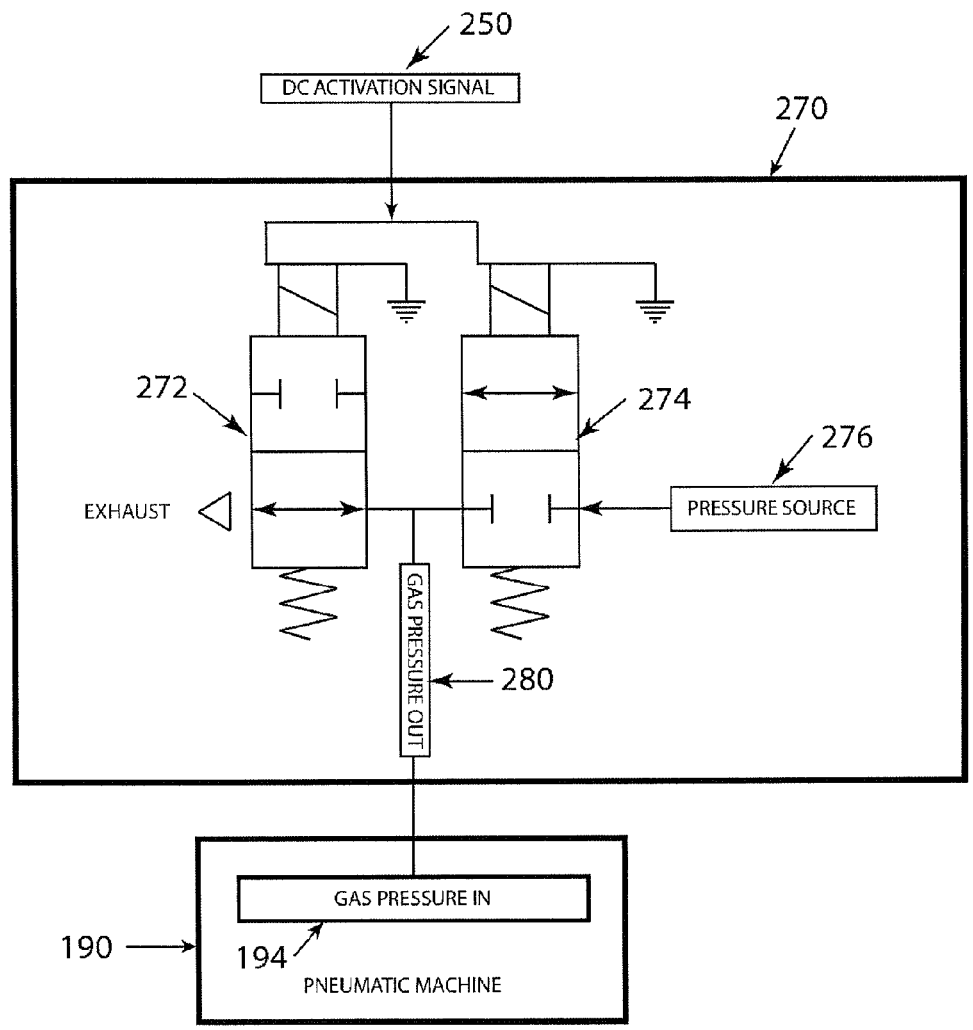
FIG. 7 is a schematic of the pneumatic interface shown in FIG. 5.

Referring once again to FIG. 5, the machine interface can be used to control pneumatic machinery. The output of SCR 243 in FIG. 6 can be used to drive solenoid valves rather than the relay 245 of FIG. 6. In FIG. 5, the DC activation signal 250 is the output of SCR 243 in FIG. 6. The pneumatic interface 270 of FIG. 5 is shown in FIG. 7. It consists of two solenoid valves 272 and 274. Solenoid valve 274 is normally closed, whereas solenoid valve 272 is normally open. A pressure source 276 is applied to the input port of solenoid valve 274. The output of solenoid valve 274 is applied to the input of solenoid valve 272 and the pneumatic machine 190. The output of solenoid valve 272 is led to exhaust. When the activation signal 250 is applied to the coils of solenoid valves 272 and 274, pressure is applied to the pneumatic machine 190. When the activation signal 250 is cut off, solenoid valve 274 isolates the pressure source 276 and solenoid valve 272 vents the gas pressure 280 and 194.

Figure 8:
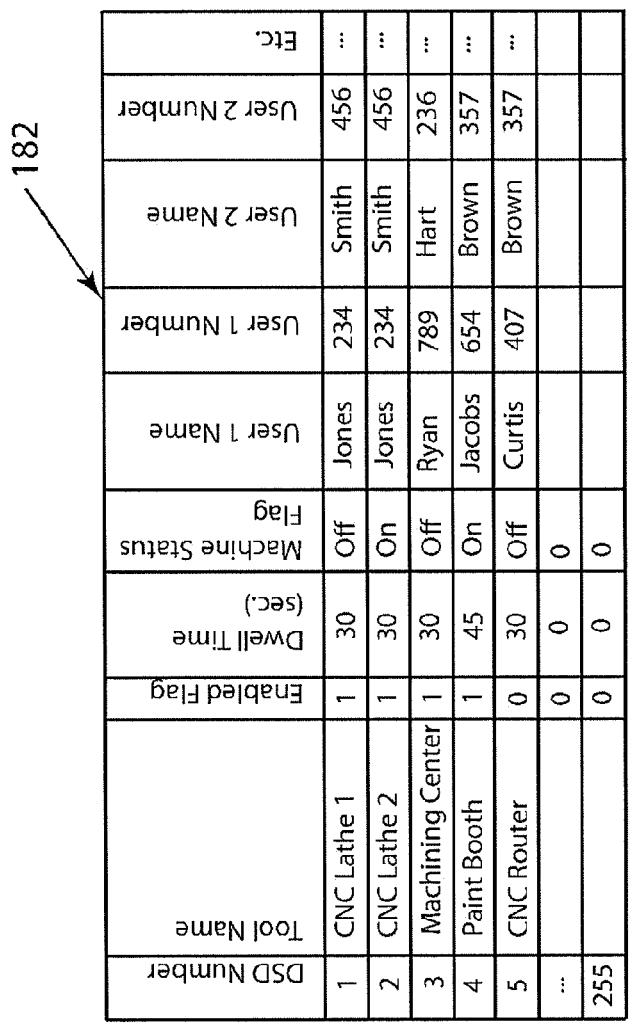
FIG. 8 is an example of a Tool/User database for a manufacturing operation.

Three computer programs may be used for operation of the tracking interlock: an initialization program; a tool enabling program; and a program to write information to DSDs. These computer programs may interface with four databases: a Tool/User database 182, an Operand/Incorporant database 184, a process data database 186, and a DSD Totals database 188. An example of a Tool/User database 182 is shown in FIG. 8. Associated with each DSD reader which has been initialized is a tool name, an enabled flag, and a dwell time. The enabled flag indicates that the tool can be enabled by the tracking interlock system and that the tool data should be displayed by the initialization program. The dwell time is the time in seconds available to the user to turn on the tool after the last DSD has been read. Also shown in the Tool/User database are machine status flags, authorized users, and user numbers. The machine status flag indicates whether a given machine is enabled to be turned on. If a facility does not require that users be authorized to operate a piece of equipment, this feature may be disabled.

An example of an Operand/Incorporant database 184, for a manufacturing operation is shown in FIG. 9. There will always be at least one operand. Optionally, there may be one or more incorporants. Generally, the operand will be a part number. The incorporant may be a material, a subassembly, or a part number, although not limited thereto. Also contained in the Operand/Incorporant database are processing conditions. By way of example, Part No. 1 undergoes Process A, using conditions R1, S1, and T1. This might be a machining operation for example. Next, Part No. 1, Subassembly C, and Subassembly B are combined using Process D to make Part No. 2. Process D might be an assembly or welding operation. In the next line of the database, Material 1 is subjected to process G using conditions R3, S3, and T3. Again, this might be a machining process. The same part, Part No. 3 then undergoes process J. This might be a heat treatment where condition 1 is the temperature and condition 2 is the time. Finally, Part No. 2 and Part No. 3 undergo process M, an assembly operation. Of course, if there is no need to confirm materials or processing conditions prior to processing, the Operand/Incorporant database may be eliminated. Tracking would then proceed, as before, through the reading of appropriate DSDs.

The process data database 126 may contain records of processes and when they were performed. For each operation which is performed, the record of the operation may include some or all of the following although not limited thereto: the date and time; the information contained on the User DSD; the information contained on the Operand DSD; the information contained on any Incorporant DSDs; and the process identification.

An example of a DSD Totals database 188 is shown in FIG. 10. This database tells the program how many and what kinds of DSDs to expect for each DSD reader.

Figure 11:
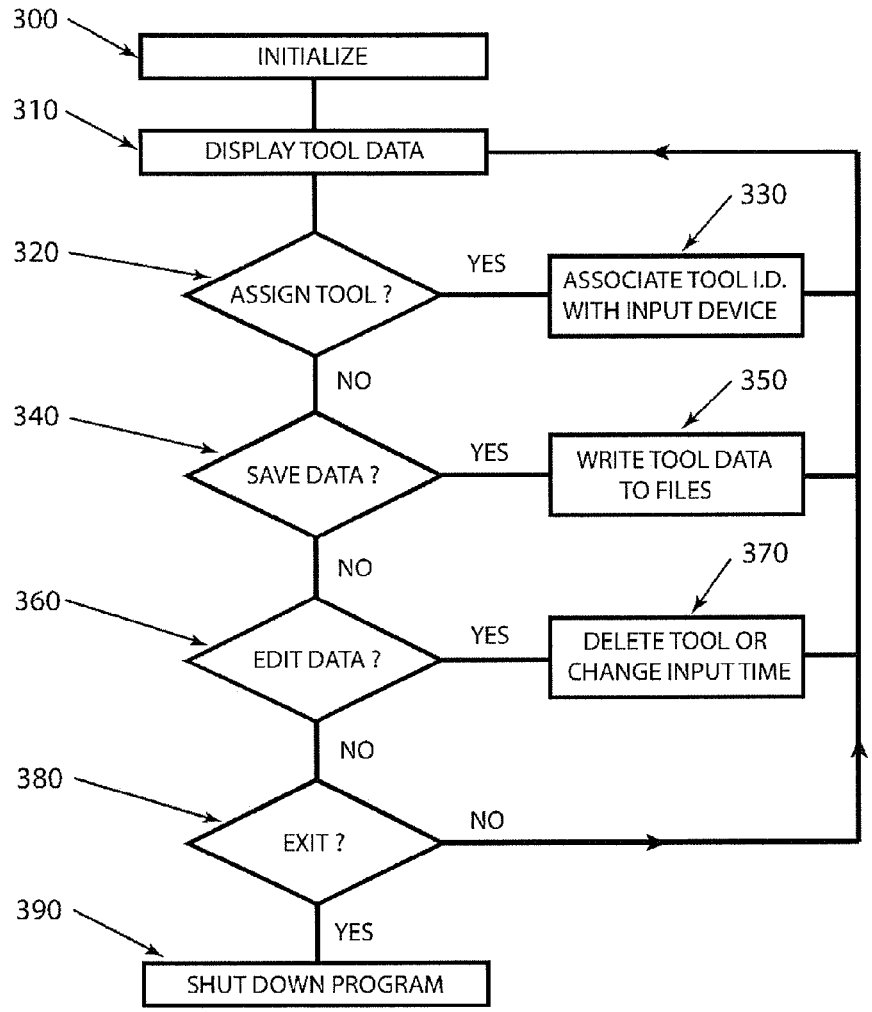
FIG. 11 is a condensed flow chart of an example of the initialization program.

The initialization program associates a machine with a DSD reader and a machine interface. A generalized flow chart for one embodiment of the initialization program is shown in FIG. 11. After initialization, block 300, the program displays relevant data, block 310, corresponding to each machine for which a machine interface has been assigned.

The user may then be presented with a series of choices. Block 320 of the code asks the user whether he wants to assign a tool to a machine interface and input device. If the user responds affirmatively, block 330 of the code performs the assignment and prompts the user to perform the necessary manual steps. Block 340 of the code asks the user whether he wants to save tool assignment data. An affirmative response causes the program to write tool assignment data to files containing the Tool/User database using block 350. Block 360 of the code asks the user whether he wants to edit existing data. An affirmative response directs the program to block 370 of the code in which the user may delete a machine or change the time for which current is applied to the gates of the SCRs in the machine interface. Block 380 of the code asks the user whether he wants to exit the program. An affirmative response may direct the code to block 390 which shuts down the program.

Figure 12:
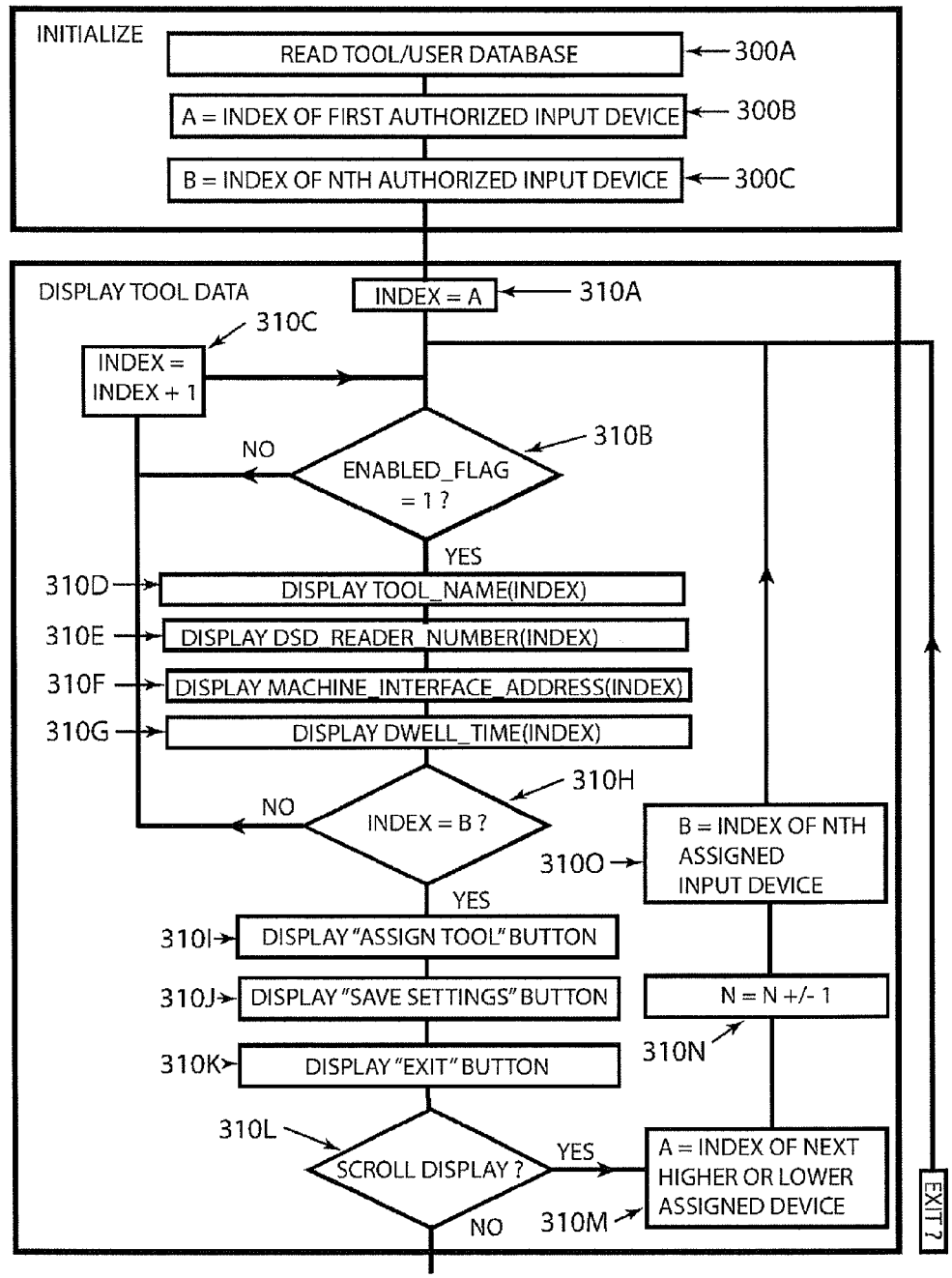
FIG. 12 is the first of five pages of a detailed flow chart of the exemplary initialization program.

A detailed flow chart of one embodiment of the initialization program is shown in FIGS. 12 through 16. The initialize segment of the code 300 is shown in FIG. 12 as steps 300A-300C. DSD reader numbers may range from 1 through 255. Zero may be reserved as a reset code. Many input devices are capable of sending identification to their host CPU. In the preferred implementation, the input device can be a MSR210 magnetic swipe card reader, although not limited thereto. Using software provided by the manufacturer, the user can program unique identification information into each reader. When the user swipes a magnetic swipe card in the MSR210, this input device sends its identification information and the information contained in the magnetic swipe card. In step 300A, the machine name, enabled flag, and dwell time are recalled from Tool/User database 182 as a function of the DSD reader number. The first authorized or assigned DSD reader is identified in step 300B. The nth authorized or assigned DSD reader is identified in step 300C.

Block 310 of the code displays machine or tool data. Steps 310A-310H examine the Tool/User database from the first authorized input device to the nth authorized input device and display the machine name, the corresponding DSD reader number, the machine interface address, and the dwell or input activation time for each assigned input device. Continuing with FIG. 12, steps 310I-310K display buttons which allow the user to assign a machine and machine interface to an input device, save the current settings, or exit the program. Steps 310L through 310O allow the user to scroll the display. When the user clicks a scroll arrow, the high and low display indices can be either incremented or decremented and the display is regenerated.

Figure 13:
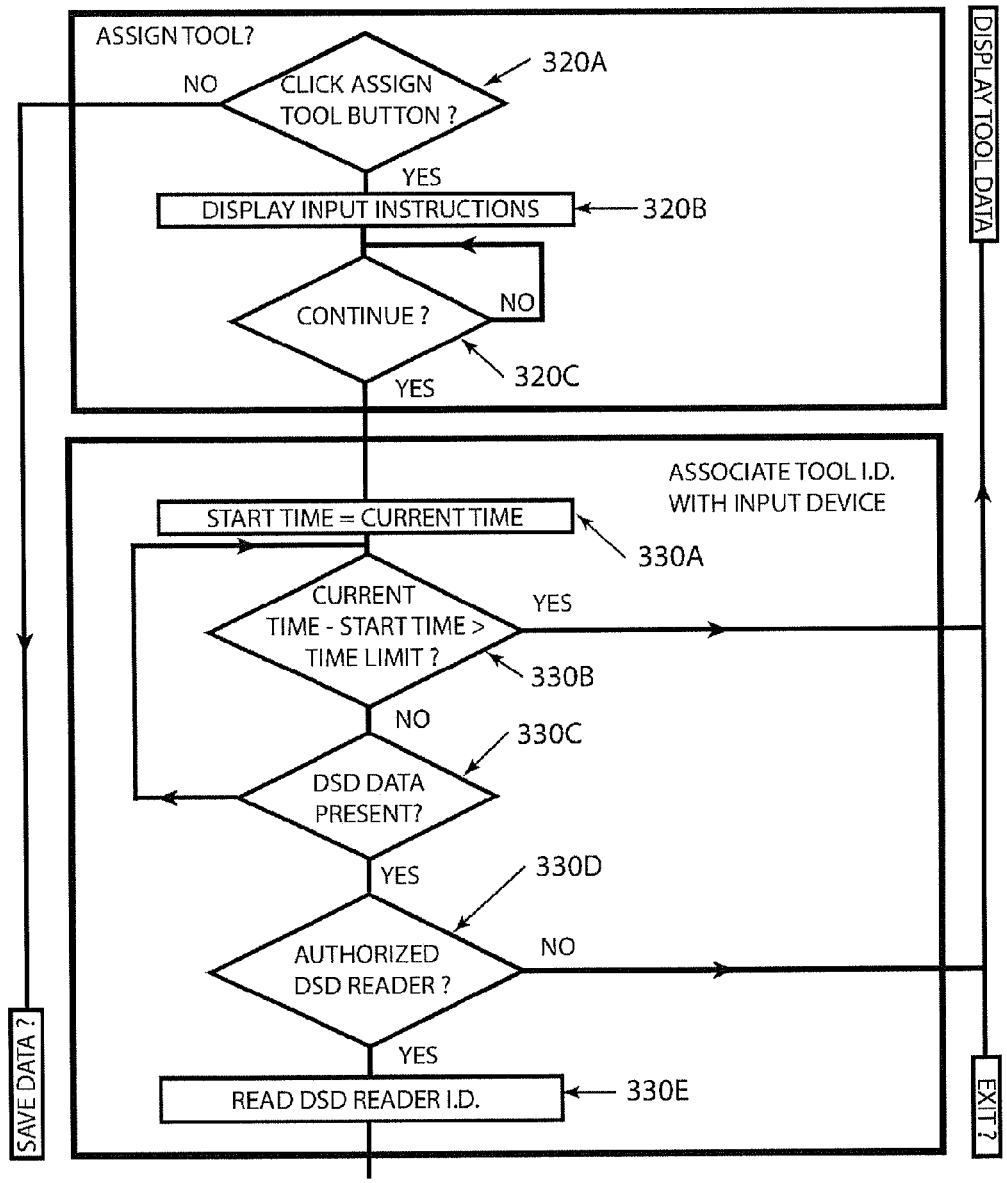
FIG. 13 is the second of five pages of a detailed flow chart of the initialization program.

Referring to FIG. 13, step 320A detects whether or not the user has clicked the assign tool button. If the user has clicked the button, step 320B generates a display instructing the user to read a Tool DSD containing the name of the desired machine with the DSD reader associated with that machine. The user can then click the continue button displayed in step 320C to continue.

Block 330 of the code associates the identification of the machine with the DSD reader and instructs the user as to how to properly set the machine interface address. Step 330A starts a timer. Step 330B determines whether the elapsed time is greater than a predetermined time limit, different from the dwell time referred to above. If it is, the program redisplays the tool data. If the elapsed time is within the allowable limit, the program proceeds to step 330C in which it looks for incoming data. If input data is present, the program determines whether the data corresponds to an authorized input device using code segment 330D. If not, the program returns to the Display Tool Data block of code, 310. If the program recognizes the input device, it then uses code segment 330E to read the input device identification number. Continuing with FIG. 14, code segment 330F of the program determines whether or not the DSD content is a Tool DSD input. If so, it executes steps 330G-330I where it reads the machine name, enters the machine name in the Tool/User database, and displays the machine name. If not, it executes steps 330J and 330K where it displays an invalid input message and sets the enabled flag for the input device to zero. Step 330L displays a continue button. When the user clicks on the continue button, instructions as well as a figure showing the setting for the machine interface address are displayed. At this point, the person running the initialization program would physically set the address DIP switch in the machine interface to the settings displayed on the video monitor. Step 330N displays another continue button. When the user clicks on this button, the program returns to the Display Tool Data display, 310.

Figure 14:
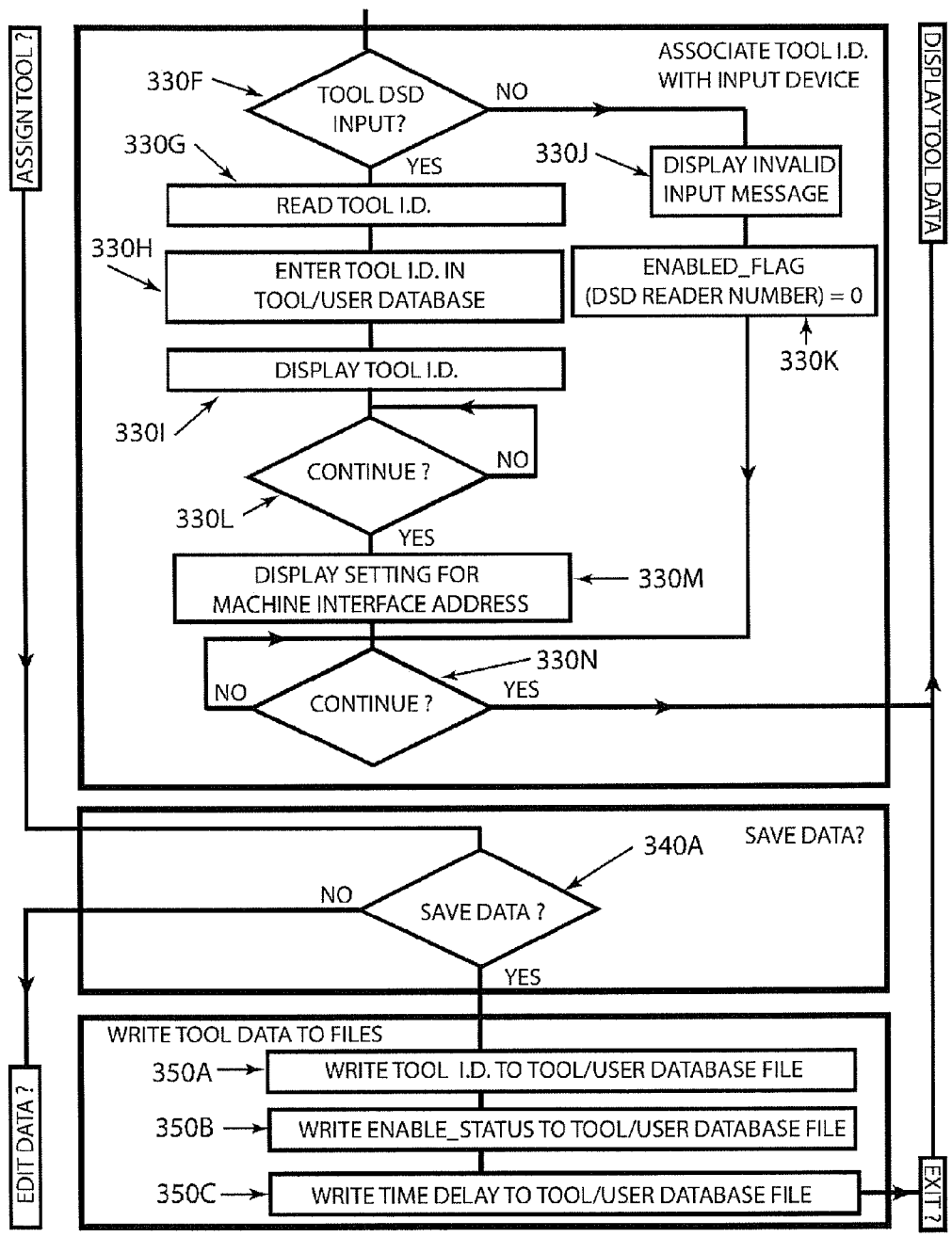
FIG. 14 is the third of five pages of a detailed flow chart of the initialization program.

Continuing with FIG. 14, code segment 340A allows the user to decide whether or not to save the settings he has established. If his response is affirmative, code segments 350A-350C are executed. These code segments may write machine names, enabled flags, and dwell times to the Tool/User database files in positions corresponding to their respective DSD reader numbers.

Figure 15:
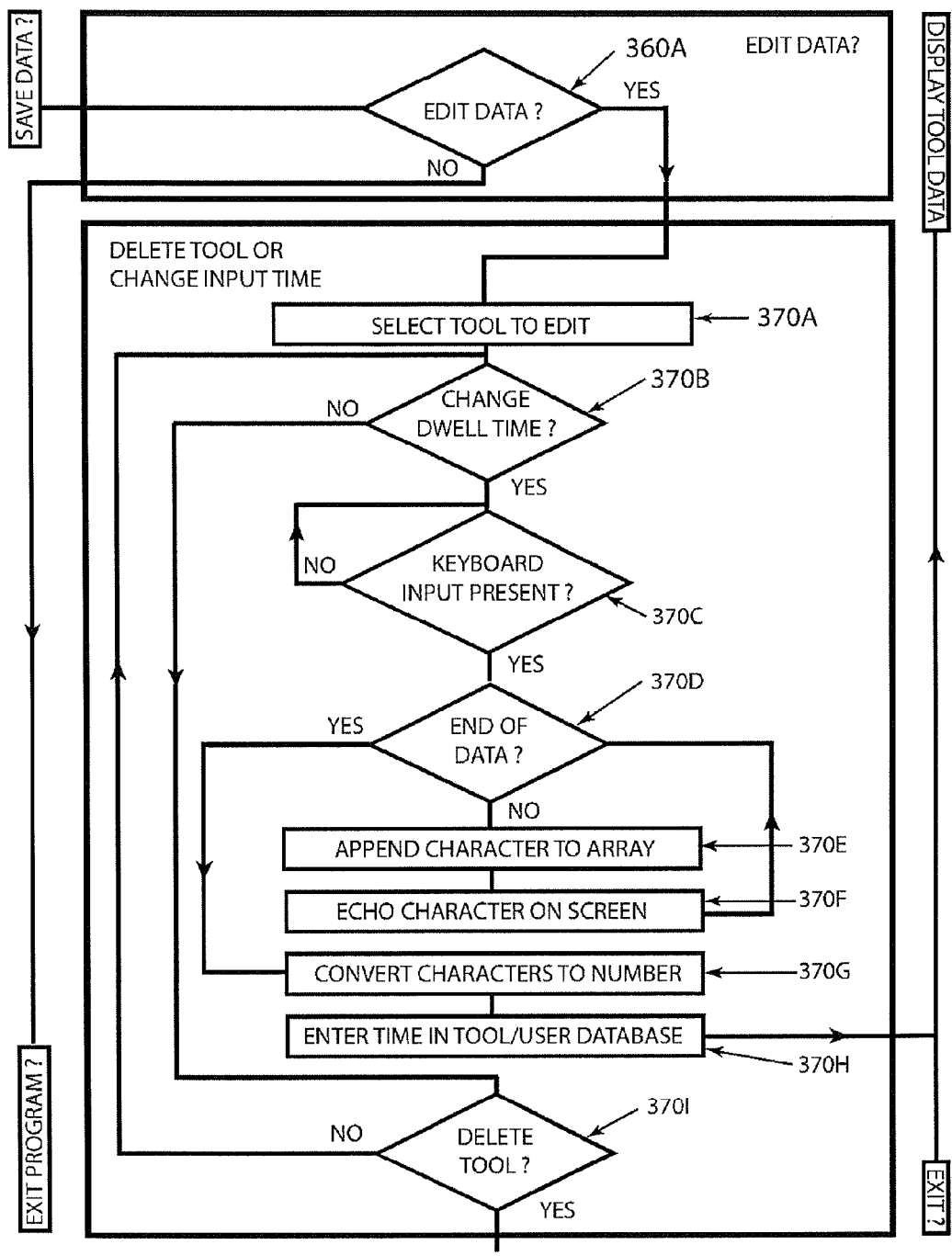
FIG. 15 is the fourth of five pages of a detailed flow chart of the initialization program.
Figure 16:
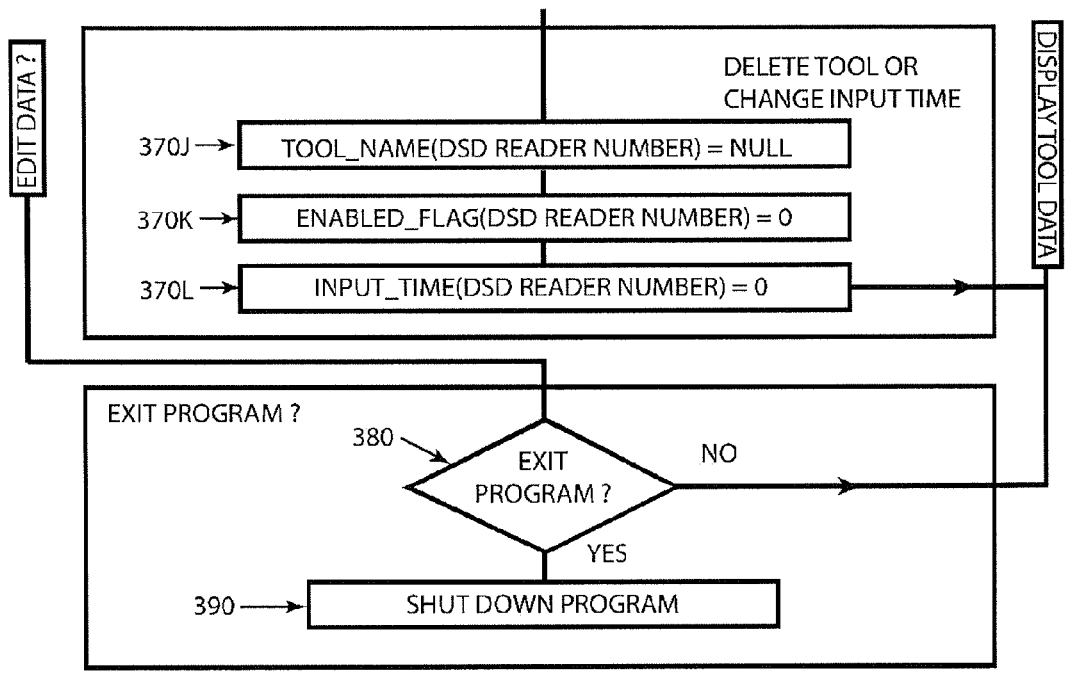
FIG. 16 is the fifth of five pages of a detailed flow chart of the initialization program.

Referring to FIG. 15, code segments 360A and 370A allow the user to decide whether to edit data and to select the tool for which to edit data. The user starts the editing process by clicking on the tool in the tool display. The user may then be presented with choices such as: change the dwell time or delete the tool. Code segment 370B allows the user to decide whether to change the dwell time. If this option is selected, code segment 370C looks to see if keyboard data is present. Code segment 370D then checks for a delimiter signifying the end of the data. If the end of the data has not been reached, code segments 370E-370F append the next character to an array and echo the character on the screen. Once the end of data has been detected, code segments 370G-370H convert the characters in the array to a number and enter this number in the Tool/User database as a time.

Code segment 370I allows the user to decide whether or not to delete a tool-input device association. Continuing with FIG. 16, if the user selects delete tool, the program will execute code segments 370J-370L. These null the tool name associated with the input device number in the Tool/User database, set the enabled flag for the DSD reader number equal to zero, and set the dwell time equal to zero. After these actions are completed, the program can return to the Display Tool Data block, 310.

Code block 380 allows the user to exit the initialization program. Selecting this option executes code block 390 which shuts down the program.

Figure 17:
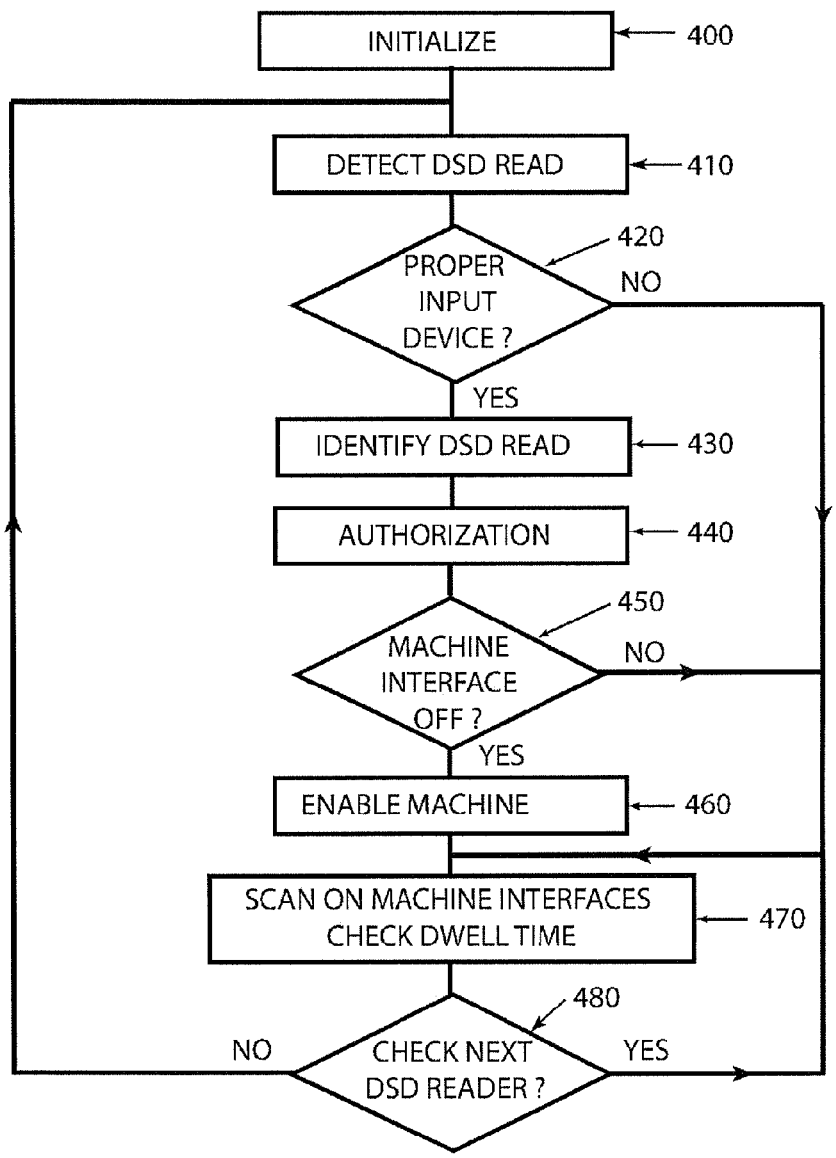
FIG. 17 is a condensed flow chart of an example of the tool enabling program.
Figure 18:
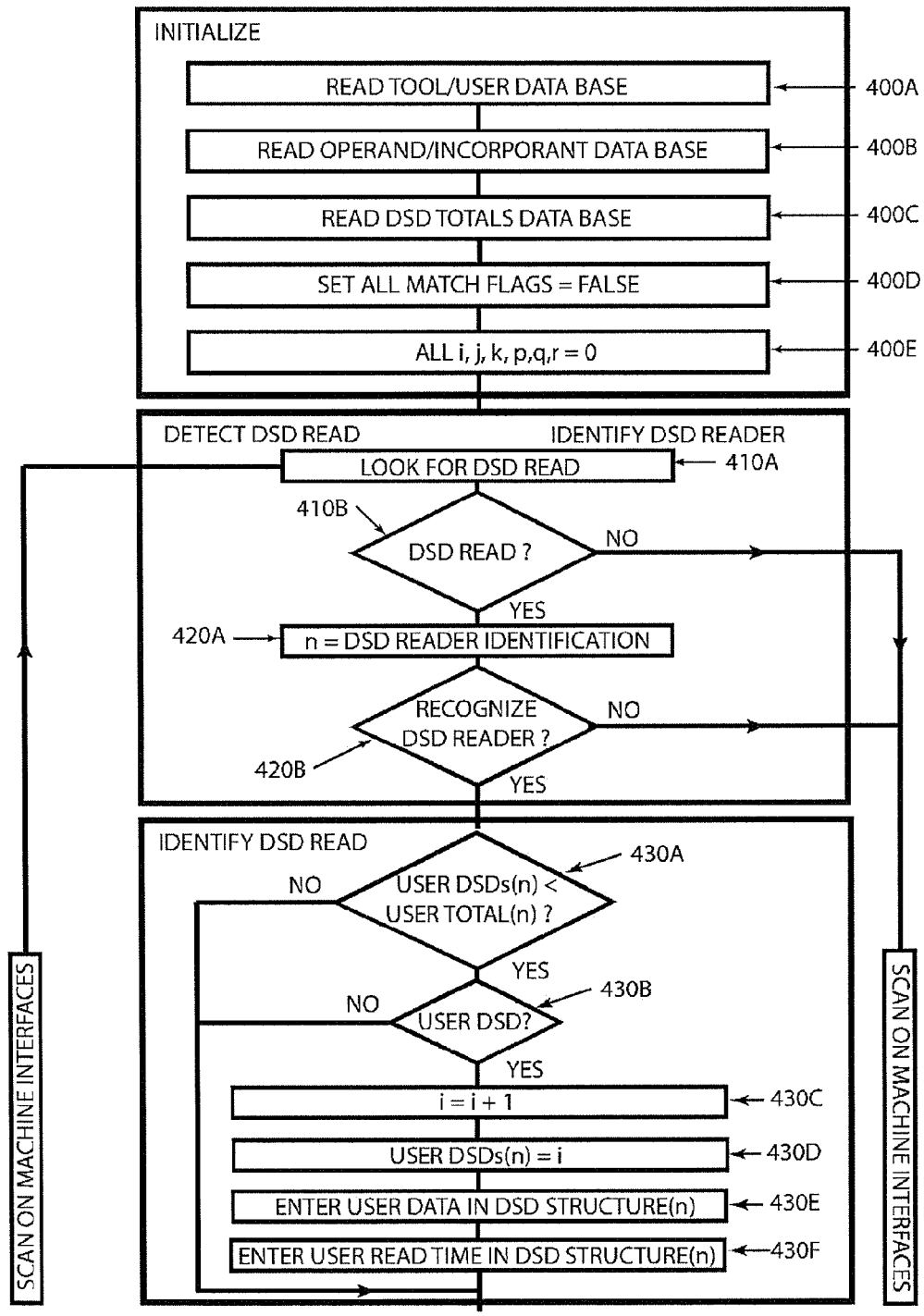
FIG. 18 is the first of five pages of a detailed flow chart of the exemplary tool enabling program.

The tool enabling program manages the operation of the various machine interfaces and input devices. A generalized flow chart for one embodiment of the tool enabling program is shown in FIG. 17. The initialize portion of the program 400 reads in the Tool/User, Operand/Incorporant and DSD Totals databases. Code block 410 detects the presence of DSD data. Code block 420 determines whether the DSD reader is a valid device. If not, the program is directed to code block 470. Next, code block 430 determines what kind of DSD has been read and captures the information on the DSD. Code block 440 checks the Tool/User and Operand/Incorporant data bases to determine whether the user, operand, and incorporants are authorized. Code block 450 accesses the Tool/User database to determine whether the machine interface in question is off, and whether a User DSD and Operand and Incorporant DSDs have been read within the allowed time limit. If these conditions have all been met, code block 460 can send out a signal enabling the machine interface which in turn enables the machine to be turned on. Next, code block 470 scans the Tool/User database for all possible machine interfaces which may be on. For any that are on, code block 470 then checks to see if the dwell time has been exceeded. If the dwell time has been exceeded, code block 470 disenables the machine interface. Code block 480 determines whether all possible machine interfaces in the Tool/User database have been examined. If not, information for the next machine interface is examined. If all machine interfaces have been examined, code block 480 returns control to code block 410 which searches for more DSD data.

A detailed flow chart of one embodiment of the tool enabling program is shown in FIGS. 18-22. In code segment 400A of the Initialize block, the program reads the Tool/User database. Code segment 400B reads in the Operand/Incorporant database. In step 400C, the program inputs the DSD Totals database, an example of which is shown in FIG. 10. This database tells the program how many and what kind of DSD to expect for each DSD reader. Step 400D sets all match flags to false. Match flags may be used to tell the program whether DSD data matches data contained in the Tool/User and Operand/Incorporant databases. In code segment 400E, various indices used in the program are set to zero.

Code block 410 detects a DSD read. In step 410A, the program looks for data in the input buffer. If data is present, step 420A attempts to identify the input device. If data is not present, the program jumps to code block 470, Scan On Machine Interfaces. Step 420B determines whether the DSD reader is a valid device. If not, the program also jumps to code block 470, Scan On Machine Interfaces. If the input device is valid, step 420B transfers control to code block, 430 which identifies the type of DSD read by the DSD reader.

Code segment 430A checks the DSD Totals database to determine whether the required number of User DSDs have been read yet. If the number of User DSDs which have been read is less than the required total number of User DSDs, control transfers to step 430B. Step 430B determines whether the DSD which has been read is a User DSD. If it is, step 430C increments the index i. Step 430D then sets the nth entry of the vector User DSDs(n) equal to i, the number of User DSDs read, where n is the number of the DSD reader. Steps 430E and 430F then enter the user data and the time the DSD was read into a data structure called DSD Structure(n).

Figure 19:
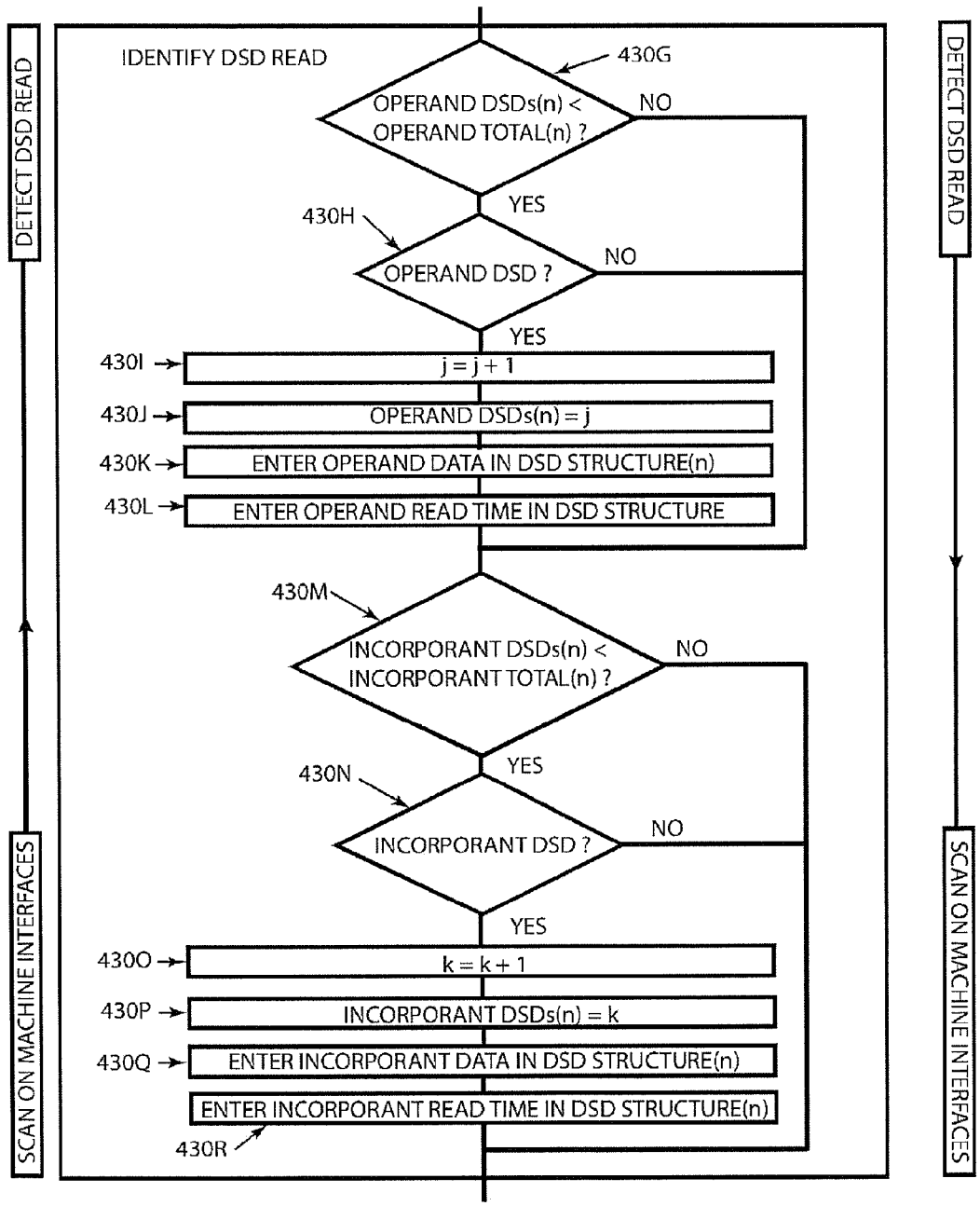
FIG. 19 is the second of five pages of a detailed flow chart of the tool enabling program.

Referring to FIG. 19, steps 430A through 430F are then repeated for Operand DSDs in steps 430G through 430L and for Incorporant DSDs in steps 430M through 430R.

Figure 20:
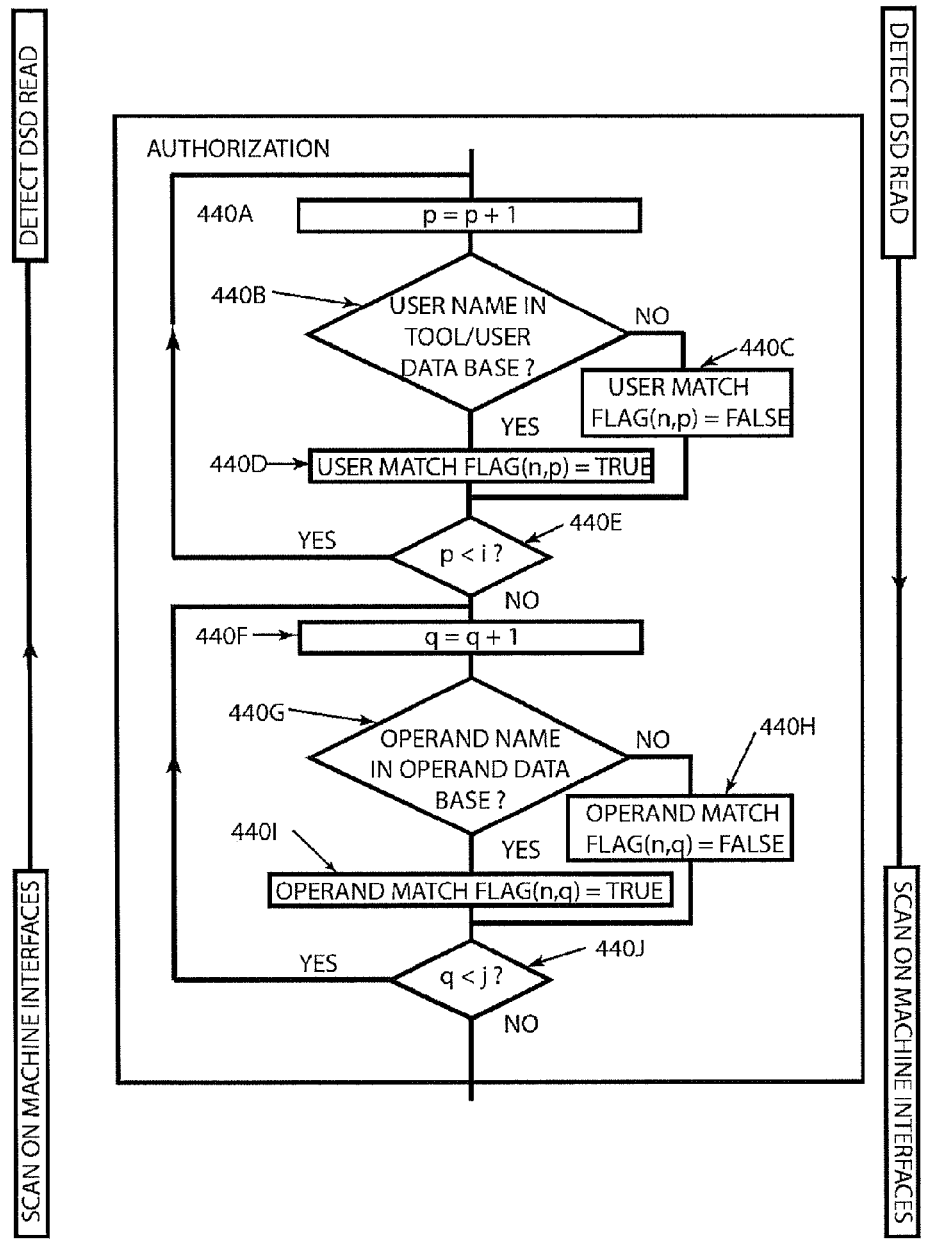
FIG. 20 is the third of five pages of a detailed flow chart of the tool enabling program.

Referring to FIG. 20, code block 440 determines whether users, operands, and incorporants are authorized. Step 440A increments the index p. In step 440B, the program checks to see if the user name is contained in the Tool/User database. If there is a match between the user name obtained from the DSD and the user names in the database, code segment 440B transfers control to step 440D which sets the user match flag for the input device equal to true. If a match is not found, step 440C sets the user match flag for the input device equal to false. Step 440E then compares the index p to i, the total number of User DSDs. So long as p is less than i, the program loops back to check other User DSD data for matches in the Tool/User database.

Figure 21:
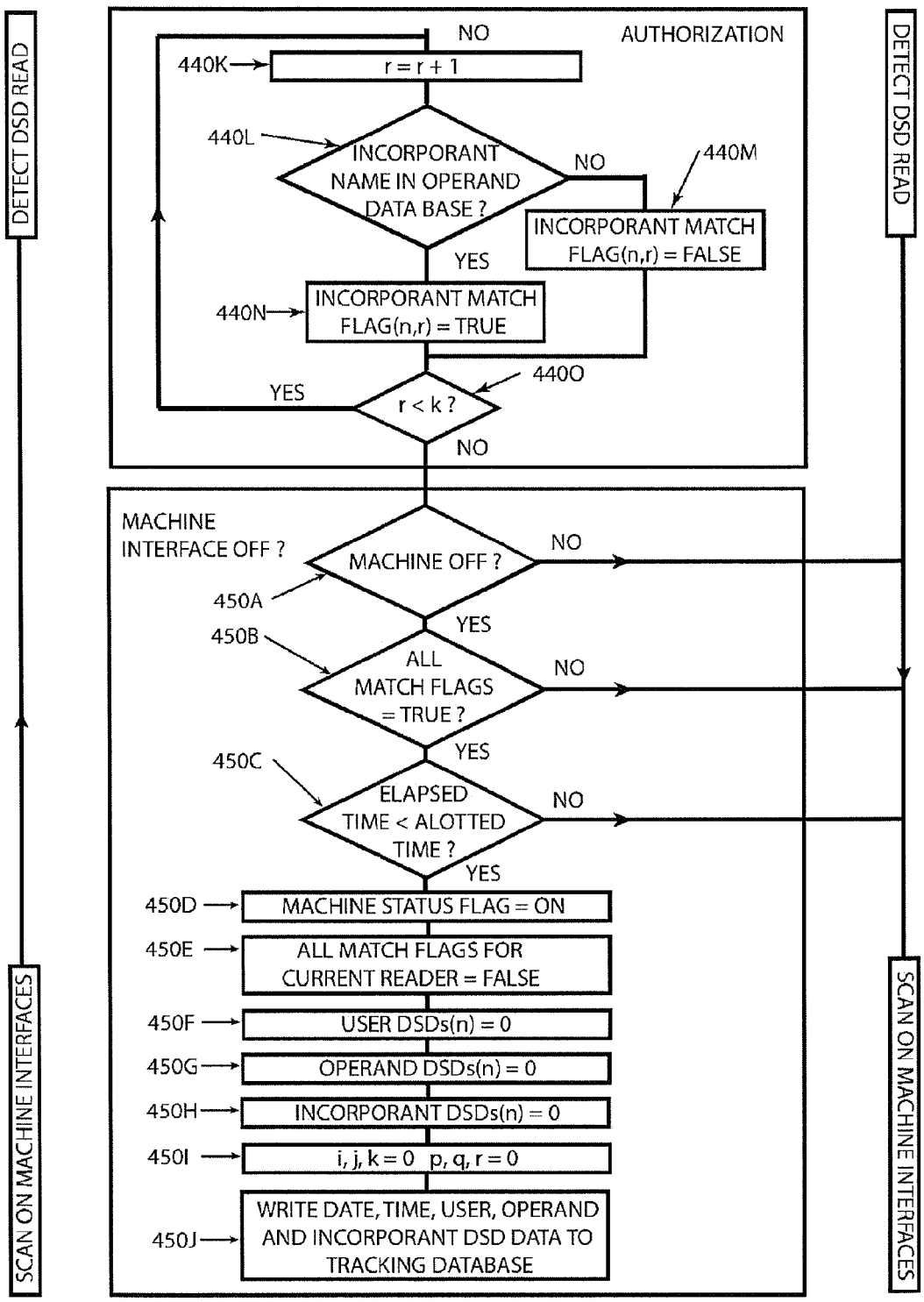
FIG. 21 is the fourth of five pages of a detailed flow chart of the tool enabling program.

Steps 440F through 440J repeat the authorization process for Operand DSD data. Referring now to FIG. 21, steps 440K through 440O repeat the same authorization process for Incorporant DSD data.

Code block 450 determines whether the DC Activation Signal 250 for the machine interface associated with the nth DSD reader is off. This is done by reading the machine status flag for the nth DSD reader in the Tool/User database. The machine status flag is read in step 450A. If the machine is on, the program jumps to code block 470, Scan On Machine Interfaces. If the machine is off, step 450B examines all match flags. If any one of the match flags is false, the program jumps to code block 470, Scan On Machine Interfaces. If all match flags are true, step 450C determines whether the time elapsed between reading the first DSD and the last DSD exceeds the allowed time. If it does, control is again transferred to code block 470, Scan On Machine Interfaces. If not, step 450D sets the machine status flag to on. Then, code segment 450E sets all match flags for the current reader to false. Steps 450F through 450I reinitialize User DSDs(n), Operand DSDs(n), Incorporant DSDs(n), and the indices i, j, k, p, q, and r. Then code segment 450J writes the date, time, user information, machine identification, operand information, and incorporant information to the Process Data database file 186 in a format which can be read by a spreadsheet program such as Excel.

Figure 22:
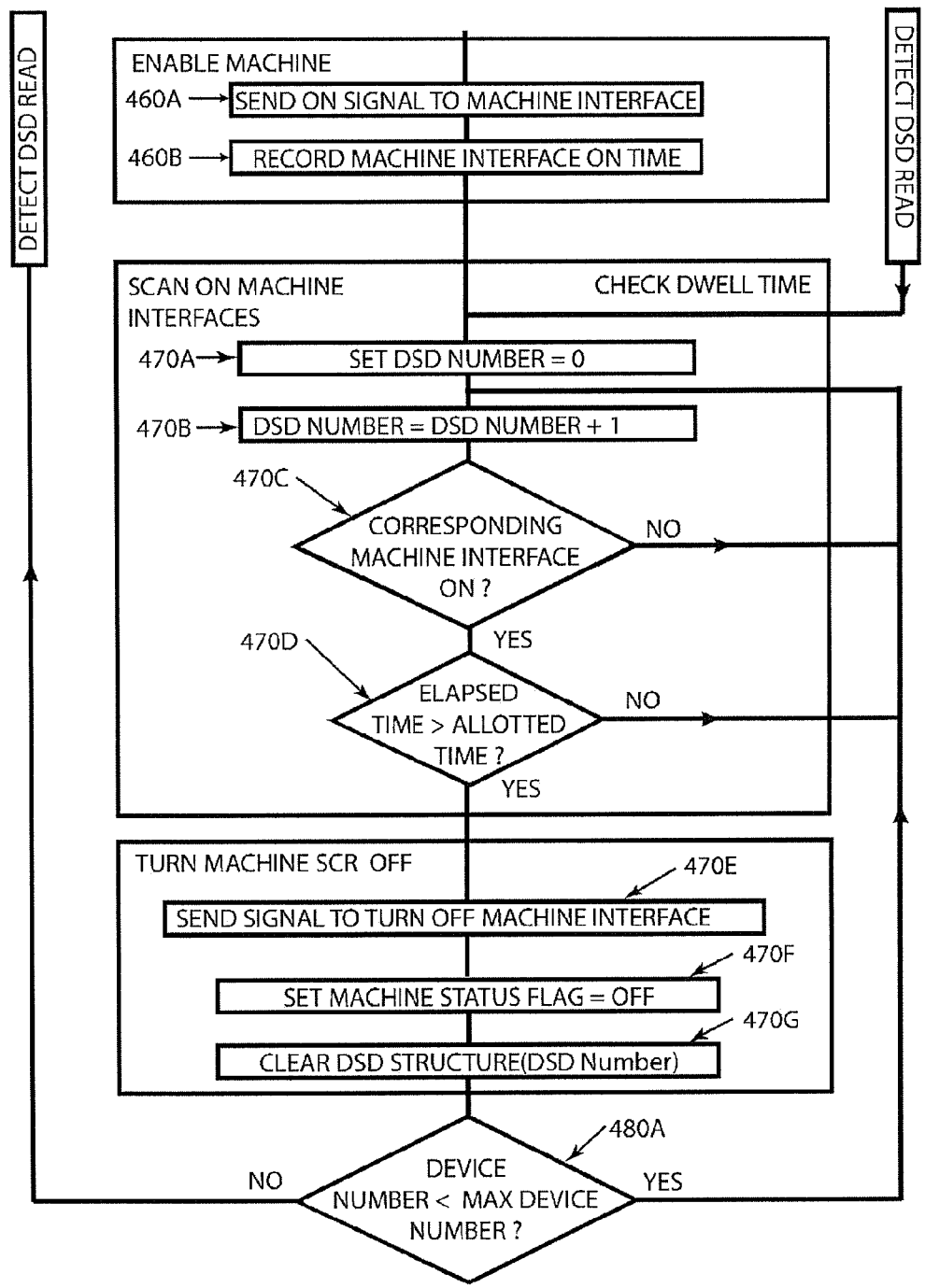
FIG. 22 is the fifth of five pages of a detailed flow chart of the tool enabling program.

Proceeding to FIG. 22, code block 460 enables the machine interface associated with the DSD reader. Step 460A sends an on signal to the machine interface. Code segment 460B records the machine interface on time.

Code block 470 scans the entire Tool/User database for machine interfaces which are on. In step 470A, the index for the DSD Reader is set to zero. Step 470B increments the index for the DSD reader. Step 470C checks the machine status flag in the Tool/User database to determine whether or not the machine interface is enabled. If the machine interface is off, operation 470C jumps to step 470B to examine the machine status flag for the next machine interface. If the machine is on, step 470D determines whether the time elapsed since the machine interface was enabled exceeds the allotted dwell time. If not, the program jumps to step 470B to examine the next machine interface. If so, the program proceeds to code segment 470E to send a signal to disenable the machine interface being examined. In step 470F, the machine status flag in the Tool/User database is set to off. Code segment 470G clears the entries in the DSD Structure corresponding to the machine interface and DSD reader being considered.

Code segment 480A then determines whether all of the 255 possible machine interfaces have been examined. If not, control is returned to step 470B and the next machine interface is examined. If all possible machine interfaces have been examined, control is returned to code block 410 to search for additional data.

A third program may be utilized to write data to DSDs. In one embodiment, this program might be run on a separate computer system, such as the one shown in FIG. 23, by clerical staff to write user data to User DSDs, operand data to Operand DSDs, incorporant data to Incorporant DSDs and machine names to Tool DSDs. The User DSDs would be distributed to personnel operating machine tools, medical equipment, food processing equipment, or other electrically or pneumatically powered equipment. The Operand DSDs would travel with product in manufacturing or food processing operations and with patients in a medical environment, or other operands. Incorporant DSDs would travel with raw materials in a manufacturing environment, with ingredients in a food processing environment, and with drugs in a medical environment, also not limited to these environments. Tool DSDs could be distributed to supervisors for use in initializing the tracking interlock system.

Figure 24:
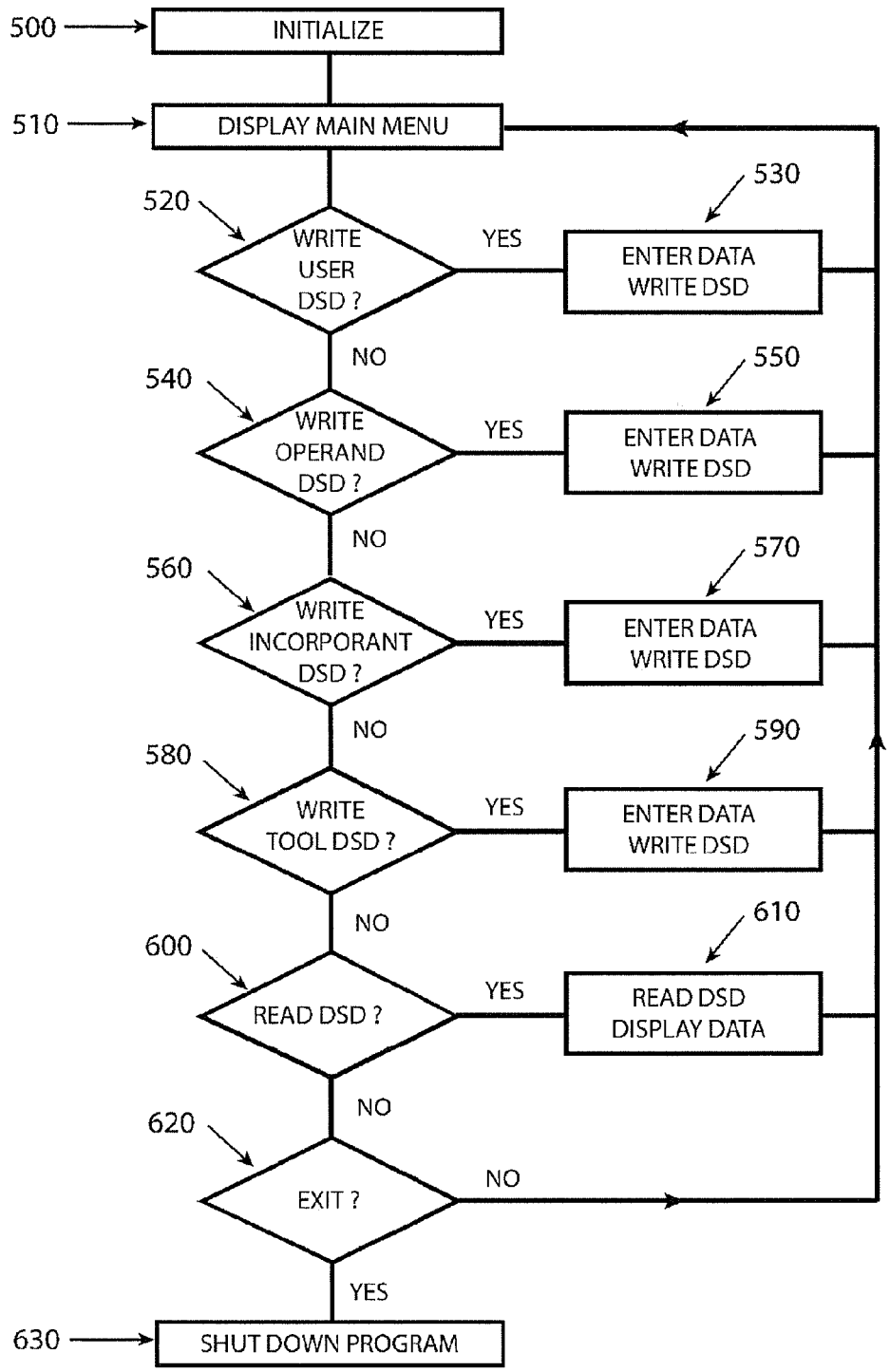
FIG. 24 is a condensed flow chart of an example of the Data Storage Device writer program.

A generalized flow chart for one embodiment of the DSD writer program is shown in FIG. 24. The initialize code block, 500, controls access to the program and sets up the com port for the DSD writer. The DSD writer is preferably a MSR505C magnetic card reader/writer, although not limited thereto. If the user chooses to write a User DSD, code block 520 transfers control to code block 530. Code block 530 may prompt the user to enter user data and then writes that data to a DSD. If the user elects to write an Operand DSD, code block 540 transfers control to code block 550. Code block 550 prompts the user to enter operand data and then writes that data to a DSD. If the user elects to write an Incorporant DSD, code block 560 transfers control to code block 570. Code block 570 prompts the user to enter incorporant data and then writes that data to a DSD. If the user chooses to write a Tool DSD, code block 580 transfers control to code block 590. Code block 590 prompts the user for machine identification data and writes that data to a DSD. If the user opts to read a DSD, code block 600 transfers control to code block 610. Code block 610 then reads the DSD and displays the content. To exit the program, the user invokes code block 620. Code block 620 transfers control to code block 630 which shuts down the program.

Figure 25:
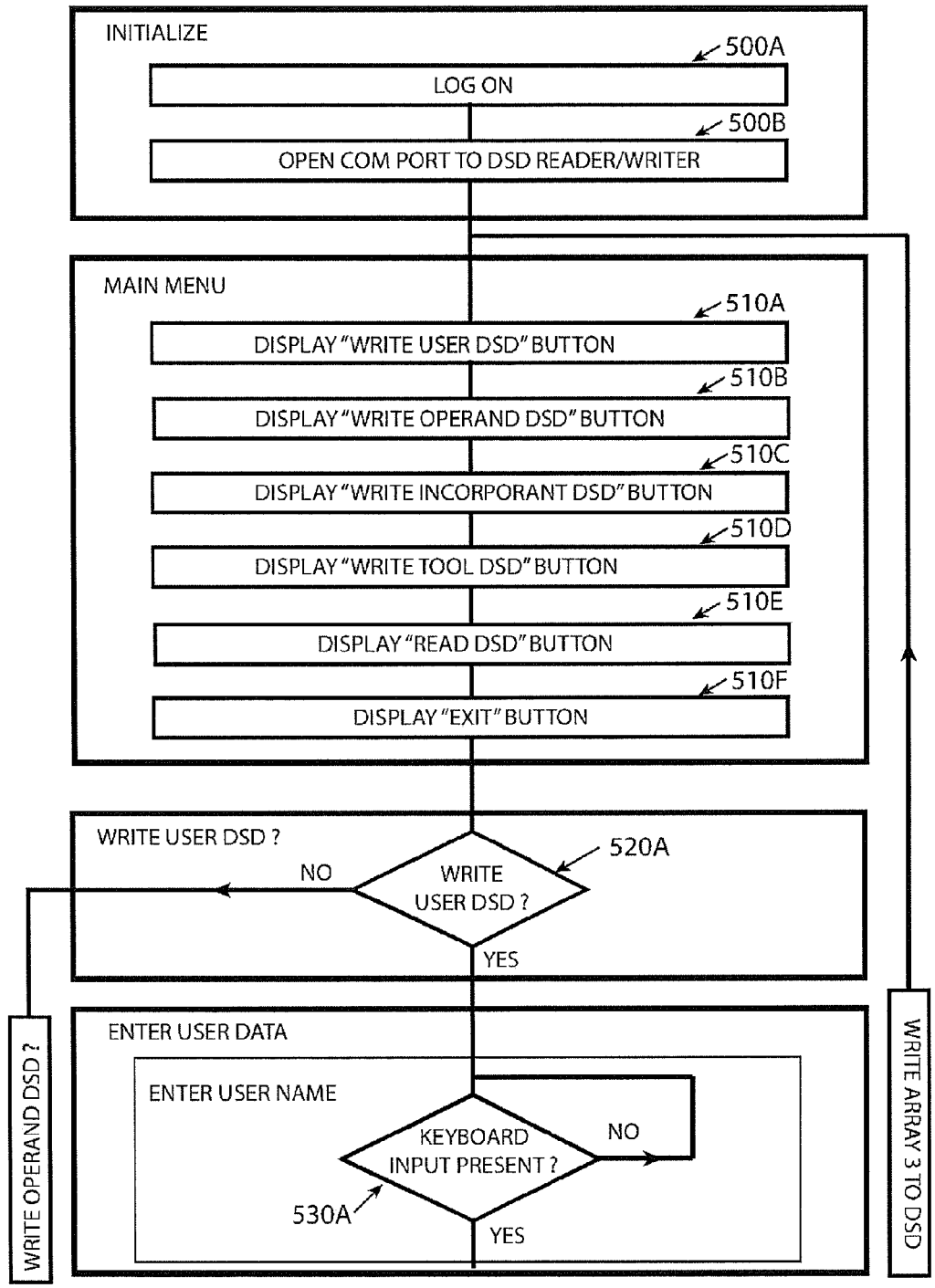
FIG. 25 is the first of eight pages of a detailed flow chart of the exemplary Data Storage Device writer program.
Figure 26:
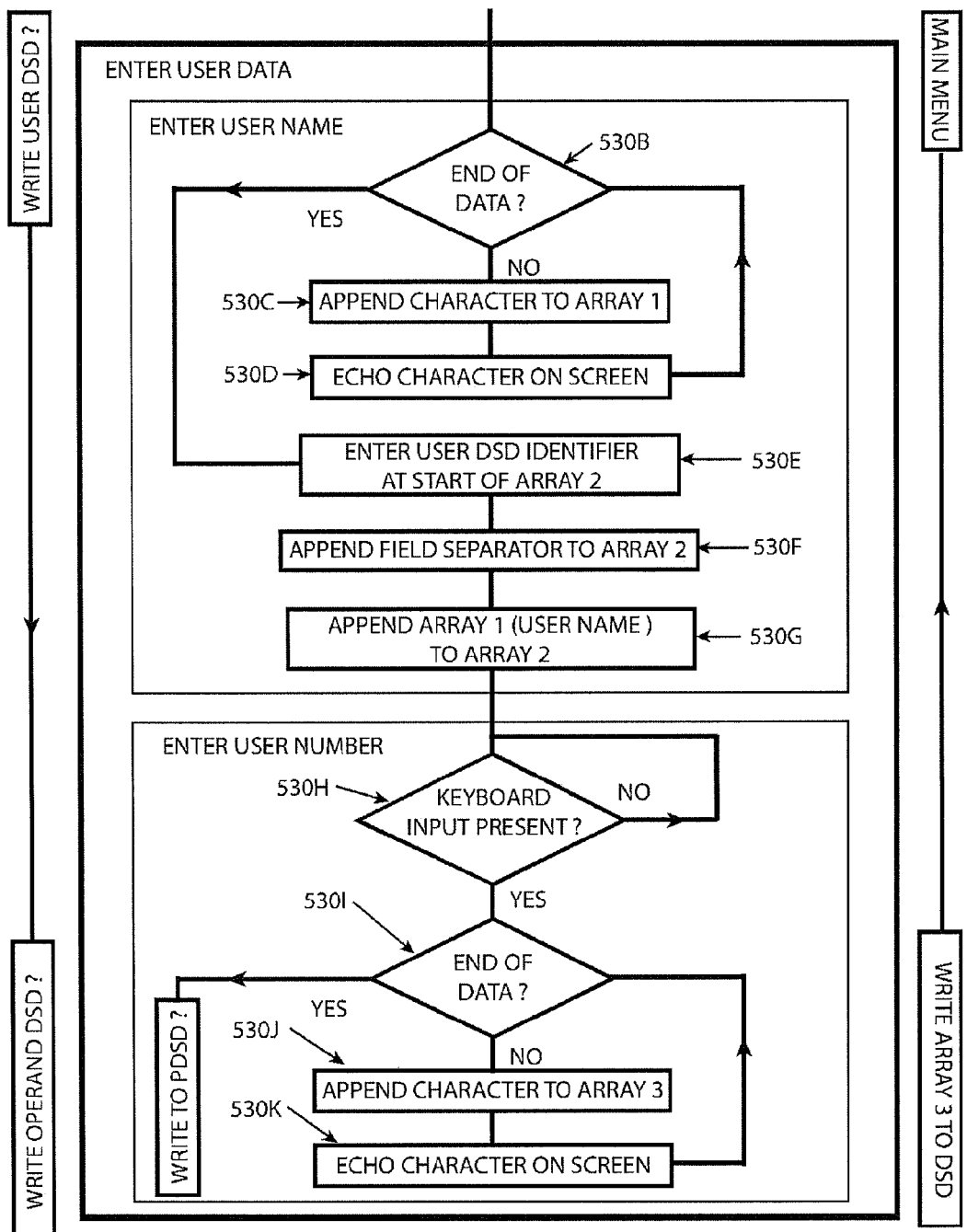
FIG. 26 is the second of eight pages of a detailed flow chart of the Data Storage Device writer program.
Figure 27:
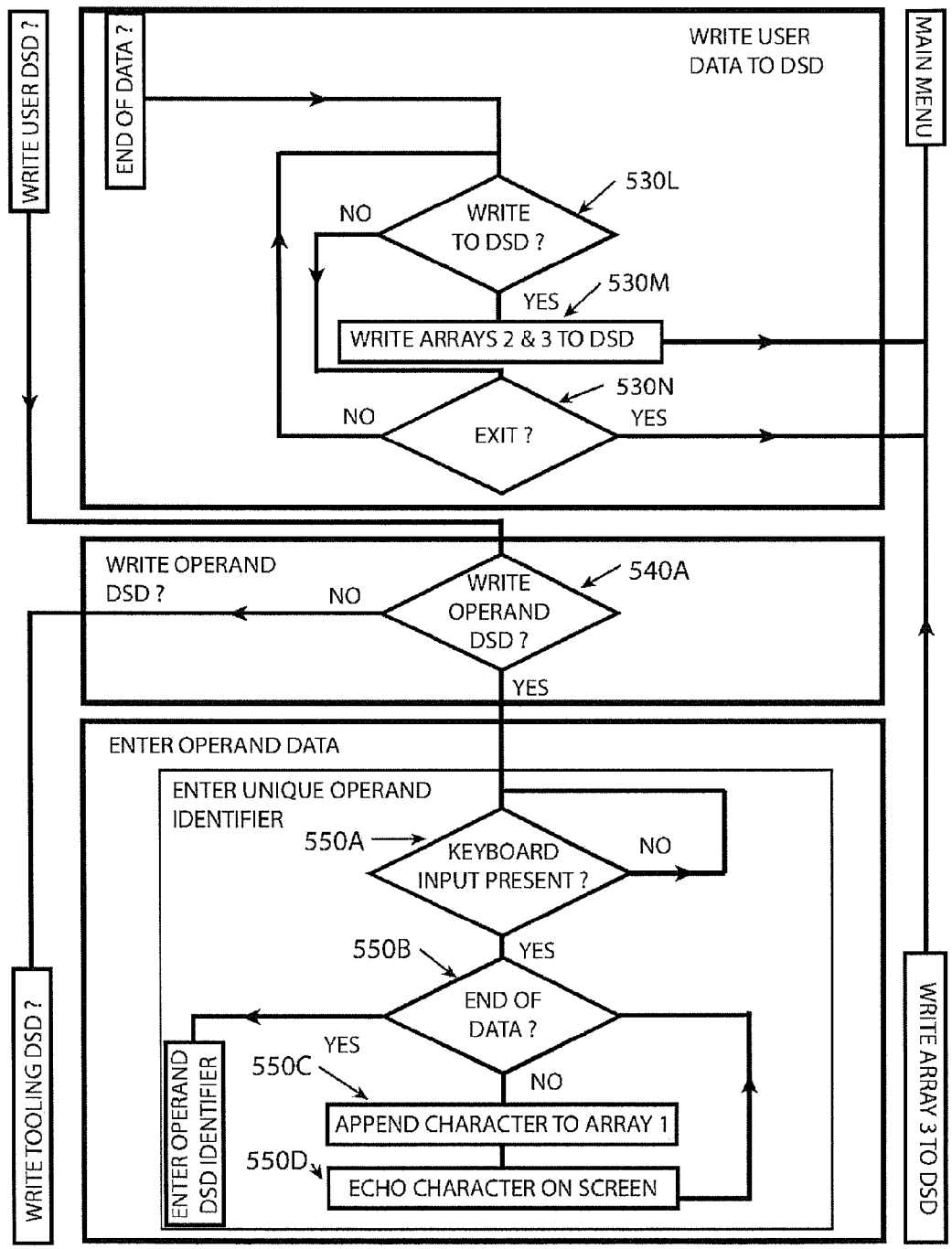
FIG. 27 is the third of eight pages of a detailed flow chart of the Data Storage Device writer program.
Figure 28:
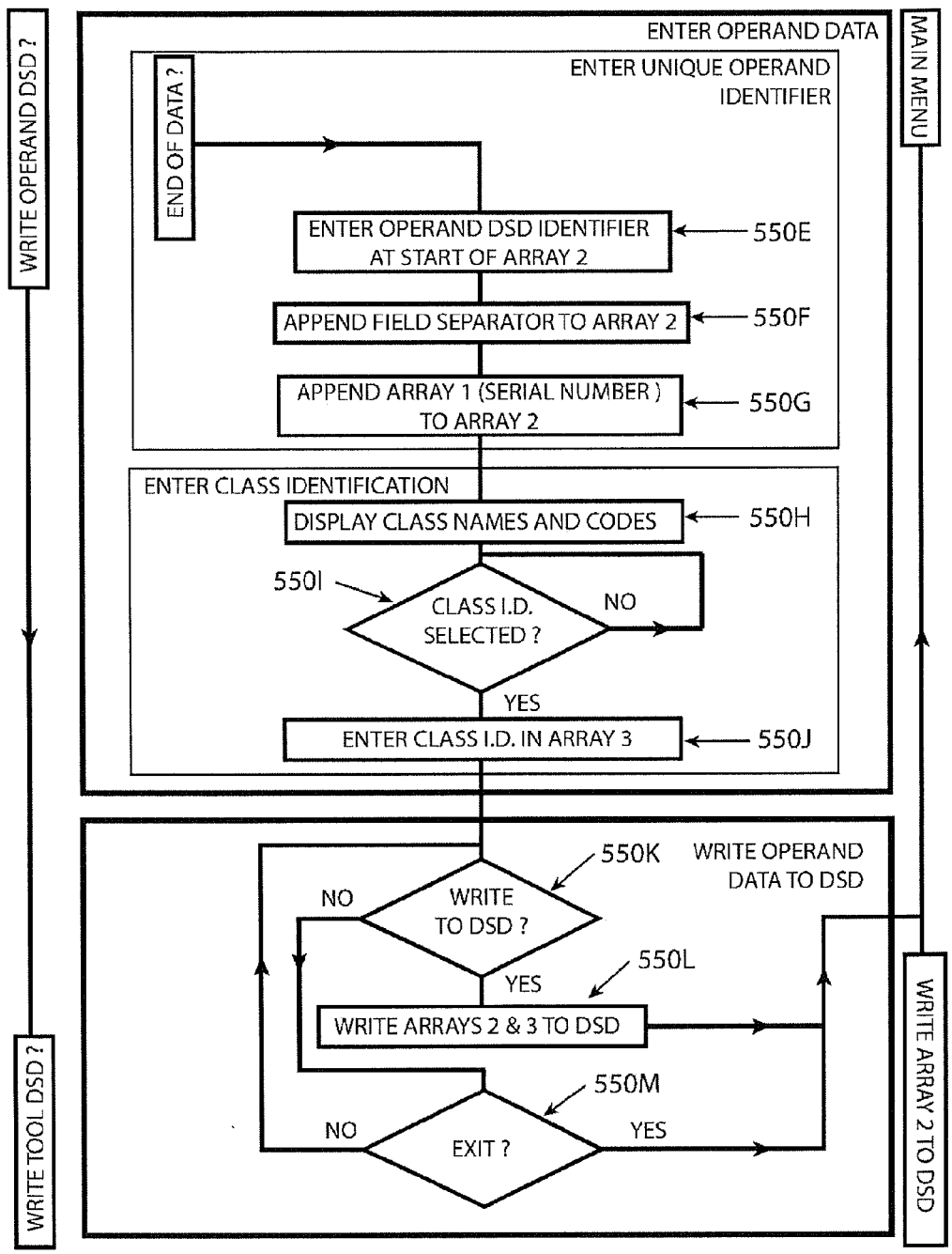
FIG. 28 is the fourth of eight pages of a detailed flow chart of the Data Storage Device writer program.

A detailed flow chart of one embodiment of the DSD writer program is shown in FIGS. 25-32. The initialize code block 500 is shown in FIG. 25. Code segment 500A requires the user to log on in order to gain access to the program. Code segment 500B opens up the COM port to the DSD reader/writer.

Code block 510 displays the main menu. Code segments 510A-510F display the Write User DSD button, the Write Operand DSD button, the Write Incorporant DSD button, the Write Tool DSD button, the Read DSD button, and the Exit button. If the user selects the Write User DSD button, code segment 520A transfers control of the program to code block 530, Enter User Data. Code segment 530A looks for keyboard input. Continuing with FIG. 26, code segment 530B examines the keyboard data character by character. Code segment 530C appends each character to array 1. Code segment 530D echoes each character on the screen. When code segment 530B finds an end of data character, it jumps out of the loop and transfers control to code segment 530E. Code segment 530E places a code which will identify the DSD as a User DSD at the start of array 2. A field separator is then appended to array 2 by code segment 530F. Code segment 530G then appends array 1 to array 2. A similar process is then repeated for the user number. Code segment 530H checks to see if keyboard data is present. Code segment 530I examines the input character by character. Code segment 530J appends each character to array 3 and code segment 530K echoes the character on the screen. When code segment 530I detects an end of data character, it exits the loop and jumps to code segment 530L in FIG. 27. Here the user may choose to write to the DSD or exit the routine. If he chooses to write to the DSD, code segment 530M writes arrays 2 and 3 to the DSD. If he chooses to exit without writing to the DSD, code segment 530N returns the program to the main menu.

The process for creating an Operand DSD may be much the same as that for creating a User DSD. When the user chooses to create an Operand DSD, code segment 540A transfers control to code segment 550A which looks for keyboard data input in the form of a unique operand identifier. For a manufacturing operation, this might be a serial number. For the example of the chemotherapy infusion suite, this might be a patient name. For a food processing operation, this might be the lot number of the finished product. Code segment 550B examines the keyboard input character by character. Unless an end of data code is encountered, code segment 550C appends each character to array 1. Code segment 550D echoes each character on the screen. When code segment 550B encounters an end of data code, it transfers control to code segment 550E in FIG. 28. Code segment 550E enters an identifier which will identify the DSD as an Operand DSD at the start of array 2. Code segment 550F then appends a field separator to array 2. Next, code segment 550G appends array 1 to array 2. Next, an operand class identification is incorporated into the Operand DSD. For a manufacturing operation, this might be a part name or part number. For the example of the chemotherapy infusion suite, this could be the patient's birthday or social security number. For a food processing operation, this could be the product name or product code. Code segment 550H displays a list of class names and class identification codes. When the user clicks on a class name or code, code segment 550I directs control of the program to code segment 550J in which the class identification is entered into array 3. The user may then either write the class information to a DSD or choose to exit the routine. If the user chooses to write the information, code segment 550K transfers control to code segment 550L which writes arrays 2 and 3 to the DSD. If the user elects to exit, code segment 550M returns the program to the main menu.

Figure 29:
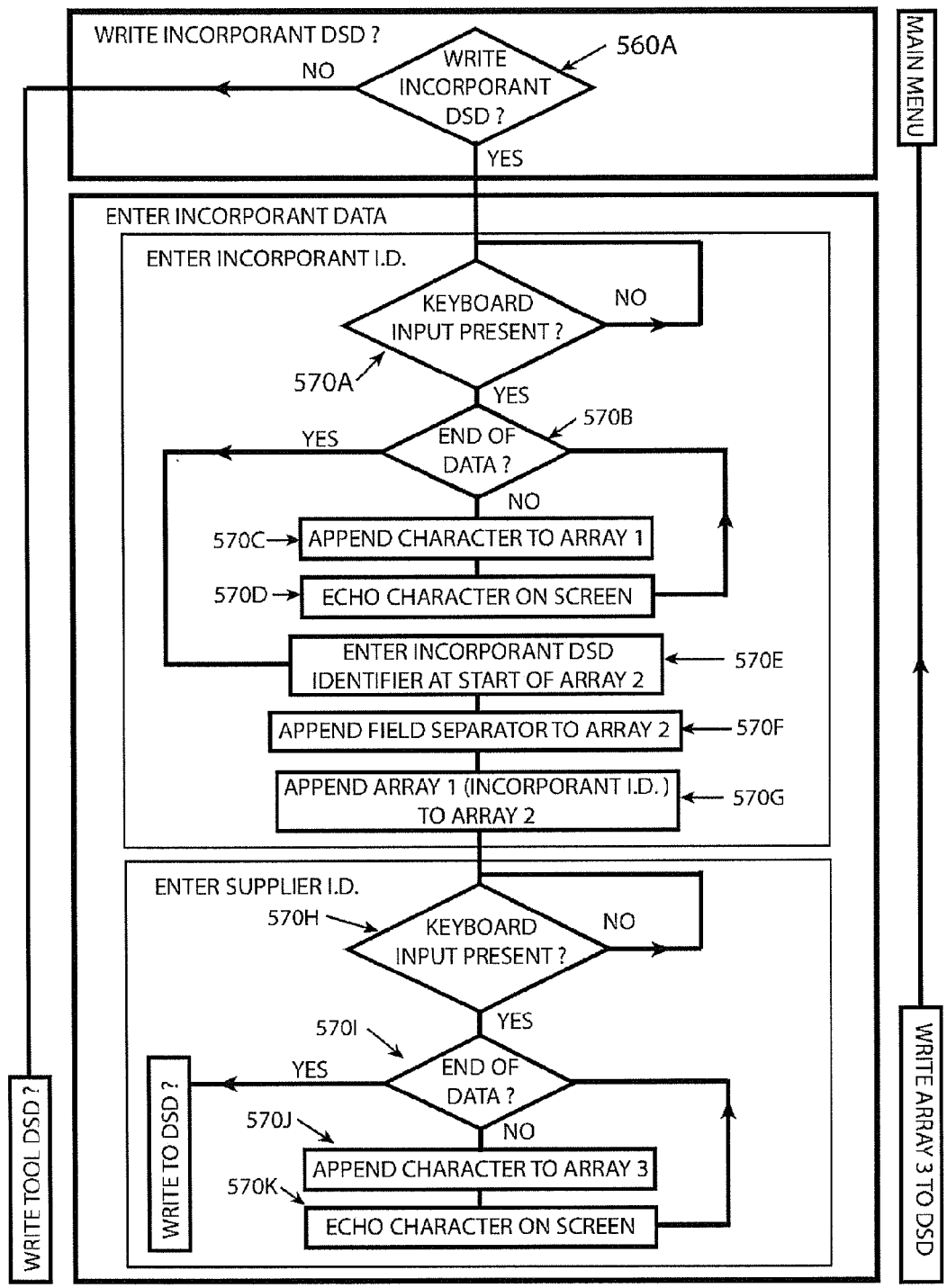
FIG. 29 is the fifth of eight pages of a detailed flow chart of the Data Storage Device writer program.

The process of creating an Incorporant DSD may be the same as that for creating a User DSD. Referring to FIG. 29, when the user selects the Write Incorporant DSD button, code segment 560A transfers control of the program to code block 570, Enter Incorporant Data. Code segment 570A looks for keyboard input in the form of a unique incorporant identifier. For a manufacturing operation, this might be the quality control number of a raw material or a subassembly. For an intravenous infusion suite, this might be a combination of drug name and lot number. For a food processing operation, this might be a combination of the ingredient name and lot number. Code segment 570B examines the keyboard data character by character. Code segment 570C appends each character to array 1. Code segment 570D echoes each character on the screen. When code segment 570B finds an end of data character, it jumps out of the loop and transfers control to code segment 570E. Code segment 570E places a code at the start of array 2 which will identify the DSD as an Incorporant DSD. A field separator is then appended to array 2 by code segment 570F. Code segment 570G then appends array 1 to array 2. A similar process is then repeated for the supplier identification. Code segment 570H checks to see if keyboard data is present. Code segment 570I examines the input character by character. Code segment 570J appends each character to array 3 and code segment 570K echoes the character on the screen. When code segment 570I detects an end of data character, it exits the loop and jumps to code segment 570L in FIG. 30. Here the user may choose to write to the DSD or exit the routine. If he chooses to write to the DSD, code segment 570M writes arrays 2 and 3 to the DSD. If he chooses to exit without writing to the DSD, code segment 570N returns the program to the main menu.

Figure 30:
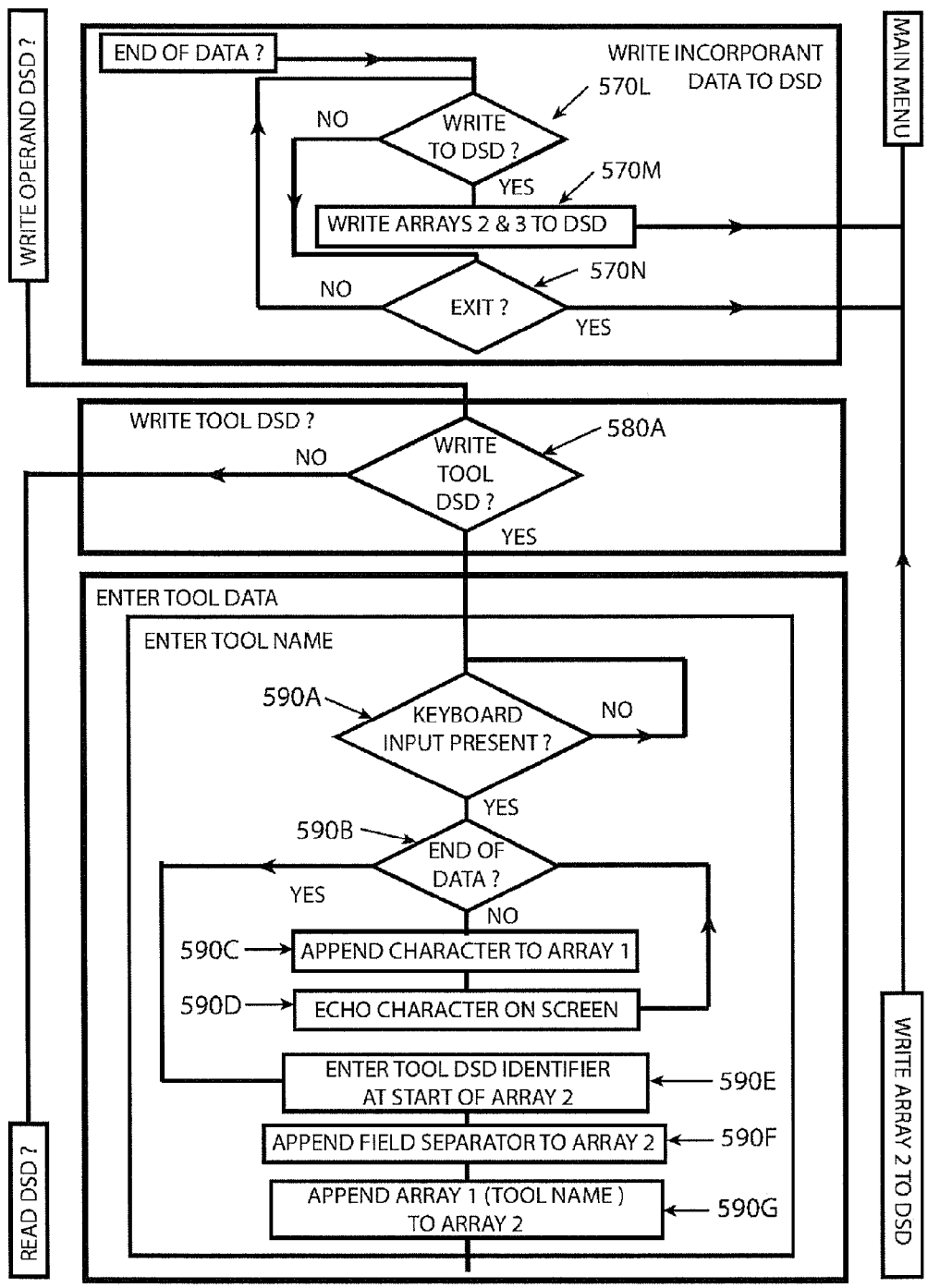
FIG. 30 is the sixth of eight pages of a detailed flow chart of the Data Storage Device writer program.
Figure 31:
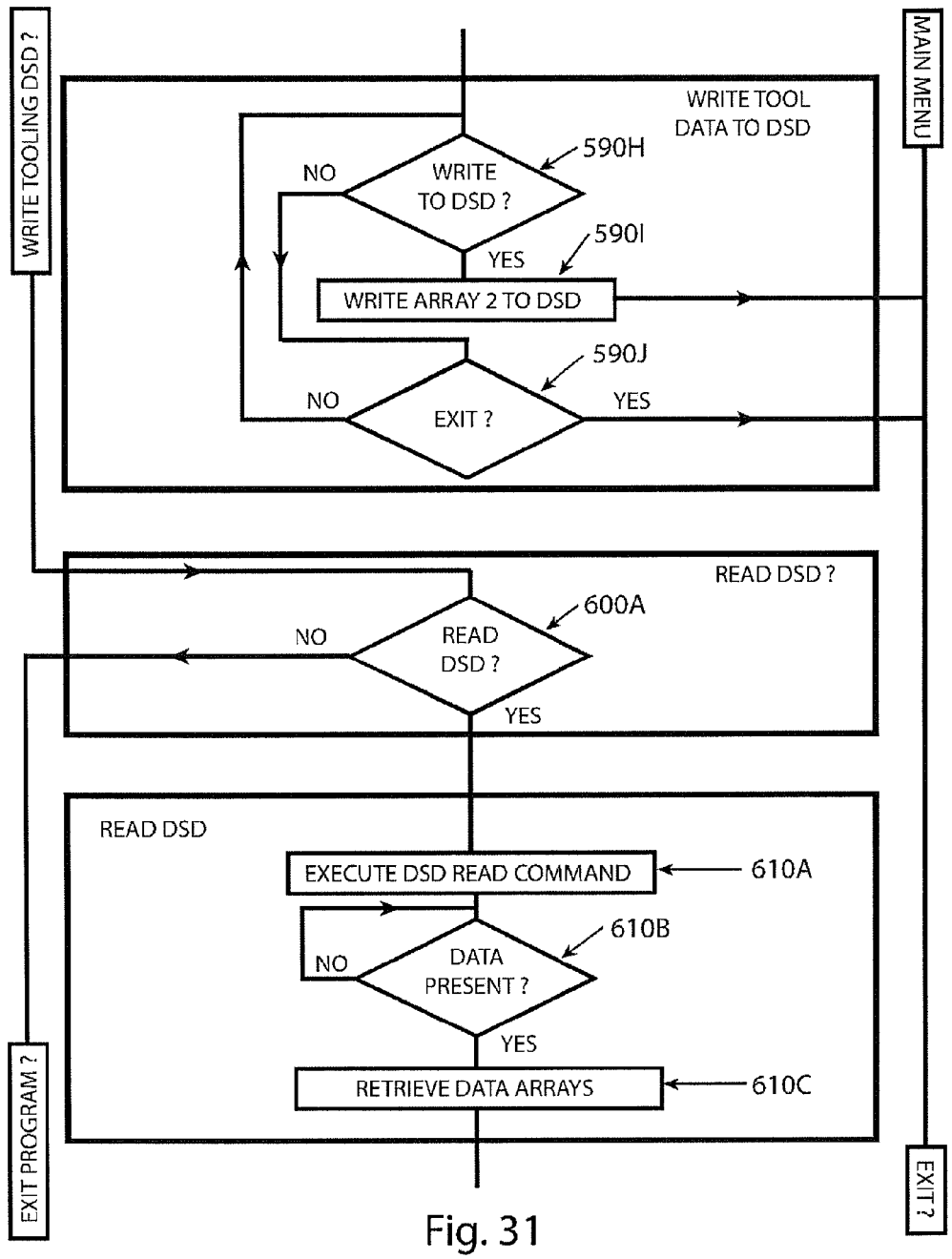
FIG. 31 is the seventh of eight pages of a detailed flow chart of the Data Storage Device writer program.

One embodiment of the process for creating a Tool DSD is illustrated in FIGS. 30 and 31. If the user elects to create a Tool DSD, code segment 580A transfers control to code segment 590A. Code segment 590A checks to see if any keyboard input is present. If so, it transfers control to code segment 590B. Code segment 590B examines the data character by character. Unless an end of data character is encountered, code segment 590B directs control to code segment 590C which appends the character to array 1 and code segment 590D which echoes the character on the screen. When code segment 590B encounters an end of code character, it transfers control to code segment 590E which enters an identifier at the start of array 2 which will identify the DSD as a Tool DSD. Step 590F then appends a field separator to array 2. Code segment 590G then appends array 1 to array 2. The user is then given the opportunity to write to the DSD or to exit. If he chooses to write to the DSD, step 590H transfers control to code segment 590I which writes array 2 to the DSD. If the user elects to exit, code segment 590J returns to the main menu.

Figure 32:
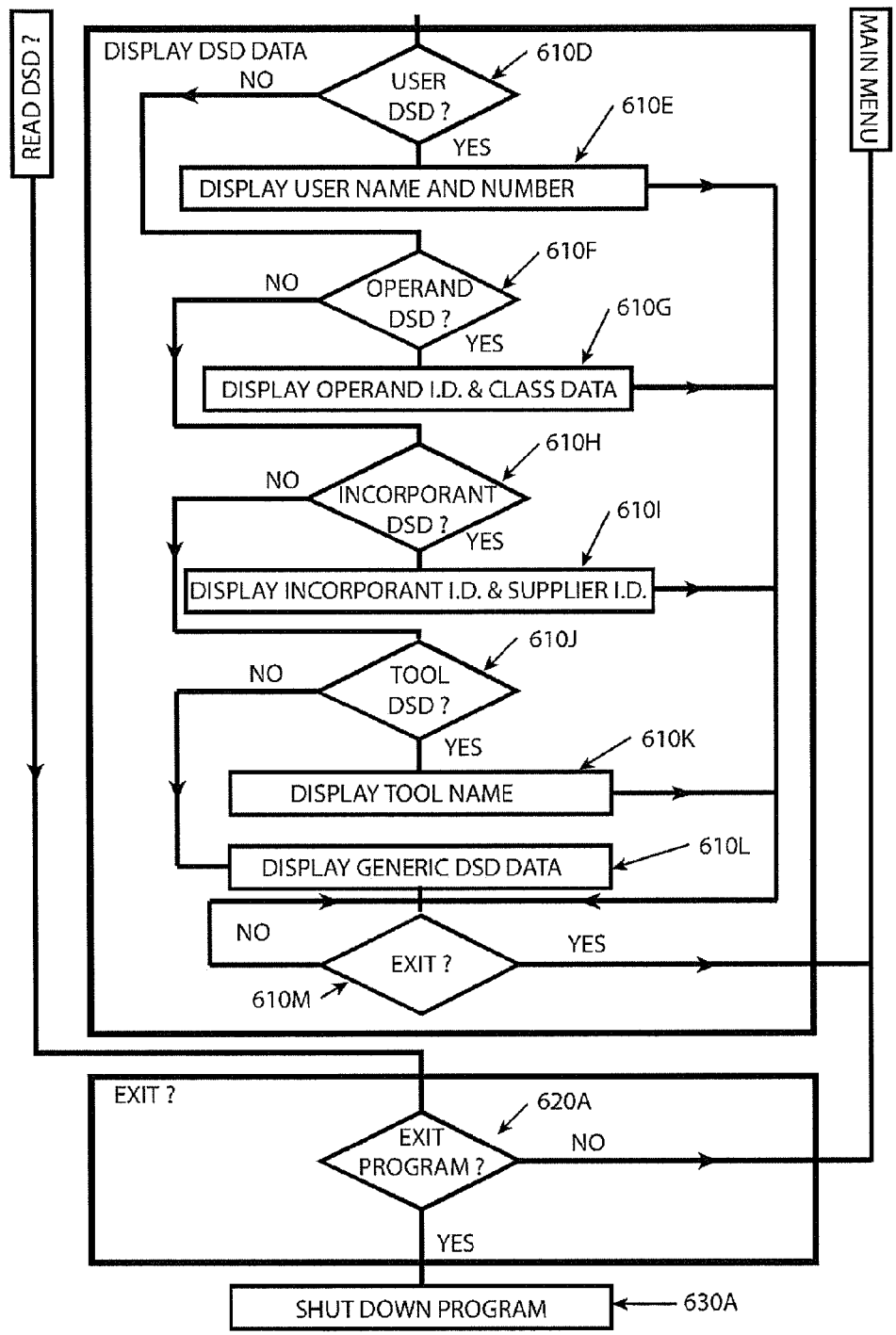
FIG. 32 is the eighth of eight pages of a detailed flow chart of the Data Storage Device writer program.

If the reader chooses to read a DSD, code segment 600A transfers control to the Read DSD code block 610. Code segment 610A executes the DSD read command. Code segment 610B looks to see if data is present. If it is, code segment 610C retrieves the data arrays. Referring to FIG. 32, code segment 610D uses the code before the first field separator to determine whether the DSD is a User DSD. If so, code segment 610E displays the user name and number. Code segment 610F uses the code before the first field separator to determine whether the DSD is an Operand DSD. If so, code segment 610G displays the serial number and class identification belonging to the DSD. Code segment 610H uses the code before the first field separator to determine whether the DSD is an Incorporant DSD. If so, code segment 610I displays the incorporant and supplier identification contained on the DSD. Code segment 610J uses the code before the first field separator to determine whether the DSD is a Tool DSD. If so, code segment 610I displays the tool name contained on the DSD. If the DSD is neither a User, Operand, Incorporant, nor Tool DSD, code segment 610L displays the generic DSD data. Code segment 610M asks the user if he wants to exit from the data display routine. If the user answers affirmatively, code segment 610M returns the user to the main menu.

Code segment 620A asks the user if he wants to exit the program. If he answers no, the user remains in the main menu. If the user elects to exit, code segment 630A shuts down the program.

Operation

Figure 4:
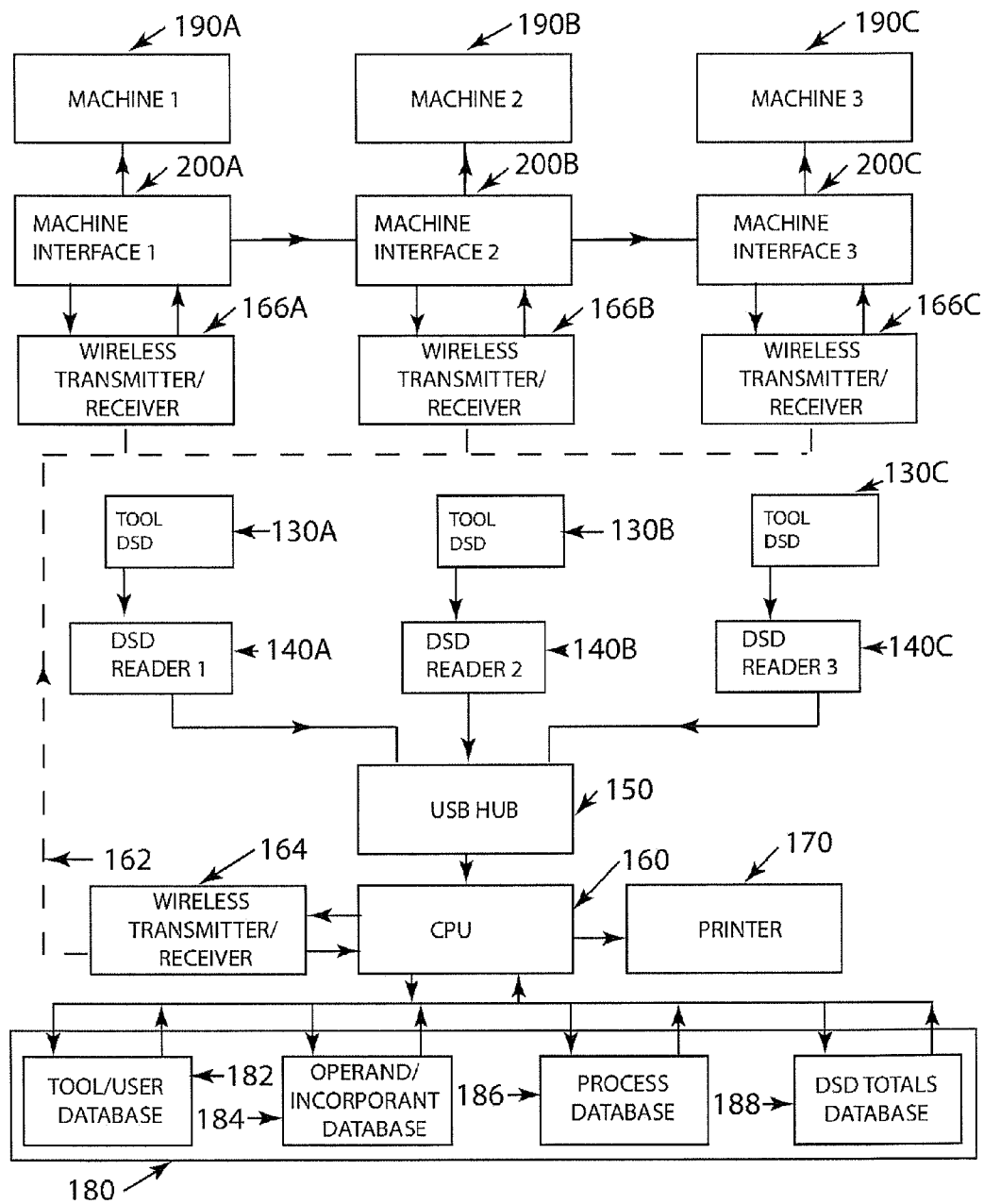
FIG. 4 shows the hardware configuration for initialization of the system shown in FIG. 3.

As shown in FIG. 4, to initialize the system, a Tool DSD 130B containing the identification of Machine 2, 190B may be read by Input Device 2 140B, associated with Machine 2 190B. The initialization program instructs the user to set Machine Interface 2 200B to the address associated with Input Device 2 140B. In this way, Input Device 2 140B, Machine Interface 2 200B, and Machine 2 190B, are associated with each other. This association is stored in the Tool/User database 182, which is maintained in file storage 180. At this time, the user may also enter a dwell time for the machine interface 200B. The dwell time is the amount of time during which the machine 190B is enabled by the machine interface 200B to be turned on. The system need only be initiated once.

Returning to FIG. 3, to enable a machine to be turned on, say Machine 3 190C, a user may use DSD reader 3 140C to read his User DSD 110C, an Operand DSD 120C, and any other DSDs required by the DSD Totals database 188 as shown in FIG. 10. The tool enable program checks the Tool/User 182 and Operand/Incorporant 184 databases to make sure that the user, the operand, and any incorporants are authorized. The Operand DSD 120C travels with the product through the manufacturing process until superseded by another Operand DSD. When the CPU 160 recognizes that all required DSDs have been read, it sends out a code to Machine Interface 3 200C. At this point, the CPU 160 also stores the date, time, operator identification, operand identification, and machine identification in the Process database 186 in the File Storage capability 180. Machine Interface 3 200C enables Machine 3 190C to be turned on. The user must then turn on Machine 3 190C within a predetermined time period. When the predetermined time period has elapsed, the CPU 160 sends a disenable code to Machine Interface 3 200C, which disenables the on switch for Machine 3 190C. This disenable signal does not turn off Machine 3 190C. Machine 3 190C can only be turned off by the user. However, once the user has turned off Machine 3 190C, he cannot turn it back on unless he reads all required DSDs with Input Device 3 140C again.

Figure 23:
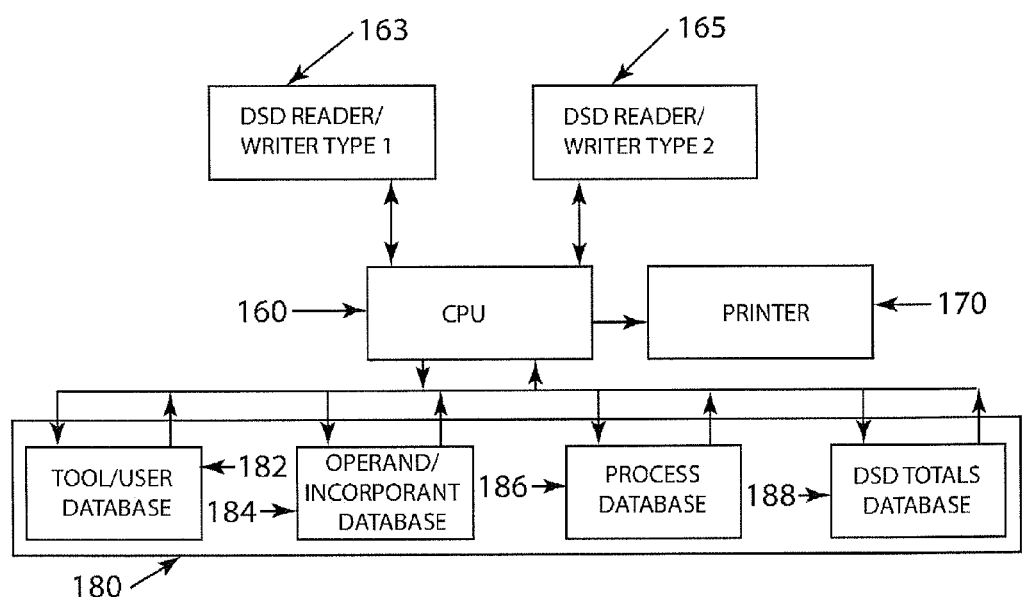
FIG. 23 shows example hardware architecture for a Data Storage Device Writer system.

To write data to a DSD, the user runs the DSD writer program, one embodiment of which is shown in condensed form in FIG. 24, on a separate DSD writer system such as the one shown in FIG. 23. Referring to FIG. 23, several DSD writers 163 and 165 might be required. For a magnetic swipe card, the DSD writer might be a device such as the MSR505C magnetic card reader/writer, although not limited thereto. For bar codes, the DSD writer could be a printer. For RFID devices, a reader/writer such as the DLP-RFID1 might be used. The DSD writer program presents the user with a menu giving him a choice of DSD types to write. If the operator selects User DSD, he is prompted to enter the name and number of the user. He then writes the DSD by, for example, swiping a magnetic card through the reader/writer, printing a bar code, or placing the RFID in proximity to the RFID reader/writer. Depending on the programming, the user may be presented with one or more options when electing to write an Operand DSD. If, for example, the first field is to contain a serial number, the user may be prompted to enter a serial number from a keyboard. If the second field is to contain a part name or number, that information could be entered using a drop down menu. Once information is entered, the DSD may be written in the same manner as a User DSD. Incorporant DSDs may be written in the same manner as Operand DSDs. Tool DSDs may be written in the same manner as User DSDs. Additionally, the DSD Writer program also reads DSDs. To read a DSD, the user selects that option from the menu and performs the read. All information on the DSD may be displayed.

Alternative Embodiments

A primary goal of the tracking interlock system is the association of processing data, with date and time in a manner which does not permit processing to proceed until all data has been properly entered. A secondary goal of the tracking interlock system is to limit access to authorized personnel and to ensure that the proper operands and incorporants are being processed. There are many ways in which a tracking interlock system can be constructed to achieve these goals.

Figure 33:
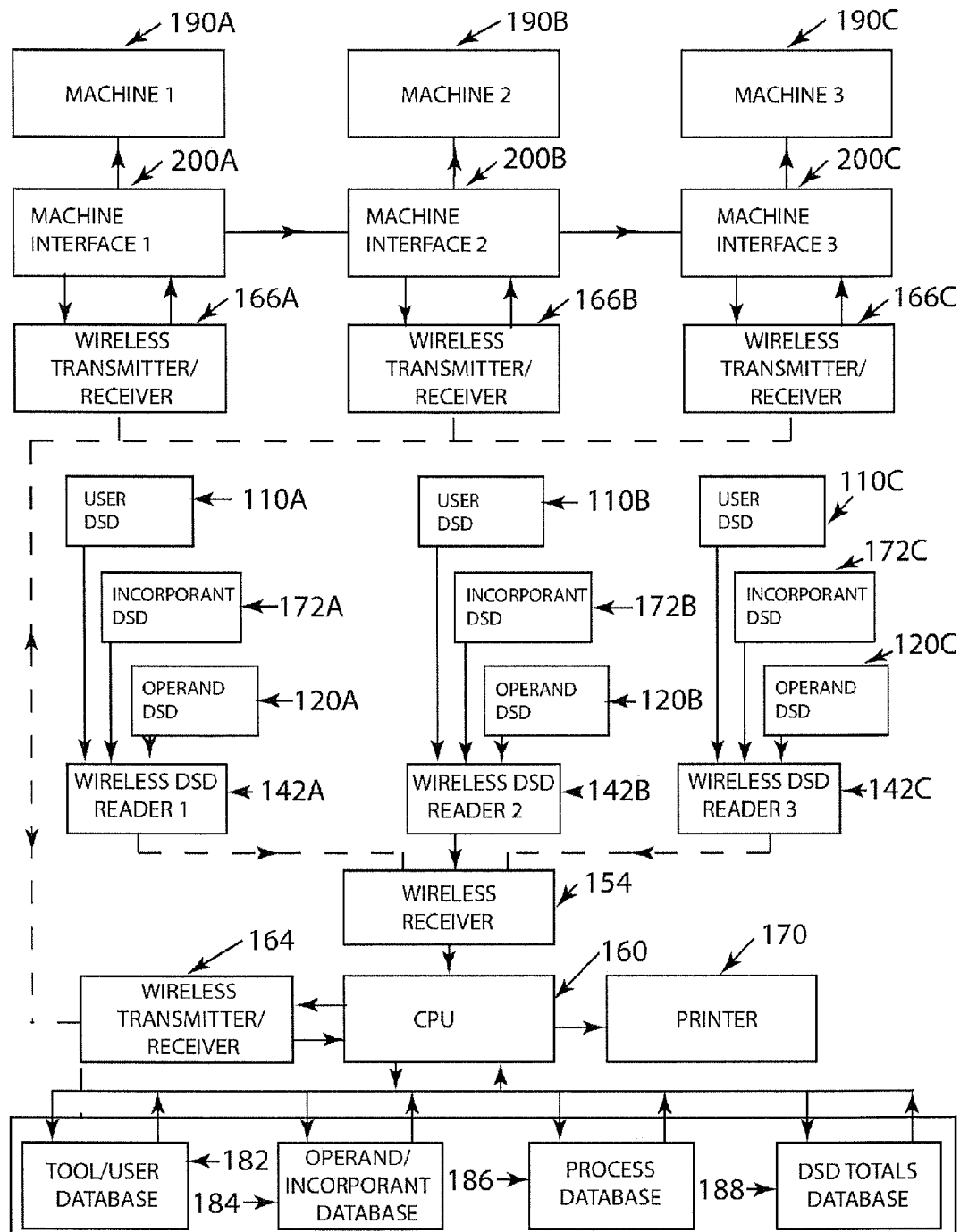
FIG. 33 depicts example tracking interlock hardware architecture for a system in which a wireless transceiver is used to communicate with machine interfaces and a wireless receiver is used to receive data from Data Storage Device Readers.

In one alternative embodiment, shown in FIG. 33, the USB network of FIG. 3 is replaced with a wireless network. In this embodiment, wireless DSD readers one 142A, two 142B, and three, 142C communicate with wireless receiver 154 in communication with CPU 160. Wireless transmitter/receivers 166A, 166B, and 166C communicate wirelessly with wireless transmitter/receiver 164. Wireless transmitter/receiver 164 is also in communication with the CPU 160. Wireless transmitter/receivers 166A, 166B, and 166C, communicate with machine interface one 200A, machine interface two 200B, and machine interface three 200C, respectively.

Figure 34:
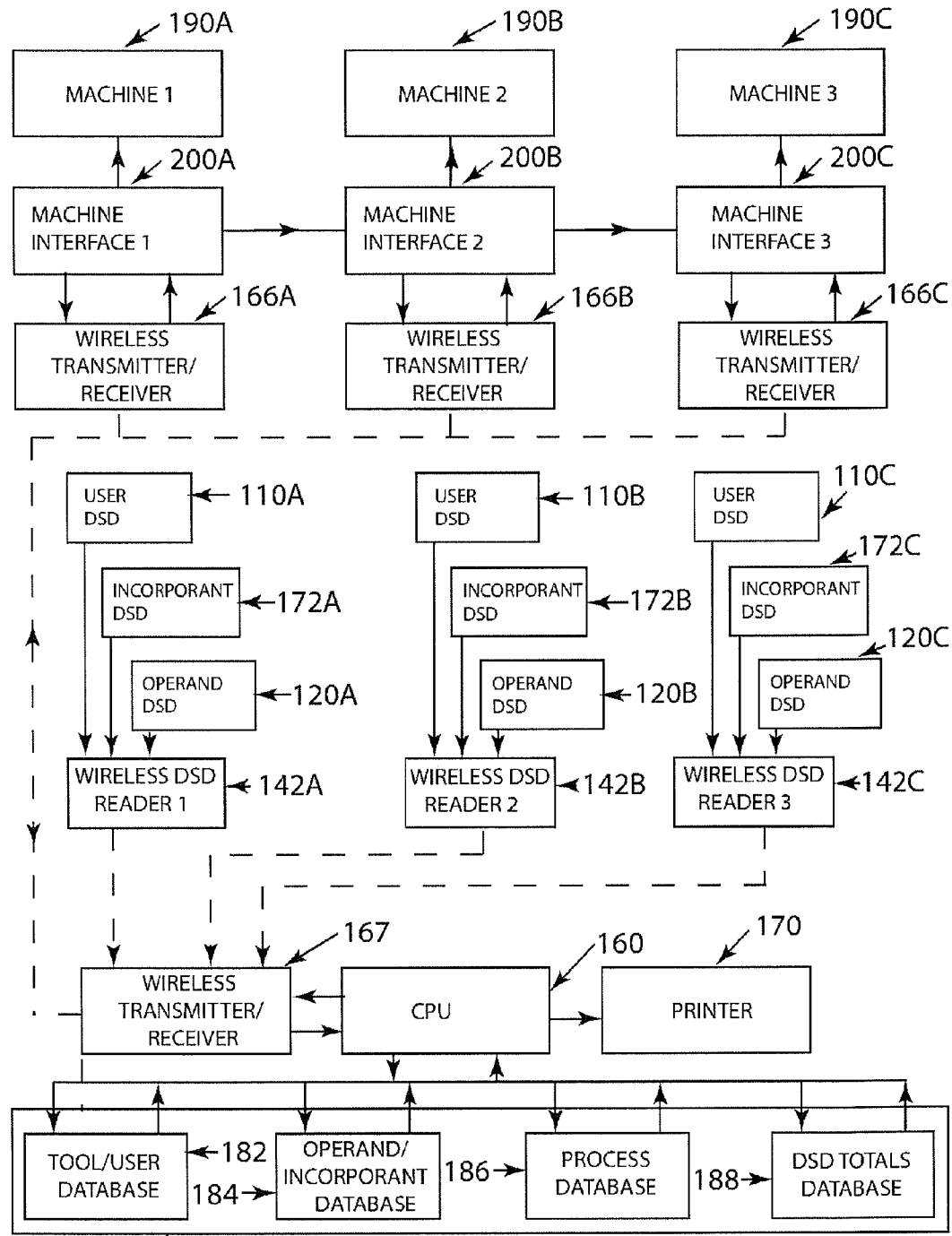
FIG. 34 shows example tracking interlock hardware architecture for a system in which a single wireless transceiver is used to communicate with both machine interfaces and Data Storage Device Readers.

In another alternative embodiment, shown in FIG. 34, the two wireless networks, of FIG. 33 are combined into a single wireless network. Wireless DSD readers one 142A, two 142B, and three 142C communicate wirelessly with wireless transmitter/receiver 167. Wireless transmitter/receivers 166A, 166B, and 166C also communicate wirelessly with wireless transmitter/receiver 167. Wireless transmitter/receiver 167 is in communication with CPU 160. Wireless transmitter/receiver's 166A, 166B, and 166C are in communication with machine interface one 200A, machine interface two 200B, and machine interface three 200C.

Figure 35:
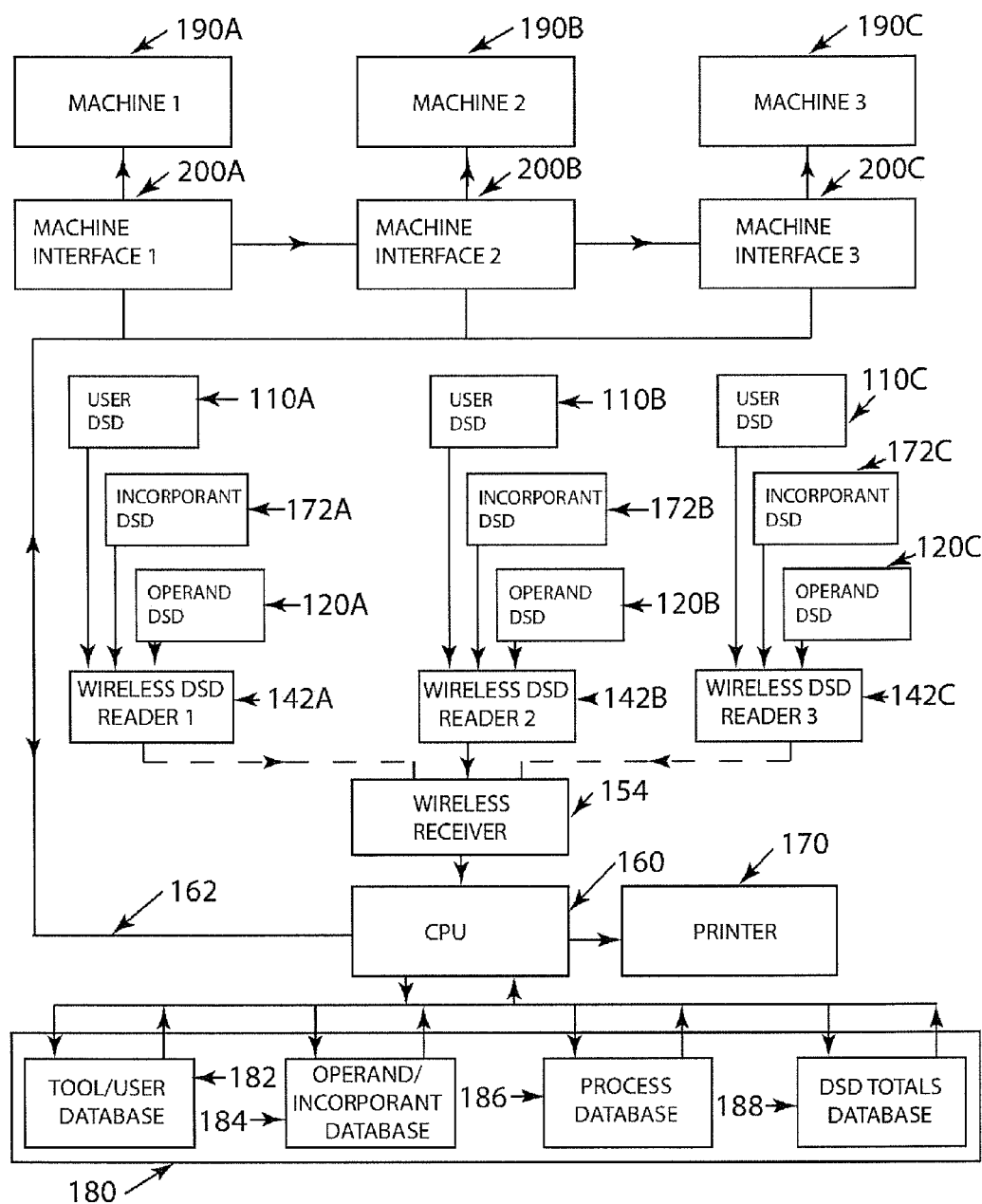
FIG. 35 shows example tracking interlock hardware architecture for a system in which a data bus is used to communicate with machine interfaces and a wireless network is used to communicate with Data Storage Device Readers.

Another alternative embodiment is shown in FIG. 35. In this embodiment, the wireless communication link 162 between wireless transmitter/receiver 164 and wireless transmitter receivers 166A, 166B, and 166C in FIG. 33 are replaced with a data bus 169. This data bus may be serial or parallel.

Figure 36:
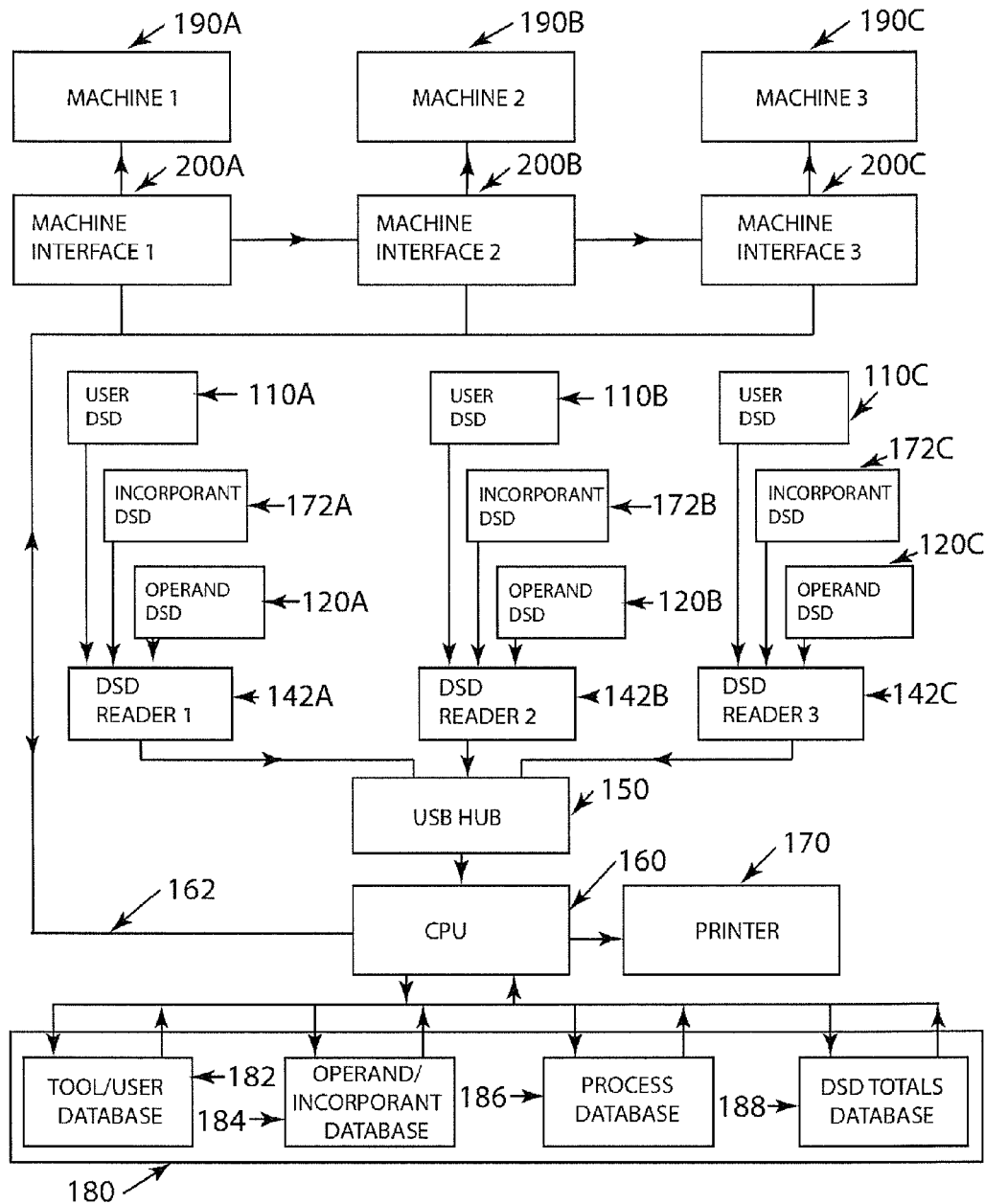
FIG. 36 depicts example tracking interlock hardware architecture for a system having a data bus to communicate with machine interfaces and a USB network, connecting Data Storage Device Readers.

Yet another alternative embodiment is shown in FIG. 36. Here, the wireless link between wireless DSD reader one 142A, wireless DSD reader two 142B, and wireless DSD reader three 142C, and wireless receiver 154 in FIG. 35 is replaced by a USB network 150.

Figure 37:
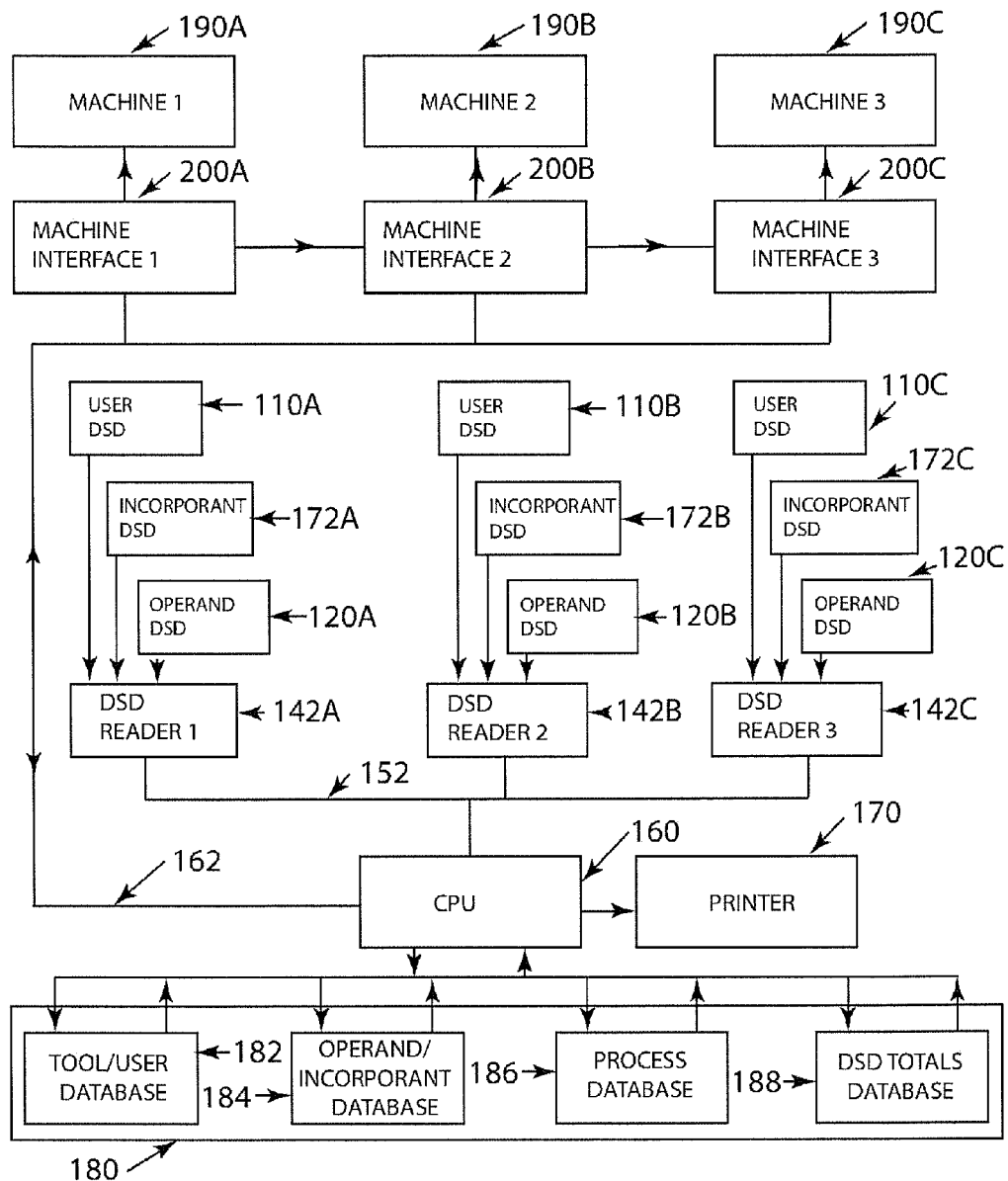
FIG. 37 depicts example tracking interlock hardware architecture for a system having one data bus to communicate with machine interfaces and having a second data bus to communicate with Data Storage Device Readers.

In another alternative embodiment, shown in FIG. 37, the USB network 150 of FIG. 36 is replaced by a data bus 152. The data bus can be serial or parallel.

Figure 38:
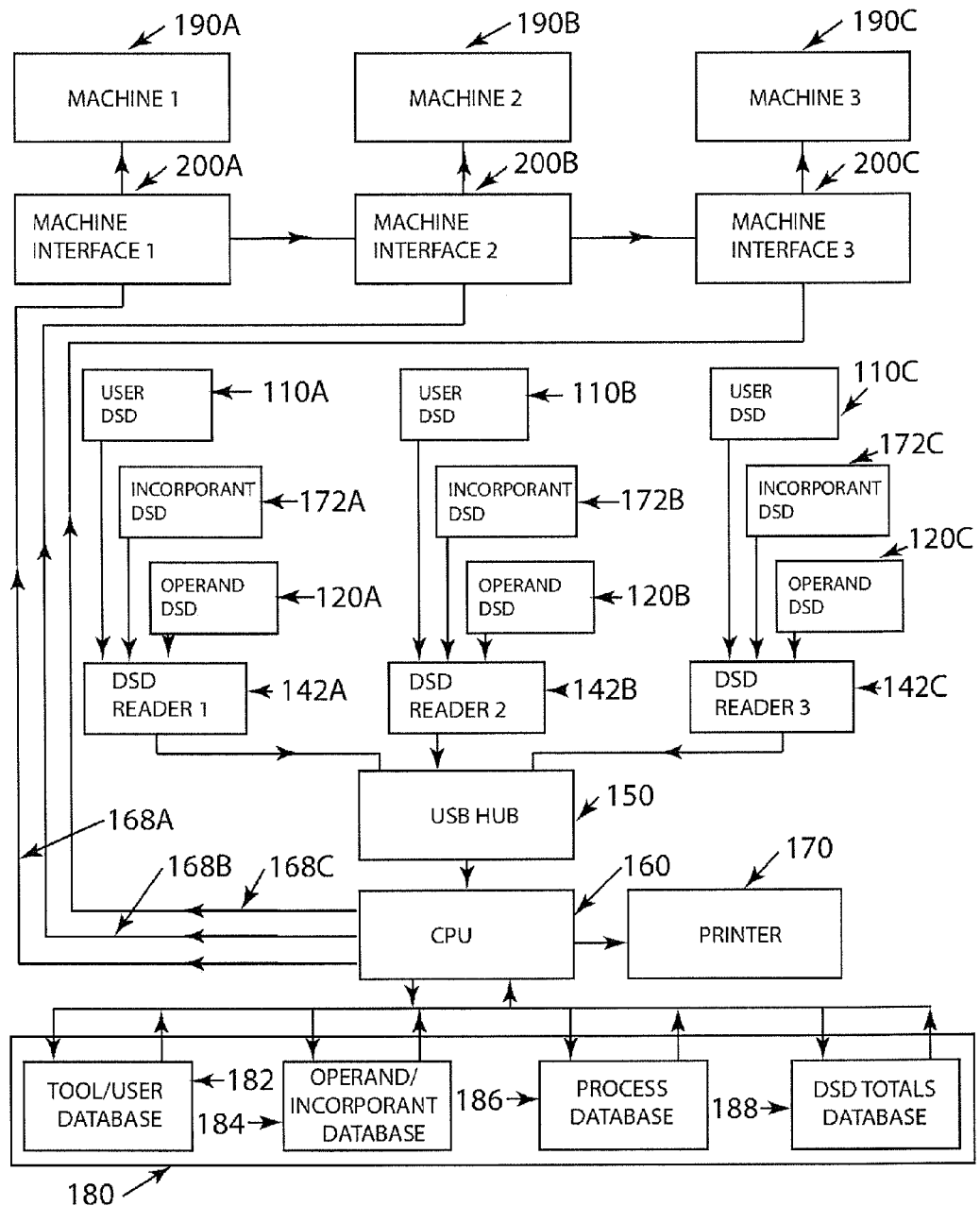
FIG. 38 shows example tracking interlock hardware architecture for a system in which communication with machine interfaces is accomplished by direct connection to the CPU and communication with Data Storage Device Readers, is accomplished via a USB network.

In another alternative embodiment, shown in FIG. 38, the data bus 169 in FIG. 37 is replaced by direct connections 168A, 168B, and 168C from the CPU 160 to machine interface one 200A, machine interface two 200B, and machine interface three 200C, respectively.

Figure 39:
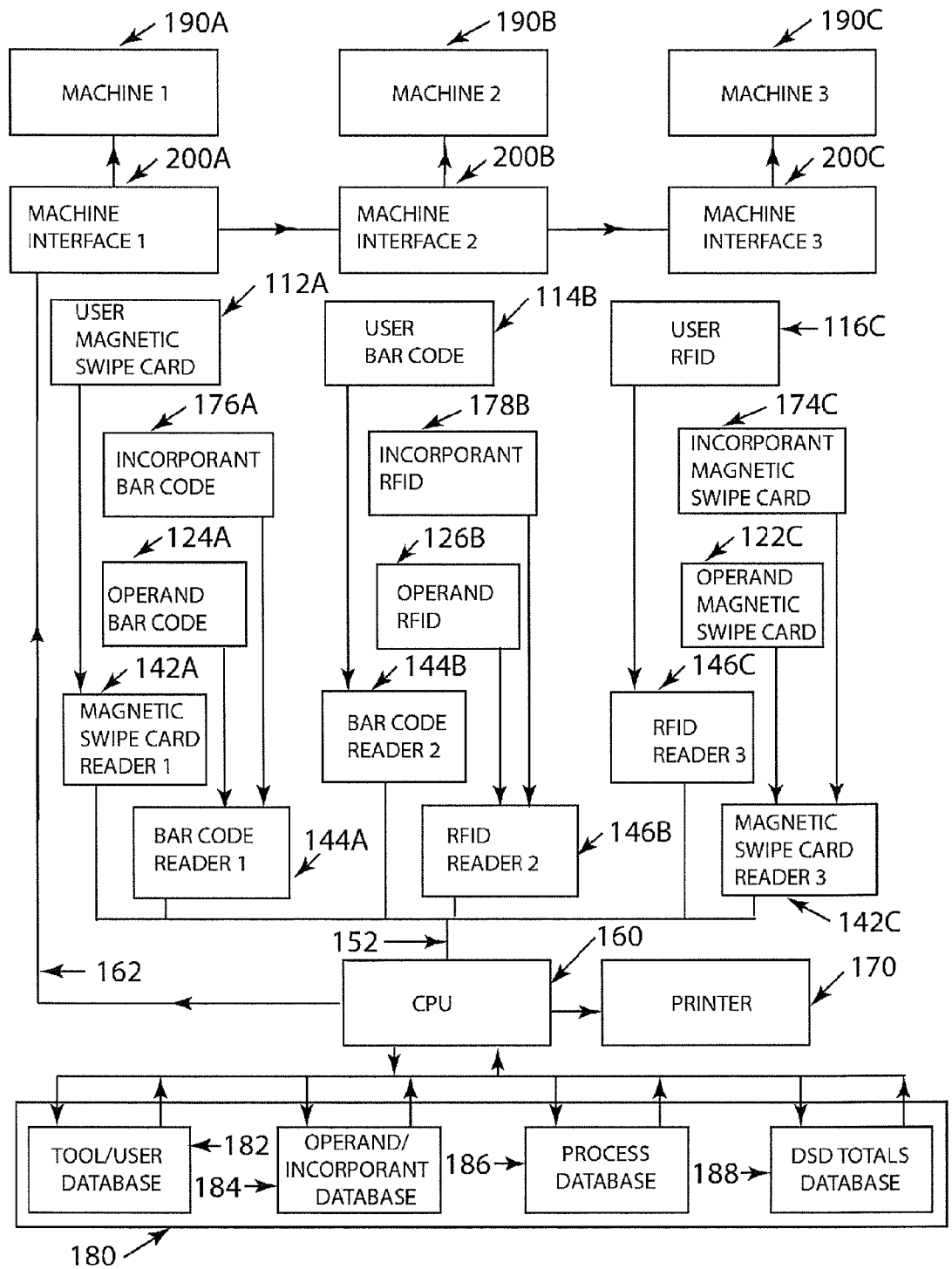
FIG. 39 represents the system shown in FIG. 37 in which the Data Storage Devices are magnetic swipe cards, bar codes, and RFID devices.

In yet another embodiment, shown in FIG. 39, the User DSD can be a magnetic swipe card 112A, a bar code 114B, or an RFID 116C, although not limited thereto. In this embodiment, the Operand DSD can be a bar code 124A, an RFID 126B, or a magnetic swipe card 122C, although not limited thereto. The Incorporant DSD can be a bar code 176A, an RFID 178B, or a magnetic swipe card 174C, although not limited thereto. The DSD readers can be a magnetic swipe card reader 145A and 145C, a bar code reader 144B and 144A, or an RFID reader 146C and 146B, as appropriate for the type of DSD being read.

One skilled in the art would appreciate a number of different technologies for use with the system and the present teachings are not limited to these particular embodiments.

Just as there are many alternative embodiments for the system architecture of the tracking interlock, there are also many alternative embodiments for the machine interface.

Referring to FIG. 5, in one alternative embodiment, where a serial bus is used for the communications link 169, the address and instruction decoder 210 might be a serial to parallel decoder such as the SN74LV8153, although not limited thereto. In this case, the comparison logic 220 might be a cascaded series of inverters, exclusive or gates, and 'and' gates.

In another alternative embodiment, the comparison logic 220 might be a commercially available comparator such as the 74C85, although not limited thereto.

In another alternative embodiment, where a parallel bus is used for the communications link 162, the address and instruction decoder 210 might be eliminated entirely. The individual lines of the parallel bus can then be lead directly into the comparison logic 240.

Many variations on the interface machine control circuitry, shown in FIG. 6, are also possible. In one embodiment, the relay 245 is replaced by a triode for alternating current (TRIAC). In another embodiment, two SCRs are used in series and two relays are used in parallel. The use of two SCRs in series provides some redundancy and allows the interface machine control circuitry to operate normally even if one of the SCR's has failed. Relays normally fail because the contacts have welded. If the relay coils are wired in parallel and the relay contacts are wired in series, in the event that one relay fails closed, the other will still continue to function normally. In another embodiment, the normally closed pushbutton switch 242 is replaced by the normally closed emergency stop button.

The on-off power circuitry of most single phase industrial machines employs at least one relay with two sets of contacts. A normally open on pushbutton is connected in series between a DC power source and the coil. One set of relay contacts is wired in series between a DC power source and a normally closed off push button, which in turn is wired in series with the coil. A second set of relay contacts is connected in series with the power source for the machine. When the operator pushes the on pushbutton, current flows from the DC power source to the coil, thus closing the contacts of the relay. When the operator releases the on pushbutton, current continues to flow through the relay contacts and the normally closed off pushbutton to the coil, thus keeping the contacts closed. When the normally closed off pushbutton is depressed, current to the coil is shut off, the relay contacts open, and power to the machine is cut off. In another alternative embodiment, the output of the interface on/off circuitry 230 is the DC power source, supplied to the normally open on pushbutton and the relay contacts in series with the normally closed off pushbutton.

Figure 40:
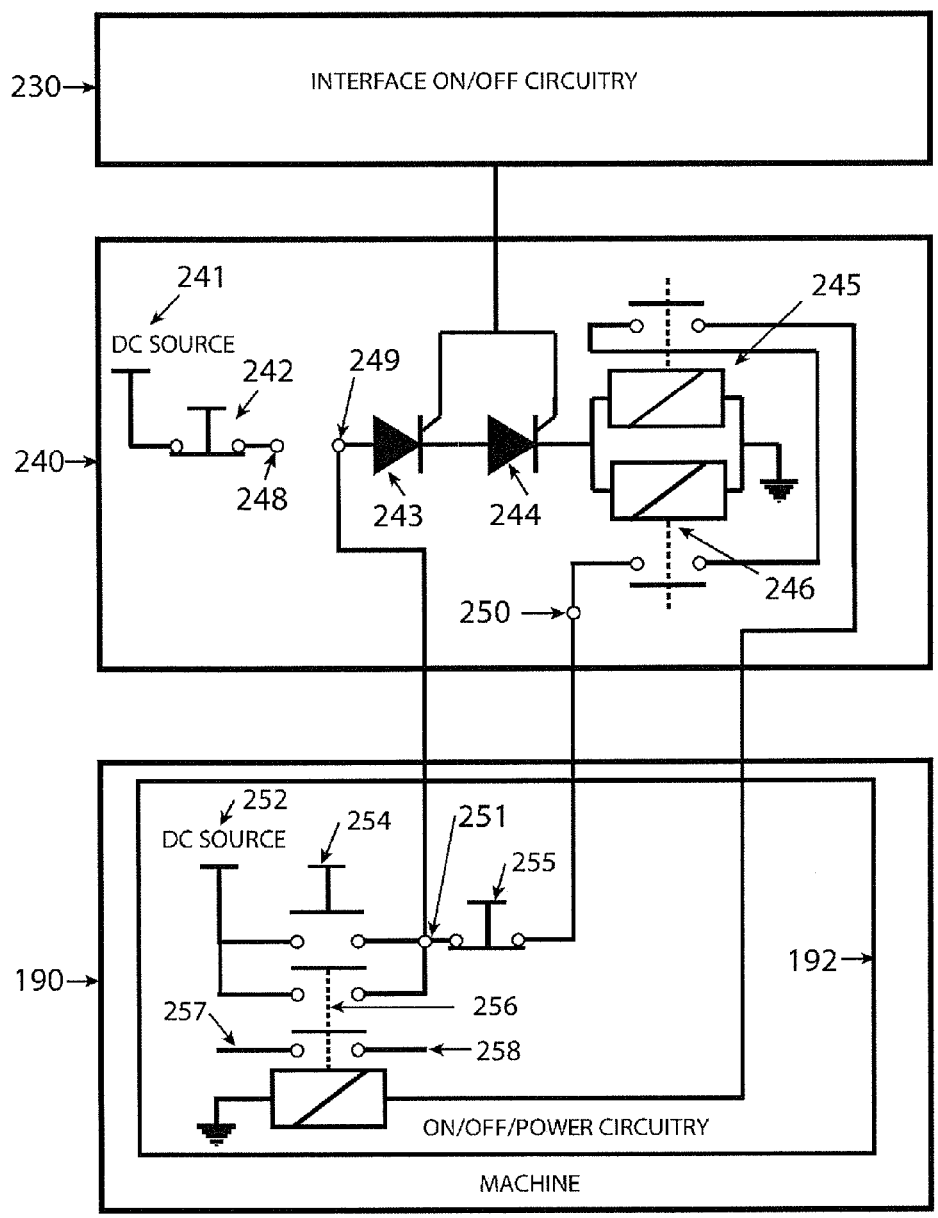
FIG. 40 shows one way in which the interface machine control circuitry of a machine interface might be implemented as well as one means of interfacing the interface machine control circuitry with the on/off power circuitry of a machine.

In yet another alternative embodiment, shown in FIG. 40, a normally open start pushbutton 254 and one set of machine relay 256 contacts are connected in parallel between a DC source 252 and junction 251. From junction 251, two legs of a parallel circuit proceed to ground. In the first leg, SCR's 243 and 244 are wired in series. The output of SCR 244 is connected to the coils of relay 245 and relay 246, which are connected in parallel between SCR 244 and ground. In the second leg, normally closed pushbutton stop switch 255 is wired in series with the contacts of relay 246 and relay 245, the coil of relay 256, and ground. Assuming current has been applied to the gates of SCRs 243 and 244, when on pushbutton 254 is closed, current flows from DC source 252 through normally open switch 254 to SCR 243 and SCR 244 and coils of relays 245 and 246, thus closing their contacts. At the same time, current flows from DC source 252 through normally open on pushbutton switch 254, through junction 251, through normally closed pushbutton stop switch 255, through the contacts of relays 246 and 245, and through the coil of relay 256, thus closing the contacts of relay 256. When on pushbutton 254 is released, current continues to flow from DC source 252 to junction 251 and through the legs of the parallel circuits between junction 251 and ground, thereby maintaining the contacts of relay 256 in a closed position. Provided that the authorization signal to the gates of SCRs 243 and 244 has been turned off, when normally closed stop pushbutton 255 is depressed, current to the coil of machine relay 256 is cut off and the contacts open, thus cutting power to the machine 190.

Referring again to FIG. 5, in yet another alternative embodiment, flash memory might be used for local address storage 260 in the machine interface 200. Alternatively, ROM, PROM, or EPROM, or some other appropriate storage device might also be used for local address storage.

In another alternative embodiment, the address and instruction decoder 210 might be replaced by a UART. The comparison logic 220, local address storage 260, and the authorization signal generator 230 could be replaced by a microprocessor.

Of course, those skilled in the art will recognize that there are many other ways to implement the machine interface and the present teachings are not limited to any particular embodiment disclosed herein.

The terms operand and incorporant were introduced to reflect the versatility of the tracking interlock system. Although a manufacturing operation was selected to illustrate the utility of the tracking interlock system, the inventor recognizes that the system can be used to track many other processes.

Figure 41:
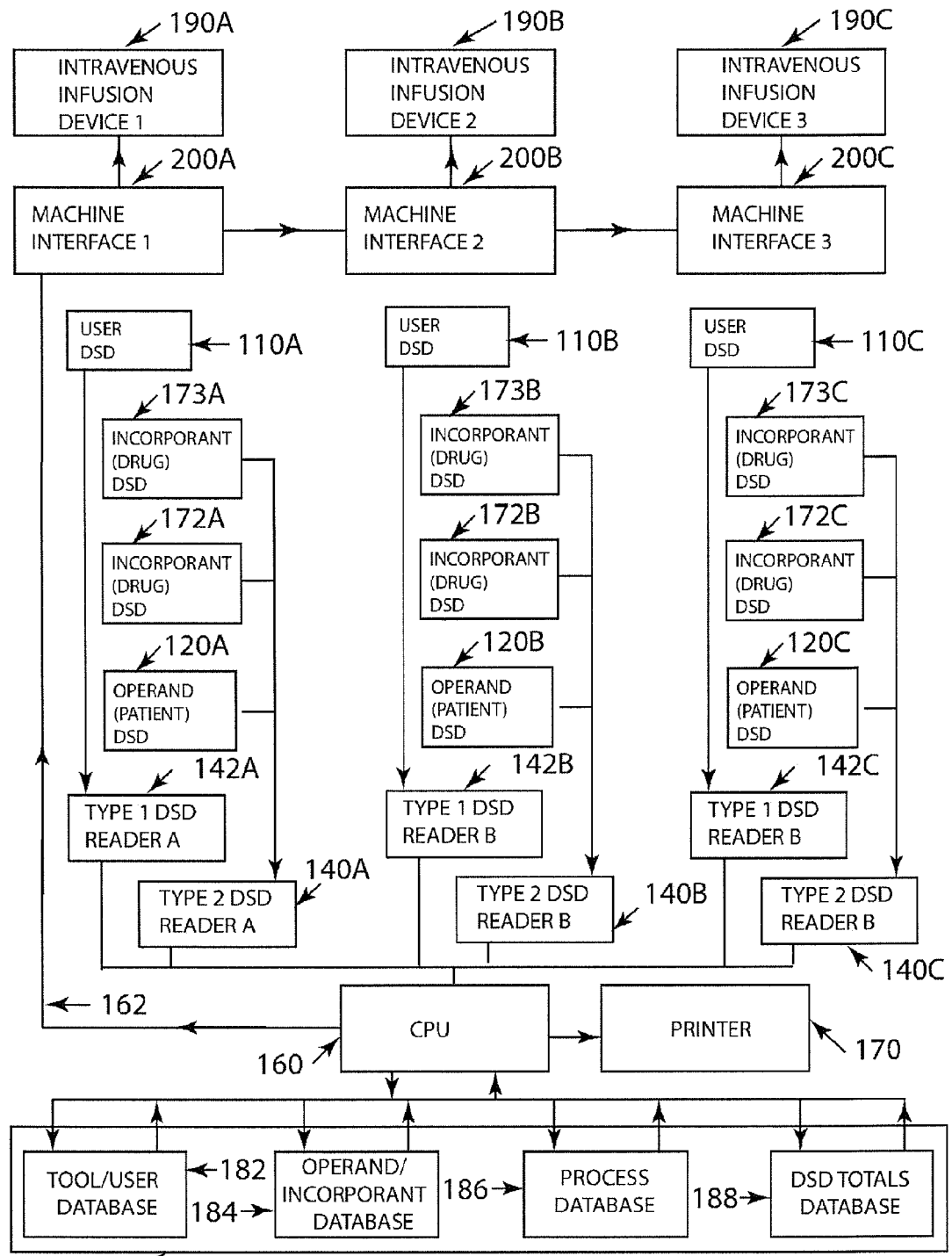
FIG. 41 shows an example of hardware system architecture for a hypothetical drug infusion facility.

In one alternative embodiment, the tracking interlock system is used to collect data in an intravenous infusion suite such as the kind used in many hospitals to treat cancer patients. In this case, the machines may be peristaltic pumps, which are interfaced with microprocessors to control the dose rate and set off an alarm in the event of a problem or when treatment is completed. System architecture for the tracking interlock system as used in an intravenous infusion suite is shown in FIG. 41. An example Operand/Incorporant database for an intravenous infusion suite is shown in FIG. 42. The operand may be the patient. The Operand DSD 120 might contain the patient's name and his date of birth. The Operand DSD might take the form of one or more bar codes on the wrist band commonly worn by the patient. The incorporant may be the drug which is incorporated into the patient. The Incorporant DSD 172 might take the form of a bar code label which the hospital pharmacy adheres to the IV bag. Just as there may be more than one drug, there may be more than one Incorporant DSD 173. Information contained in the Incorporant DSD might include the name of the drug, the name of the manufacturer, and the lot number. The Operand/Incorporant database for an IV infusion suite might also contain the dose and dose rate associated with each drug, although not limited thereto. For the case of the IV infusion suite, the user may be the nurse who administers the drugs. Typically, hospital employees wear an identification badge. If a magnetic stripe is incorporated into the identification badge, it can be used as a User DSD 110. A User DSD might contain the nurse's name and identification number.

Because there are two formats for the DSD's associated with the IV infusion suite, there may be two different types of DSD readers: one for bar codes 148 and one for magnetic swipe cards 147. To use the tracking interlock system, the nurse would use the barcode reader 148 associated with the peristaltic pump 190 to read the patient's wristband 120. The nurse would then use the barcode reader to read the barcode 172 on the IV bag. Once the IV is set up, the nurse would swipe her ID card 110 in the magnetic card reader 147 associated with the peristaltic pump 190. The order of the information entry is not important. Once the information from the Incorporant DSD 172 is entered, the tracking interlock system, optionally, may inform the nurse of the proper dose and dose rate for the drug. Once all DSD information has been entered into the system, the peristaltic pump 190 may be enabled and the nurse may enter the dose rate and start the pump. If infusion of a second drug is required, all pertinent information 120, 173, and 110 should be entered again.

Figure 43:
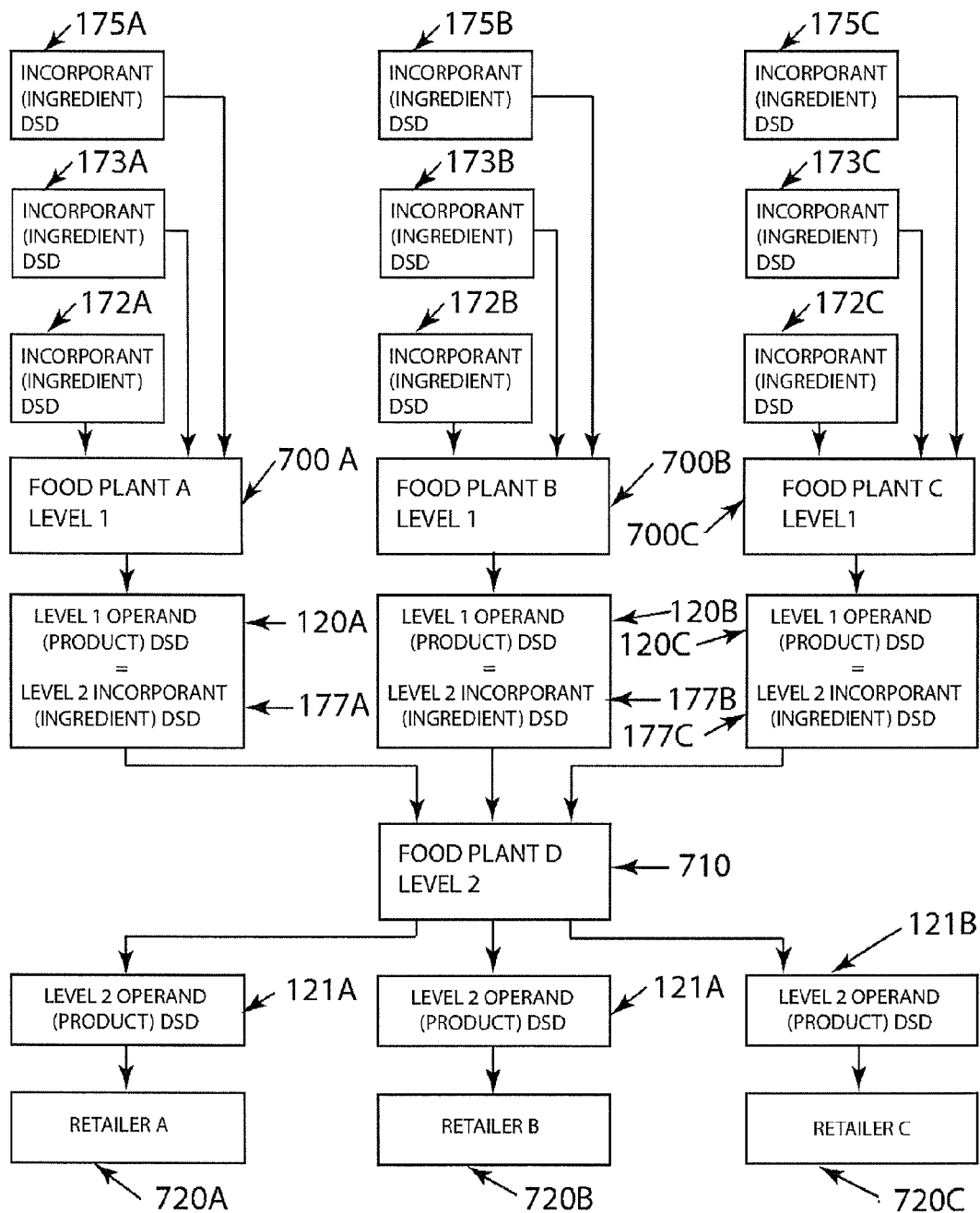
FIG. 43 depicts an example of the flow of Data Storage Devices between food handling facilities and how the Data Storage Devices might be used to track movement of ingredients and product through the food supply chain.

In another alternative embodiment, the tracking interlock system may be used to monitor the food production chain. To see how this might be implemented, refer to FIG. 43. Food Plant A 700A receives ingredients from three suppliers. Each supplier provides an Incorporant or Ingredient DSD 172, 173, and 175 with its product. The Ingredient DSD contains information that allows the supplier to identify the source of the ingredient. This might be a product name and lot number. Food Plant A 700A processes and combines the three ingredients to make its product. In doing so, it uses the tracking interlock system. Before Food Plant A begins any processing, it writes an Operand or Product DSD 120A. The Product DSD may contain the name of the product, the lot number, and a projected manufacture date. As ingredients are incorporated into Food Plant A's product, ingredient DSD's are read along with the Product DSD and the User DSD. Similar processes occur at Food Plant B 700B and Food Plant C 700C. Food Plant B and Food Plant C also use the tracking interlock system.

When Food Plant A, Food Plant B, and Food Plant C shipped their product to Food Plant D 710, they also supplied Food Plant D with their Product DSDs 120A, 120B, 120C. If, for example, the Product DSD is a magnetic swipe card, it could be shipped in a sleeve attached to the product container. Optionally, to ensure the authenticity of the Product DSDs, Food Plants A, B, and C could include an encrypted code, which they share with Food Plant D, in an additional data field of the Product DSDs. This code could be made a condition for further processing at Food Plant D. When the Product DSDs 120A, 120B, and 120C arrive from the level one food plants at the level two Food plant D 710, these level one Product DSD's become level two Incorporant or Ingredient DSDs 177A, 177B, and 177C. Before it processes any ingredients, Food Plant D 710, may write level two Product DSD's 121A, 121A, and 121B. As ingredients are processed, Food Plant D may use the tracking interlock system to read Ingredient DSD's, Product DSD's, and User DSD's. This process allows plant D to track its product back to its suppliers. When Food Plant D ships product to its customers Retailer A 720A, Retailer B 720B, and Retailer C 720C, it supplies them with Product DSD's that the retailer may now use to track product on its shelves back to the suppliers.

Figure 44:
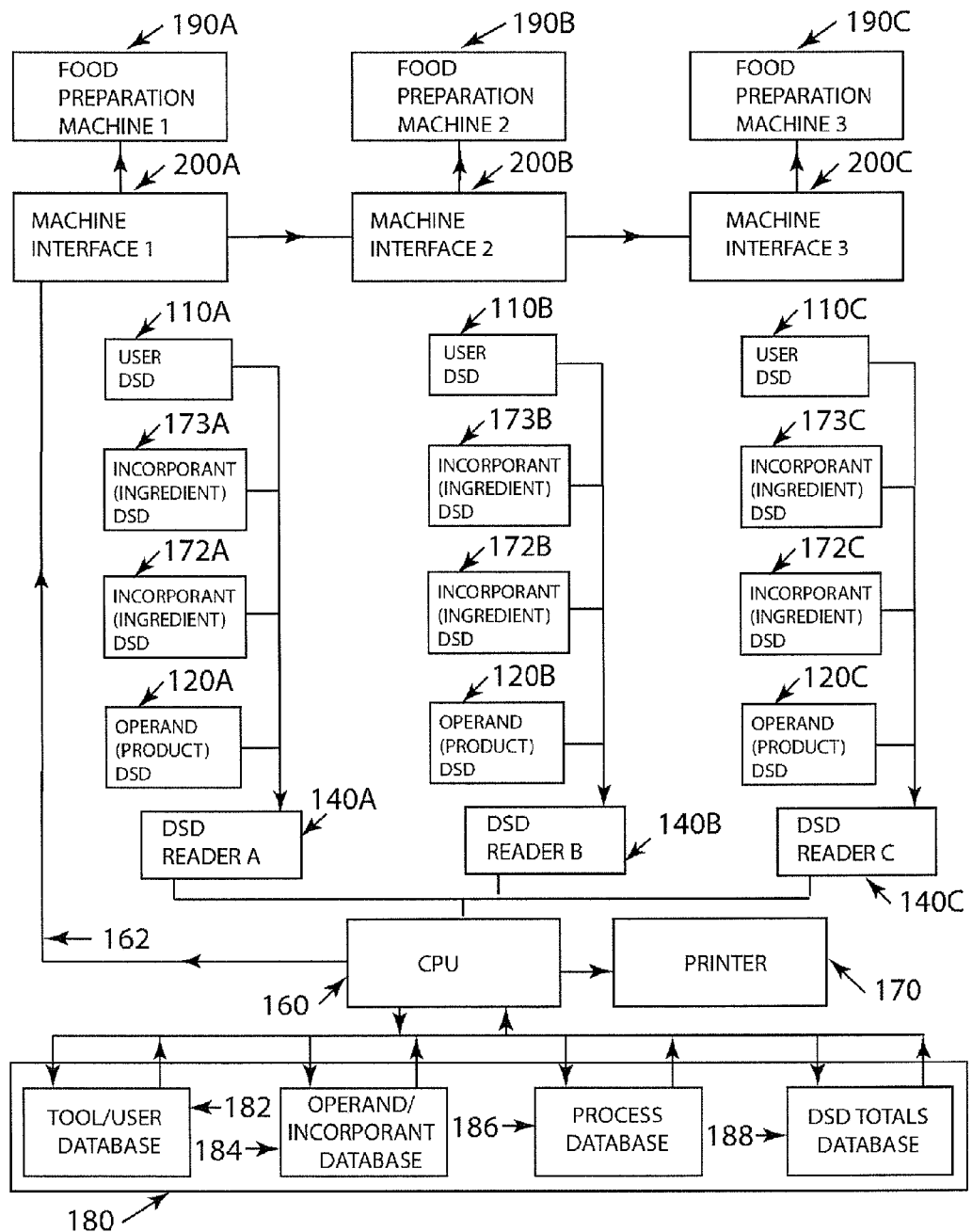
FIG. 44 shows an exemplary hardware system architecture for a hypothetical food processing facility.

System architecture for one embodiment of a food processing operation is shown in FIG. 44. As with the example of an IV infusion suite, there are User DSDs 110, Incorporant DSDs 172 and 173, and Operand DSDs 120. The Incorporant DSD's 172 and 173 contain information which allows the food processing operations supplier to trace these ingredients back to the supplier's supplier or the ingredient source. The Operand or Product DSD 120 may contain information such as product name, lot number, and date. Product DSD's may be created prior to any food processing operation. The Product DSDs may then travel with the unfinished product through the food processing operations. Ingredient data can be associated with product data when Ingredient DSDs are read at the same reader as the Product DSD. Food preparation machines 190A, 190B, and 190C might be choppers, mixers, or ovens, although not limited thereto.

An example of one embodiment of an Operand/Incorporant database 184 for a food processing operation is shown in FIG. 45. Here, the database contains product identification, ingredient identification, ingredient amounts, and processing conditions. The process is equivalent to the equipment performing the processing. For product 1, amount 1 of ingredient 1 is processed by machine A for time 1. Process A might be a chopping operation, for example. If there is an attempt to process some other ingredient besides ingredient 1 using process A, the tracking interlock system will not allow processing to proceed. Product 2 is created by subjecting Product 1, Ingredient 4, and Ingredient 2 to Process B for Time 2. Process B might be a mixing operation, for example. Moving to product 4, Amount 4 of Product 3 may be held at Temperature 1 for Time 4. Process C might be a cooking operation, for example.

Advantages

From the description above, a number of advantages of my tracking interlock become evident:

(a) Operator, operand, incorporant, and tooling data are automatically entered into a database with time and date.

(b) Processing cannot take place unless the operator inputs data from the proper DSDs using the proper input device.

(c) Tracking interlocks can be networked so that a number (e.g., at least 255 in one embodiment) of distinct operations can be tracked.

(d) More than one operation can be conducted and tracked at the same time.

(e) Incorporant or ingredient data may be tracked in addition to operator data and operand or product data.

(f) An inter-plant or inter-company audit trail can be established by linking operand or Incorporant DSDs with receiving data.

(g) For plants using the tracking interlock system, an encrypted flag guarantees that DSD data exchanged between plants is authentic.

(h) Using user and operand data, quality for product dependent on human factors can be traced to individuals.

(i) Using operator, operand, and time data, productivity can be traced to individuals.

(j) Using operand and incorporant data, quality can be traced to raw materials.

(k) Using operand, incorporant, time, and receiving data, problems caused by incoming materials can be traced to their source.

(l) Portable Data Storage Devices insure the accuracy of data entry.

Conclusion and Ramifications

Accordingly, the reader will see that the tracking interlock system represents a significant advance in quality control and accountability in that it will not allow processing to take place unless all required data has been entered. The use of input devices compatible with Data Storage Devices insures the accuracy of data. Association of user, operand, incorporant, and time data provides management with a potent tool to track quality and productivity. In-plant traceability is assured and inter-facility traceability easily implemented for facilities using the tracking interlock system. In particular, the tracking interlock system may:

Associate the process, operator, product, and time in a manufacturing environment, allowing plant management to trace productivity and quality to individuals;

Associate the health care provider, patient, equipment, and medications in a medical environment, allowing proof of innocence or culpability in the event that a problem occurs;

Associate the process, operator, and ingredients in a food processing environment, allowing public health officials to more easily isolate the sources of illness such as *E-coli* and *salmonella*, thus limiting the scope of any quarantine;

Allow traceability between plants through the shipment of an Operand DSD with the product or the provision of Operand DSD data to be entered at the receiving plant.

Although the description above contains many specificities, these should not be construed as limiting the scope of the present teachings, but as merely providing illustrations of some of the presently preferred embodiments. For example, a wireless communications link could be replaced by either a serial or parallel bus. Alternate comparison logic could be constructed from either simpler or more complex logic gates. Comparison logic could be replaced by comparators such as 74C85s. A UART might be used either in conjunction with or without a microprocessor to send and receive serial data. An EPROM, ROM, PROM, or flash memory could be used to store the address of the machine interface. A relay circuit could be used instead of an SCR. The number of SCRs used in the interface machine control circuitry could be varied to provide more or less protection as could the number of relays. Triacs could be substituted for relays and vice versa. Instead of using magnetic swipe cards for DSDs, bar codes, smart cards, RFID devices, flash memory, or even punch cards could be used. Communication between the CPU and the input devices could be wireless. Classes of DSD in addition to operator, operand, incorporant, and tooling could be added as appropriate. Additional data fields could be added to DSDs. For example, an authenticity code could be added to an Operand DSD as could an okay to process flag. Software could be added to incorporate these features. Software could also be expanded to integrate the tracking interlock system with shipping, receiving, and quality control software. The order of software functions could be changed, etc.

One primary goal of the tracking interlock system is the association of processing data with date and time in a manner which does not permit processing to proceed until all data has been properly entered, and in a manner in which these data can be stored and retrieved. A secondary goal of the tracking interlock system is to limit access to authorized personnel and to ensure that the proper operands and incorporants are being processed. Those skilled in the art will recognize that there are many ways in which a tracking interlock system can be constructed to achieve these goals and thus that the scope of the present teachings includes any means of achieving these goals.

It is to be appreciated that the scope of the present teachings should be determined by the appended claims and their legal equivalents, rather than by the examples given.

What is claimed is:

1. A system for operating and monitoring a machine process, comprising:
   a computer;
   at least one machine, and at least one machine interface;
   at least one database storing user data and operand data;
   at least two data storage devices, including a user identification data storage device and an operand identification data storage device;
   said user identification data storage device including user identification data pertaining to a particular user, and said operand identification data storage device including operand data pertaining to a particular operand;
   a data storage device reader in communication with said computer and at least one machine interface, said data storage reader reading the user data and the operand data on said data storage devices and communicating the user data and the operand data to said computer;
   software executing on said computer for storing the user data and the operand data in said database;
   software executing on said computer for transmitting a signal to the at least one machine interface upon the receipt of the user data and the operand data to enable the user to power on said machine;
   an incorporant identification data storage device including incorporant data pertaining to a particular incorporant; and
   software executing on said computer for associating said incorporant data with said user data and said operand data in said database;
   wherein said data storage device reader reads said incorporant data on said incorporant identification data storage device;
   wherein said at least one machine remains powered on until the user turns off said at least one machine;
   wherein said machine process comprises an intravenous infusion process;
   wherein said at least one machine comprises an intravenous infusion device;
   wherein said incorporant data comprises intravenous drug information;
   wherein said user data comprises user information about a person who will operate the intravenous infusion device;
   wherein said operand data comprises patient information; and
   wherein said database stores prescription and permission information;
   the system further comprising:
   software executing on said computer for verifying that the user has permission to administer an intravenous drug; and
   software executing on said computer for verifying that the patient information and the intravenous drug information match the prescription information.

2. The system according to claim 1, further comprising: a communications link between said computer and said machine interface, and a communications link between said machine interface and said machine, wherein at least one of said communications links comprises a wireless communications link.

3. The system according to claim 1, further comprising: a machine identification data storage device including machine data pertaining to said at least one machine; and software executing on said computer for associating said machine data with said user data and said operand data in said database; wherein said data storage device reader reads said machine data on said machine identification data storage device.

4. The system according to claim 1, further comprising: software executing on said computer for verifying permission to activate said at least one machine based at least in part on permission data stored in said database.

5. The system according to claim 1, wherein said data storage device reader is a wireless reader.

6. The system according to claim 1, further comprising: a pneumatic interface for applying pneumatic pressure to or isolating pneumatic pressure from said machine, said pneumatic interface controlled at least in part by said machine interface.

7. The system of claim 1, further comprising: software executing on said computer for associating time data with said user data and said operand data in said database.

8. The system of claim 1, further comprising: initialization software executing on said computer for associating said data storage device reader, said at least one machine, and said at least one machine interface.

9. The system of claim 1, further comprising: a data storage device writer for writing data to at least one of said data storage devices.

10. The system of claim 9, wherein said storage device writer software creates permissions.

11. The system of claim 1, wherein at least one of said data storage devices is a magnetic swipe card, a bar code, radio frequency identification device, or a punch card.

12. A system for operating and monitoring a machine process, comprising:
a computer;
at least one machine, and at least one machine interface;
at least one database storing user data and operand data;
at least two data storage devices, including a user identification data storage device and an operand identification data storage device;
said user identification data storage device including user identification data pertaining to a particular user, and said operand identification data storage device including operand data pertaining to a particular operand;
a data storage device reader in communication with said computer and at least one machine interface, said data storage reader reading the user data and the operand data on said data storage devices and communicating the user data and the operand data to said computer;
software executing on said computer for storing the user data and the operand data in said database;
software executing on said computer for transmitting a signal to the at least one machine interface upon the receipt of the user data and the operand data to enable the user to power on said machine;
an incorporant identification data storage device including incorporant data pertaining to a particular incorporant; and
software executing on said computer for associating said incorporant data with said user data and said operand data in said database;
wherein said data storage device reader reads said incorporant data on said incorporant identification data storage device;
wherein said at least one machine remains powered on until the user turns off said at least one machine;
wherein said machine process is a food preparation process;
wherein said at least one machine comprises a food preparation machine;
wherein said incorporant data comprises ingredient information;
wherein said user data comprises user information about a person who will operate the food preparation machine; and
wherein said operand data comprises food product information.

13. The system according to claim 12, further comprising: a machine identification data storage device including machine data pertaining to said at least one machine; and software executing on said computer for associating said machine data with said user data and said operand data in said database; wherein said data storage device reader reads said machine data on said machine identification data storage device.

14. The system according to claim 12, further comprising: software executing on said computer for verifying permission to activate said at least one machine based at least in part on permission data stored in said database.

15. The system according to claim 12, wherein said data storage device reader is a wireless reader.

16. The system according to claim 12, further comprising: a pneumatic interface for applying pneumatic pressure to or isolating pneumatic pressure from said machine, said pneumatic interface controlled at least in part by said machine interface.

17. The system of claim 12, further comprising: software executing on said computer for associating time data with said user data and said operand data in said database.

18. The system of claim 12, further comprising: initialization software executing on said computer for associating said data storage device reader, said at least one machine, and said at least one machine interface.

19. The system of claim 12, further comprising: a data storage device writer for writing data to at least one of said data storage devices.

20. The system of claim 19, wherein said storage device writer software creates permissions.

21. The system of claim 12, wherein at least one of said data storage devices is a magnetic swipe card, a bar code, radio frequency identification device, or a punch card.

22. A method for operating and monitoring a machine, comprising the steps of:
operating a data storage device reader to read a user data storage device, said data storage device reader communicating user data to a computer with software executing thereon;
operating a data storage device reader to read an operand data storage device, said data storage device reader communicating operand data to a computer with software executing thereon; and
enabling said machine to be turned on by a user after receiving said user data and said operand data, said machine remaining on until the user turns off said machine;
wherein said machine is a medical intravenous infusion device;
wherein said user data comprises user information about a person who will operate the medical intravenous infusion device; and
wherein said operand data comprises patient information;
said method further comprising the step of:
operating the data storage device reader to read an incorporant data storage device, said data storage device reader communicating incorporant data to the computer with software executing thereon, and said incorporant data comprises intravenous drug information.

23. A method for operating and monitoring a machine, comprising the steps of:
operating a first data storage device reader to read a user data storage device, said first data storage device reader communicating user data to a computer with software executing thereon;
operating a second data storage device reader to read an operand data storage device, said second data storage device reader communicating operand data to a computer with software executing thereon; and
enabling said machine to be turned on by a user after receiving said user data and said operand data, said machine remaining on until the user turns off said machine;
wherein said machine is a food production machine;
wherein said user data comprises user information about a person who will operate the food preparation machine; and
wherein said operand data comprises food product information;
said method further comprising the step of:

operating a third data storage device reader to read an incorporant data storage device, said third data storage device reader is communicating incorporant data to the computer with software executing thereon, and said incorporant data comprises ingredient information.

24. The method of claim 23, wherein the first data storage device reader and the second data storage device reader comprise the same storage device reader.

* * * * *